(12) United States Patent
Richmond et al.

(10) Patent No.: US 12,555,998 B2
(45) Date of Patent: Feb. 17, 2026

(54) METHOD AND SYSTEM FOR PREDICTIVE LOAD COMPENSATION AND REAL-TIME POWER CONDITIONING IN UNINTERRUPTIBLE POWER SUPPLY SYSTEMS

(71) Applicant: E2 IP HOLDING LLC, Bonita Springs, FL (US)

(72) Inventors: James Richmond, Estero, FL (US); Scott Gall, Bonita Springs, FL (US); Clayborne Taylor, Bonita Springs, FL (US)

( * ) Notice: Subject to any disclaimer, the term of this patent is extended or adjusted under 35 U.S.C. 154(b) by 44 days.

(21) Appl. No.: 18/980,820

(22) Filed: Dec. 13, 2024

(65) Prior Publication Data

US 2025/0118962 A1 Apr. 10, 2025

Related U.S. Application Data

(63) Continuation-in-part of application No. 18/358,822, filed on Jul. 25, 2023, which is a continuation-in-part
(Continued)

(51) Int. Cl.
*H02J 3/00* (2006.01)
*H02J 3/001* (2026.01)
(Continued)

(52) U.S. Cl.
CPC .............. *H02J 3/001* (2020.01); *H02J 3/003* (2020.01); *H02J 3/32* (2013.01); *H02J 9/062* (2013.01);
(Continued)

(58) Field of Classification Search
None
See application file for complete search history.

(56) References Cited

U.S. PATENT DOCUMENTS

2014/0211520 A1* 7/2014 Zhang .................. H02M 1/126
363/37
2020/0333767 A1* 10/2020 Engelstein ............... H04Q 9/00
(Continued)

FOREIGN PATENT DOCUMENTS

WO WO-2005011121 A2 * 2/2005 ............ H03M 1/661

*Primary Examiner* — Thomas C Lee
*Assistant Examiner* — Anzuman Sharmin
(74) *Attorney, Agent, or Firm* — Derek Fahey, Esq.; The Plus IP Firm, PLLC

(57) ABSTRACT

A method for conditioning and maintaining power with predictive load compensation using an uninterruptible power supply system is disclosed. The method includes measuring an electrical input from a primary power supply using analog sensors and transmitting the input through an impedance to introduce a controlled delay. During the delay, input parameters and downstream system effects are determined based on telemetry sensor data. Digital identities are generated for the electrical input and the downstream load and compared to a stored digital identity representing historical conditions. Using the comparison, a system simulation is performed with analog twinning to predict downstream system responses. The predicted response is used to adjust a power converter parameter, modifying the electrical input to an intermediate output that compensates for voltage fluctuations and harmonic distortions. A secondary power supply with a bidirectional high-discharge battery supplements or stores energy as needed, ensuring stable power delivery to the downstream load.

20 Claims, 16 Drawing Sheets

Related U.S. Application Data of application No. 18/090,210, filed on Dec. 28, 2022, now abandoned, which is a continuation of application No. PCT/US2021/039708, filed on Jun. 29, 2021.

(60) Provisional application No. 63/060,740, filed on Aug. 4, 2020, provisional application No. 63/045,535, filed on Jun. 29, 2020.

(51) Int. Cl.
*H02J 3/32* (2006.01)
*H02J 9/06* (2006.01)

(52) U.S. Cl.
CPC ....... *H02J 2203/10* (2020.01); *H02J 2203/20* (2020.01)

(56) References Cited

U.S. PATENT DOCUMENTS

2022/0393465 A1* 12/2022 Endo ............... G06Q 50/06
2024/0332967 A1* 10/2024 Walkingshaw ......... G01W 1/10

* cited by examiner

METHOD AND SYSTEM FOR PREDICTIVE LOAD COMPENSATION AND REAL-TIME POWER CONDITIONING IN UNINTERRUPTIBLE POWER SUPPLY SYSTEMS

REFERENCE TO RELATED APPLICATIONS

This application is a continuation in part application of U.S. application Ser. No. 18/358,822 titled "METHODS AND SYSTEMS FOR CONDITIONING AND MAINTAINING POWER TRANSMITTED TO A CUSTOMER LOAD FROM AT LEAST ONE OF A PRIMARY POWER SUPPLY AND A SECONDARY POWER SUPPLY" and filed Jul. 25, 2023.

U.S. application Ser. No. 18/358,822 is a continuation in part application of U.S. application Ser. No. 18/090,210 titled "Apparatus, Systems, and Methods for Providing a Rapid Threshold Amount of Power to a Customer Load During Transfer Between a Primary Power Supply" and filed Dec. 18, 2022 which is a continuation of PCT/US21/39708 titled "Apparatus, Systems, and Methods for Providing a Rapid Threshold Amount of Power to a Customer Load During Transfer Between a Primary Power Supply and a Secondary Power Supply" and filed Jun. 29, 2021, the subject matter of each is hereby incorporated herein by reference.

PCT/US21/39708 claims the benefit of the filing dates of U.S. Provisional Appl. Ser. No. 63/045,535 titled "Apparatus, Systems, and Methods for Providing a Rapid Threshold Amount of Power to Large Loads During Transfer Between Power Supplies" having a filing date of Jun. 29, 2020, and U.S. Provisional Appl. Ser. No. 63/060,740 titled "Apparatus, Systems, and Methods for Providing a Rapid Threshold Amount of Power to Large Loads During Transfer Between Power Supplies" having a filing date of Aug. 4, 2020 and the subject matter of which is incorporated herein by reference.

CROSS-REFERENCES

Not applicable.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISK

Not applicable.

TECHNICAL FIELD

The present disclosure relates to the field of power management systems, and more specifically to the field of power electronics and energy management systems, particularly, methods and systems for improving the reliability and efficiency of uninterruptible power supply systems, and more specifically to techniques for predictive load compensation and real-time power conditioning, leveraging digital simulations, analog twinning, and artificial intelligence for managing power distribution, reducing voltage fluctuations, and optimizing energy usage in critical electrical systems.

BACKGROUND OF THE INVENTION

Uninterruptible Power Supply (UPS) systems are critical in providing continuous, stable power to sensitive equipment during disruptions in primary power supply. These systems are widely used in industries such as healthcare, data centers, telecommunications, and manufacturing, where even brief power interruptions can lead to catastrophic consequences, including equipment damage, data loss, and operational downtime.

Traditional UPS systems often rely on basic power storage and delivery mechanisms that are reactive in nature, compensating for power fluctuations only after they occur. These systems typically suffer from inefficiencies in managing transient events such as voltage spikes, harmonic distortions, and load changes, which can degrade equipment performance over time. Moreover, conventional power conditioning systems lack real-time adaptability, often requiring iterative recalibrations or relying on static algorithms that fail to account for dynamic load requirements.

Another challenge in existing UPS systems is the inability to accurately predict downstream load requirements or respond preemptively to varying power demands. Current approaches to load compensation are either overly simplistic, leading to overcorrection or undercorrection, or computationally intensive, resulting in delays that hinder system responsiveness. This limitation becomes particularly evident in applications involving highly variable loads, such as in data centers or industrial automation, where power demands fluctuate rapidly.

Further complicating the field is the reliance on discrete, isolated systems that operate without leveraging predictive analytics or real-time feedback from telemetry sensors. While machine learning and digital simulation tools are gaining traction in other areas of engineering, their integration into UPS systems for predictive load compensation remains limited. Additionally, traditional systems often fail to optimize the interplay between primary and secondary power supplies, such as batteries, leading to inefficient energy utilization and increased operational costs.

As a result, there exists a need for improvements over the prior art and more particularly for an adaptive approach to power conditioning and load compensation.

BRIEF SUMMARY OF THE INVENTION

A system and method for conditioning and maintaining power with predictive load compensation using an uninterruptible power supply system is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a method for conditioning and maintaining power with predictive load compensation using an uninterruptible power supply system is disclosed. The method comprises measuring an electrical input from a primary power supply using a plurality of analog sensors. The method involves transmitting the electrical input through an impedance to provide a controlled delay from 1 to 10 milliseconds. In certain embodiments, the controlled delay is more specifically present in an amount ranging from 4 to 5 milliseconds during transmission of power to a first power converter. During the controlled delay, the method includes determining a plurality of input parameters for the electrical input and a plurality of downstream system effects based on sensor data from a plurality of telemetry sensors. The method further comprises generating a first digital identity of the electrical input based on the plurality of input parameters and storing the first digital identity in a connected database. The method determines a plurality of load requirement parameters of a downstream load based on the sensor data from the plurality of telemetry sensors and generates a second digital identity for the downstream load based on the plurality of load requirement parameters. A comparison is made between the first digital identity and the second digital identity to a previously stored third digital identity of an electrical simulation in the connected database. A system simulation is performed using analog twinning based on the comparison between the first digital identity and the second digital identity to the previously stored third digital identity. The method generates a predicted downstream system response to the electrical input based on the system simulation and predicted downstream load requirements and automatically compensates, using a local TensorFlow processing system, a first power converter parameter to modify the electrical input to an intermediate output to satisfy a second power converter input parameter and to actively compensate for a plurality of voltage fluctuations and harmonic distortions. The intermediate output is transferred to a second power converter positioned downstream, wherein a secondary power supply is electrically connected between the first power converter and the second power converter. The secondary power supply comprises a bidirectional high discharge battery comprising at least 2 C that automatically charges using excess energy from the intermediate output if an energy demand from the downstream load is predicted to be low, discharges to supplement the intermediate output if the energy demand from the downstream load is predicted to be high, and remains idle maintaining its current state of charge if the intermediate output is predicted to satisfy the plurality of load requirement parameters. The intermediate output is converted by the second power converter to produce a final output for compensating the downstream load.

The method also comprises performing the system simulation using analog twinning by generating a canonical solution to satisfy the plurality of load requirement parameters in a single iteration by directly comparing the first digital identity and the second digital identity without additional iterative processing cycles and adapting power conditioning parameters based on the canonical solution to preemptively align the intermediate output with the predicted downstream load requirements. The canonical solution is determined by utilizing an analog twin configured to process input parameters and load requirement parameters in real-time, enabling the uninterruptible power supply system to reach a steady-state solution in the single iteration without further recalibration steps. The analog twin utilizes real-time sensor feedback from the plurality of telemetry sensors to establish a deterministic solution pathway, resulting in a predictive alignment of the intermediate output with downstream load requirements based solely on the single iteration. The method includes dynamically making an adjustment to at least one power converter parameter based on the canonical solution achieved by the analog twin, wherein the adjustment is configured to maintain optimal power delivery to the downstream load without successive iterations. The analog twin is pre-calibrated using a historical dataset of input parameters and downstream load requirements to achieve the canonical solution in the single iteration through direct correlation with stored parameter profiles. The method further includes adjusting input and output flows in real-time by controlling a plurality of analog components, wherein the plurality of analog components receives feedback from the plurality of telemetry sensors to modulate the electrical input and the intermediate output.

The method also comprises modulating the electrical input and intermediate output by adjusting at least one variable resistor and capacitor based on the sensor data from the plurality of telemetry sensors to compensate for voltage fluctuations and harmonic distortions. The method continuously monitors the input parameters and load requirement parameters using the plurality of telemetry sensors and adjusts an impedance value within the plurality of analog components in real-time based on the sensor data. The method performs micro-adjustments to the intermediate output at intervals of less than 1 millisecond by altering a resistance and capacitance within the plurality of analog components in response to transient voltage spikes and dips detected by the plurality of telemetry sensors. The method further updates at least one of the first digital identity, the second digital identity, and the previously stored third digital identity based on a plurality of adjustments to compensate the downstream load.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the disclosure and together with the description, explain the principles of the disclosed embodiments. The embodiments illustrated herein are presently preferred, it being understood, however, that the disclosure is not limited to the precise arrangements and instrumentalities shown, wherein.

Like reference numerals refer to like parts throughout the various views of the drawings.

Figure 1:
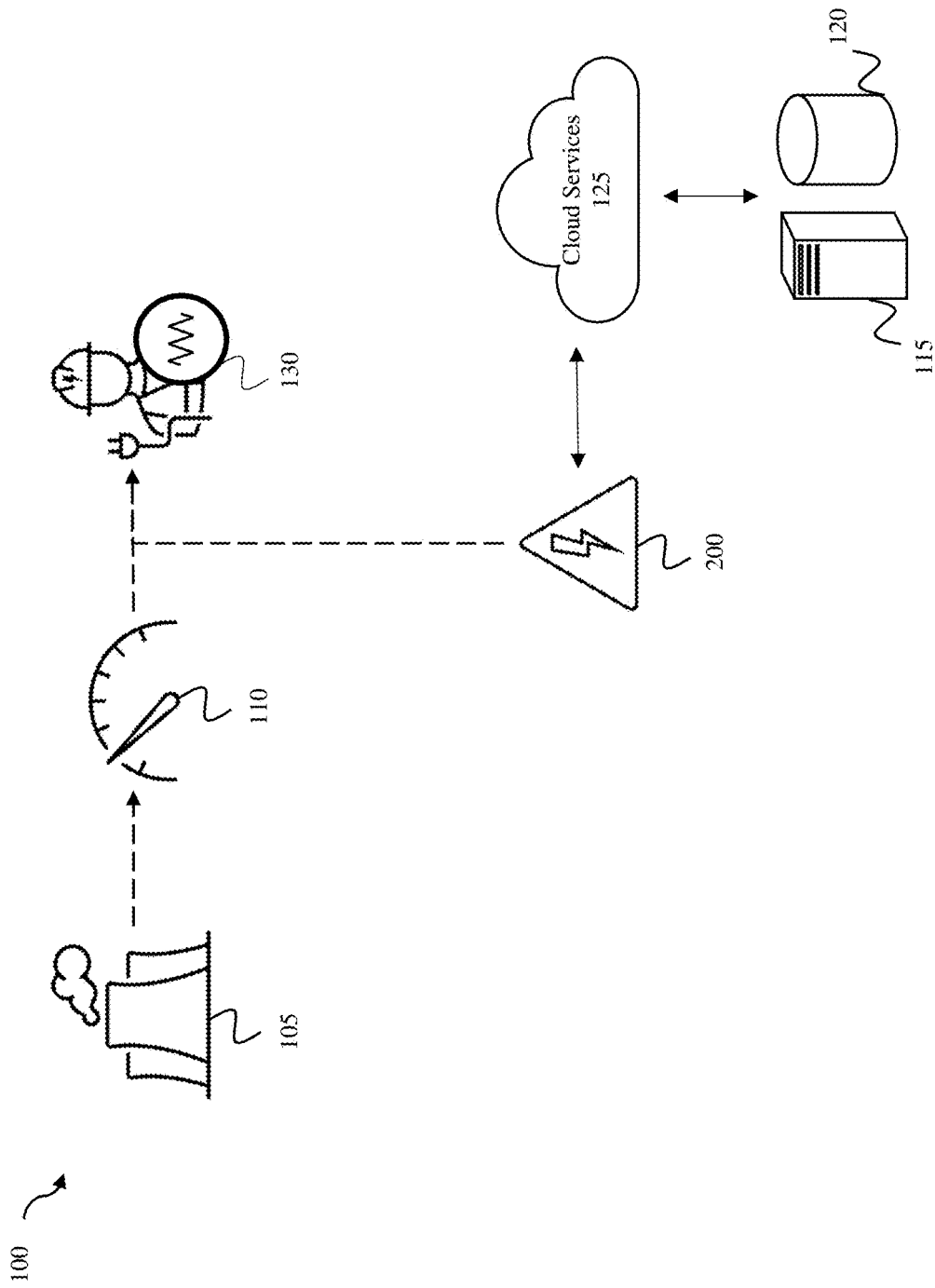
FIG. 1 illustrates a diagram of an operating environment that supports a system for providing a rapid threshold amount of power to customer loads during transfer between a primary power supply and a secondary power supply, according to an example embodiment.

The figures provided herein serve as non-exhaustive, representative examples intended to illustrate the architecture and functionality of the system, including its neural network and machine learning components. While the diagrams effectively depict the structural arrangement of modules, data flows, and high-level processes, they are not exhaustive in capturing the full complexity of the underlying algorithms and computational operations. Neural network functionality, such as the generation of embeddings, multi-dimensional feature space mapping, and the adaptive refinement of predictive models through iterative learning, involves dynamic processes that are difficult to convey in static visual representations. These processes, which are critical to the system's ability to perform real-time analysis and adaptive power conditioning, are therefore described in detail in the specification to complement the figures. This approach ensures a more comprehensive understanding of the system's capabilities, emphasizing that the figures provide illustrative, but not limiting, examples of the invention.

DETAILED DESCRIPTION

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions, or modifications may be made to the elements illustrated in the drawings, and the methods described herein may be modified by substituting reordering or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a predictive, real-time system that eliminates the inefficiencies and limitations of existing methods. Traditional UPS systems primarily rely on reactive approaches to power conditioning, addressing fluctuations, distortions, and load variations only after they occur. These systems often depend on iterative recalibration processes or pre-defined static algorithms that fail to adapt dynamically to changing load requirements or transient events. One improvement is the integration of digital identities for both the electrical input and downstream load, allowing the system to precisely model and predict downstream responses. This capability is enhanced through the use of analog twinning, which enables the system to generate a canonical solution in a single iteration. Unlike prior art that requires multiple iterative cycles to stabilize, the disclosed method achieves a steady-state solution without additional recalibration, ensuring faster and more accurate load compensation.

The disclosed system and methods also leverage real-time telemetry sensor feedback to dynamically adjust power conditioning parameters, including impedance, resistance, and capacitance, in response to transient voltage fluctuations and harmonic distortions. This real-time adaptability far surpasses conventional systems, which are often limited to delayed or generalized adjustments that fail to account for transient conditions effectively. The integration of a TensorFlow-based processing system and machine learning algorithms further distinguishes the invention from prior art. By utilizing historical datasets and continuous neural network training, the system proactively predicts load requirements and optimizes power delivery without the need for manual intervention or predefined thresholds. This approach ensures efficient power utilization, reduces energy wastage, and extends the lifespan of the system components.

Another notable improvement is the inclusion of a bidirectional high-discharge battery in the secondary power supply. Unlike traditional UPS systems that operate with rigid charging and discharging cycles, the disclosed system enables adaptive energy management. The bidirectional battery charges, discharges, or remains idle based on predicted load requirements, ensuring optimal energy usage and improved system efficiency. The method also introduces micro-adjustment capabilities, performing adjustments at intervals of less than one millisecond. This enables precise compensation for transient events such as voltage spikes and dips, which are typically beyond the resolution of conventional systems.

By incorporating these advanced features, the disclosed invention provides a more efficient, adaptable, and predictive power conditioning system, overcoming the reactive, iterative, and static limitations of prior art. These improvements result in enhanced power delivery stability, reduced energy losses, and greater reliability for downstream loads, particularly in environments with highly dynamic power demands.

Referring now to the Figures, FIG. 1 is an operating environment 100 for system 200 and method (300 in FIG. 3) for conditioning and maintaining power transmitted to a customer load from at least one of a primary power supply and a secondary power supply, according to an example embodiment. The operating environment 100 that supports the system 200 includes a primary power supply 105 connected to a meter 110, the system 200 connected to a customer load 130, and the system 200 in communication with cloud services 125 where the cloud services may include communication with at least one server 115 and at least one database 120.

It is understood that cloud services may include a communications network. Communications network may include one or more packet switched networks, such as the Internet, or any local area networks, wide area networks, enterprise private networks, cellular networks, phone networks, mobile communications networks, or any combination of the above.

The server 115 may include a software engine that delivers applications, data, program code and other information to networked devices. The software engine of server may perform other processes such as transferring multimedia data in a stream of packets that are interpreted and rendered by a software application as the packets arrive. FIG. 1 further shows that server 115 includes a database or repository 120, which may be a relational database comprising a Structured Query Language (SQL) database stored in a SQL server or a database that adheres to the NoSQL paradigm. It is understood that other components of the system may also include databases.

The primary power supply generally includes electrical utility power from a power plant deriving its energy from a variety of sources including, but not limited to, nuclear energy, coal, natural gas, fossil fuel, solar, and wind energy. Transformers, sub stations, power generation plants, utility transmission systems, feeder systems and other utility power supply components may also be included in the primary power supply or primary power supply grid. The primary power supply 105 is usually maintained and operated by local and national regulatory authorities. The primary power source is connected to meter 110 which is configured to measure the amount of electricity distributed to the customer. There are two connection points on the meter, including the connection to the primary power supply and the connection that leads to distribution to the customer load 130. In one embodiment, the customer load is at least five hundred kilowatts.

The meter is usually owned by the utility company operating the primary power source, and it is also responsible for installing, maintaining, and reading the meter. Thus, any connections on the primary power supply side of the meter by anyone other than the utility company is considered tampering. Therefore, system 200 is connected on the customer side of the meter. The meter used herein may include a metering system. A meter is a device or system that measures the amount of electric energy consumed by a residence, a business, or an electrically powered device. Large commercial and industrial premises may use electronic meters which record power usage in blocks of half an hour or less. These meters may be confirmed to measure one, two or three phase power. The meters may include digital meters and metering systems, smart meters and metering systems, electronic meters and metering systems, electromechanical meters and metering systems, accumulation meters and metering systems, interval meters and metering systems, industrial flow measurement meters, metered rooms, and vault meter systems. However, it is understood that other types of metered systems may be used and are within the spirit and scope of the present invention.

On the customer side of the meter, system 200 is connected to the customer load 130. The customer load 130 is generally a residential home, industrial building, or commercial building, each including electronic and appliances that require electrical power to operate. The system is in further communication with cloud services 125 which may include communication to a network. In one embodiment, system 200 may include a network and at least one processer in communication with cloud services 125. Cloud services may include different types of cloud computing systems. The cloud services may include at least one server 115, databases 120, remote processors, computing power, on-demand accessibility functions, and user interfaces without the direct active management by a user. In one embodiment, a network may include both the software and the hardware composing the system. The hardware may include computer electronic devices such as cables, switches, access points, modems, and routers, while the software may include operating systems, applications, firewalls, and the like. The components of system 200 are communicatively interacting with cloud services 125 and the network.

The operating environment for the system may include a wide range of industrial and commercial settings where reliable backup power is essential. For example, the system may be used in telecommunications facilities, data centers, power plants, medical facilities, transportation systems, military operations, and other applications where uninterrupted power supply is necessary.

In one embodiment, the system may be designed to operate in a temperature range of −20° C. to 60° C. with a humidity range of 0% to 95%. The system may also be designed to operate in harsh environmental conditions such as high altitude, extreme temperatures, high levels of dust or other particulate matter, and exposure to chemicals or other hazardous materials.

The system may also be designed for easy installation and maintenance in various operating environments. For example, the system may include modular components that can be easily replaced or upgraded as needed and may have a user-friendly interface for monitoring and controlling the system's performance. Additionally, the system may have built-in diagnostic capabilities for detecting and troubleshooting any issues that may arise during operation, as well as the ability to send alerts and notifications to operators or maintenance personnel.

In some embodiments, the system may also be designed for mobile or remote deployment, such as in disaster response scenarios, military operations, or other applications where portable power is necessary. The system may be compact, lightweight, and durable for easy transportation and deployment in these environments.

Figure 2:
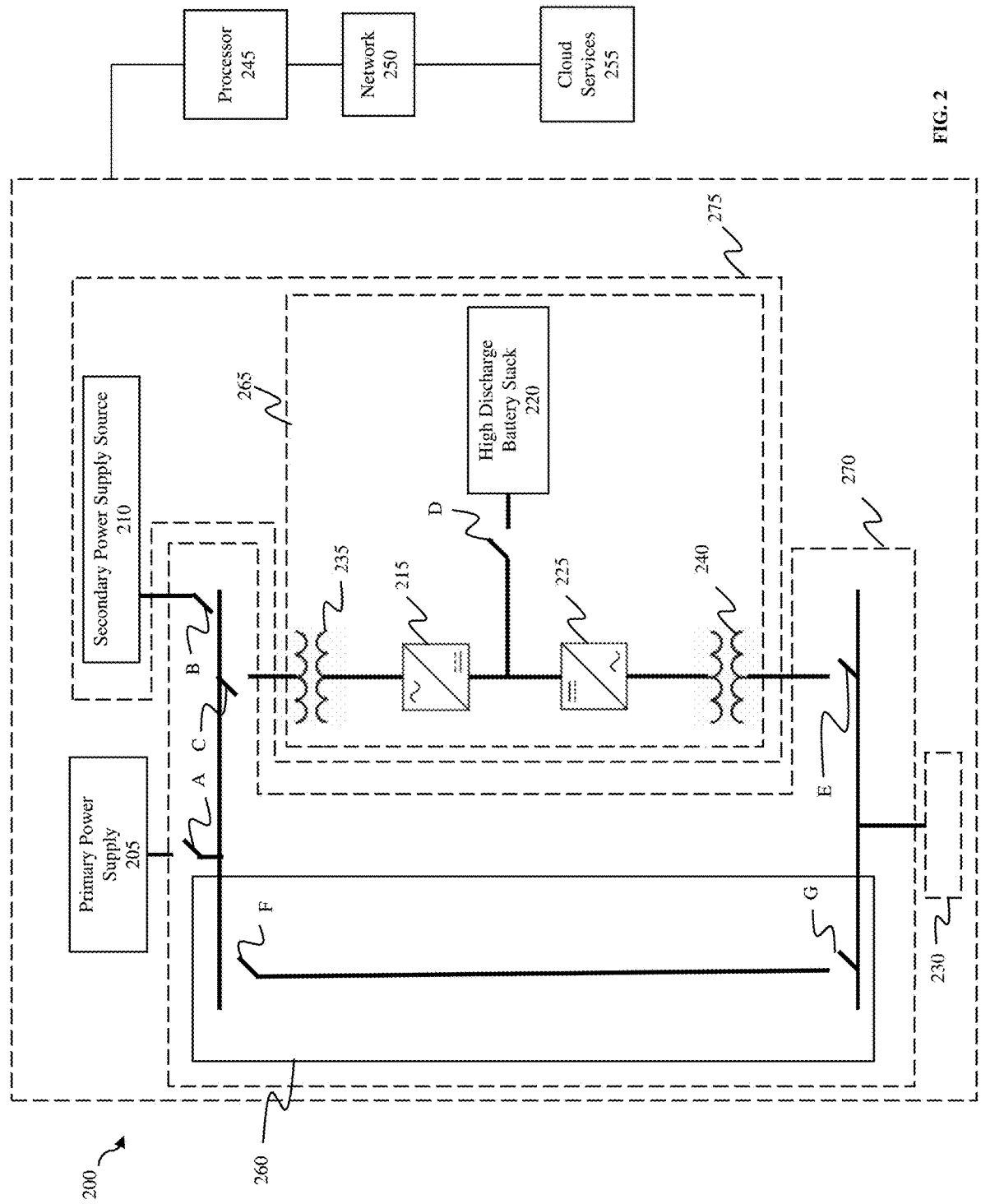
FIG. 2 is a system for conditioning and maintaining power transmitted to a customer load from at least one of a primary power supply and a secondary power supply, according to an example embodiment.

Referring now to FIG. 2, a power conditioning and maintenance system 200 is provided for conditioning and maintaining power transmitted to a customer load from at least one of a primary power supply and a secondary power supply. The disclosed system includes several interconnected elements that work together to provide reliable and efficient power delivery. The system includes a primary power supply 205, which may be utility power connected to the electrical grid, and a secondary power supply 210, such as a backup generator or renewable energy source. The system further comprises an inverter or converter 215, which is configured to receive inputs from the primary and/or secondary power supplies and convert the power into a suitable form for delivery to the customer load 230. The inverter or converter may also include monitoring and control circuits to ensure that the power is delivered efficiently and safely. In addition, the system includes at least one high discharge battery stack 220, which is configured to store excess power from the primary and/or secondary power supplies and discharge the stored energy during periods of high demand. The battery stack may also be used as a backup power source in the event of a power outage or other interruption to the primary power supply. The power output from at least one of the inverter or converter or the at least one high discharge battery stack is then transmitted to a second converter or inverter 225 and then to the customer load 230.

Inverter and/or converters 215 and 225 are illustrated as a symbol comprising a square divided diagonally with a dashed line in the upper-left section and a sinusoidal wave in the lower-right section represents a system component designed to process or manipulate both digital and analog signals. The dashed lines in the respective section signify digital processing capabilities, while the sinusoidal wave in the opposing section indicates analog outputs or waveform characteristics. The dashed line indicates the connection to the battery, signifying the DC interface, while the sinusoidal wave represents the connection to the AC side of the system. This symbol is used to denote a bidirectional power interface or conversion component that facilitates energy transfer between the battery and the AC load or supply. This symbol is intended to illustrate the integration of hybrid processing functionalities, such as signal conditioning, waveform transformation, or control parameter adjustments. This component specifically operates as a hybrid interface, seamlessly bridging analog and digital domains to enhance the real-time responsiveness and accuracy of the system.

In some embodiments, the primary power supply may be a utility power supply, which may be unreliable and have power that is subject to voltage spikes, noise, and other issues. Such a power supply may cause damage to the electrical devices and systems connected to it, resulting in the malfunctioning of these systems. To address this issue, the present system may a first impedance 235 and second impedance 240 that helps to provide clean power by isolating the customer load from the primary power supply. The first impedance is electrically connected between the converter and at least one of (i) the primary power supply and (ii) the secondary power supply.

In various embodiments, the impedance, such as the first impedance (235) and second impedance (240), may be implemented using resistive, inductive, capacitive, or combined impedance elements, depending on the specific requirements of the system. In one embodiment, the impedance may comprise resistors to provide linear resistance for basic isolation and damping of voltage fluctuations. In another embodiment, the impedance may include inductors or inductive components, such as ferrite core inductors or air-core inductors, to block high-frequency noise and transients, thereby ensuring smooth power delivery. Alternatively, the impedance may include capacitors, such as ceramic capacitors, electrolytic capacitors, or film capacitors, to provide filtering of low-frequency transients and stabilization of the power waveform. In certain embodiments, a combination of inductive and capacitive elements may form circuits that are configured as low-pass filters, high-pass filters, or band-stop filters to suppress harmonic distortion and other electrical disturbances. In yet another embodiment, the impedance may be realized as an isolation transformer, which electrically separates the primary power supply from the downstream load while providing impedance matching, voltage regulation, and harmonic suppression. Additionally, dynamic impedance devices, such as thyristors or insulated gate bipolar transistors combined with passive components, may be employed in embodiments requiring adaptive or variable impedance to respond to changing load conditions. These various embodiments enable the system to maintain clean, stable power delivery while isolating the customer load from disturbances originating in the primary power supply.

The impedance may remove any electrical noise or voltage spikes that may be present in the primary power supply, thereby ensuring that the customer load is not affected by any such fluctuations in the power supply. This can help to ensure the smooth and uninterrupted operation of the customer load, while also protecting it from any potential damage due to voltage spikes or other issues that may be present in the primary power supply. In embodiments where the impedance includes an isolation transformer, the isolation transformer is a type of transformer that is designed to transfer electrical power from a source of alternating current (AC) power to a device or circuit while providing electrical isolation between the two. It works by using two separate coils of wire, one for the input and one for the output, which are wound on a common magnetic core. The primary coil is connected to the source of AC power, while the secondary coil is connected to the device or circuit that needs power. The two coils are electrically isolated from each other, meaning that there is no direct electrical connection between the primary and secondary sides of the transformer. This allows for electrical isolation and can help protect against electrical shocks, reduce electrical noise, and prevent ground loops. Isolation transformers can also be used to step up or step-down voltage levels, depending on the number of turns in the primary and secondary coils.

The system may further include at least one processor, such as remote processor 245, which may be a microprocessor, a digital signal processor (DSP), a field programmable gate array (FPGA), an application specific integrated circuit (ASIC), or any other suitable computing device. The processor may be programmed to perform various functions, such as monitoring primary power supply parameters, determining whether a primary power supply parameter threshold is satisfied, controlling the operation of the switch gates, and performing other necessary computations to ensure proper operation of the system. The processor may be connected to other components of the system via one or more communication buses and may be programmed using any suitable programming language or development environment. In some embodiments, the processor may be remotely located and communicate with the system via a network connection, such as a local area network (LAN), a wide area network (WAN), or the Internet. Processor 245 may be configured to receive real-time input on the status of the primary power supply and communicate with the converter to adjust power delivery as needed. Together, these elements provide a robust and flexible power delivery system that can meet the needs of a wide range of applications and operating environments.

In some embodiments, the system includes at least one processor that is connected to a network 250 and cloud services 255. The at least one processor may be connected to the network via any suitable means, such as a wired or wireless connection, and may be configured to communicate with other devices and systems on the network. The cloud services may be accessed via the network and may provide a variety of services, such as data storage, processing, and analysis, as well as remote access to the system and its components. The at least one processor may be configured to communicate with the cloud services and may utilize the services to perform various functions, such as data analysis and system monitoring. In some embodiments, the at least one processor may include one or more microprocessors, microcontrollers, or other computing devices, and may be programmed with software or firmware to perform various functions related to the operation and control of the system. The at least one processor may also be connected to various sensors, data sources, and other components of the system to facilitate data collection, processing, and analysis.

Connecting the system to a network and/or cloud services can provide numerous benefits such as remote monitoring, data analysis, and control. It allows for real-time monitoring of the system's performance and health, which can help detect and prevent potential issues. Additionally, cloud services can provide access to large-scale computing power, enabling advanced data analysis and machine learning algorithms to optimize system performance and energy efficiency. The network connection can also facilitate communication and coordination between multiple systems, allowing for better overall management and control of the power distribution network.

The system may also include a switching module 270, a global bypass 260, a secondary power supply 275, and an energy storage system 265. In one embodiment, the switching module 270 is configured to route power between the primary power supply 205, secondary power supply 210, and downstream loads. The switching module may operate in real time to isolate or combine power sources, enabling rapid transition between supplies during outages or transient events. In another embodiment, the switching module 270 may include mechanical relays, solid-state switches, or semiconductor devices such as thyristors to enable high-speed switching with minimal power loss.

The global bypass 260 serves as an alternate pathway for power delivery, allowing the primary power supply 205 to bypass the secondary power supply 210 and energy storage system 265 in specific operational scenarios, such as maintenance or system failures. In one embodiment, the global bypass 260 may include manual or automatic switches to redirect power. In another embodiment, the bypass may include monitoring and control features that ensure continuous power delivery without compromising system stability or safety.

The secondary power supply 270 includes both the secondary power supply source 210 and the energy storage system 265, working in conjunction to provide reliable backup and supplemental power to the system during outages, peak loads, or when the primary power supply 205 is insufficient. These components operate in a coordinated manner to ensure seamless power delivery and maintain system stability.

The secondary power supply source 210 functions as the primary component of the secondary power supply 270, providing energy to the system independently or in conjunction with the energy storage system 265. In one embodiment, the secondary power supply source 210 may include a generator, a renewable energy source (such as solar panels or wind turbines), or a bidirectional power inverter. This source serves as the immediate alternative to the primary power supply 205 when transitioning power delivery. In another embodiment, the secondary power supply source 210 may operate in tandem with the primary power supply to provide load-sharing capabilities, reducing strain on the primary system during high-demand periods.

The energy storage system 265 complements the secondary power supply source 210 by providing stored energy during transient events or when immediate demand exceeds supply. In one embodiment, the energy storage system 265 includes a high-discharge battery stack 220 capable of bidirectional power flow, allowing it to charge during periods of excess energy and discharge to stabilize power delivery during shortages. In another embodiment, the energy storage system 265 may incorporate advanced battery technologies such as lithium-ion or solid-state batteries to improve energy density, response time, and reliability.

The secondary power supply 270 leverages the combination of the secondary power supply source 210 and the energy storage system 265 to ensure uninterrupted power delivery. During normal operation, the energy storage system may remain on standby, charging as needed, while the secondary power supply source 210 operates as the primary backup to the primary power supply 205. In scenarios where the primary power supply fails, the energy storage system 265 can instantly discharge power to bridge the gap while the secondary power supply source 210 ramps up to meet demand. This integrated operation ensures a smooth transition between power sources, maintaining clean and reliable power delivery to critical systems.

As shown in FIG. 2, the system includes a plurality of switch gates defining a switching module, such as switch gate A, switch gate B, switch gate C, switch gate D, switch gate E, according to an example embodiment. In additional embodiments, the system may include switch gate F and switch gate G. A switch gate, as used in the present disclosure, refers to an electronic component that can be used to control the flow of electrical current in a circuit. The switch gate can be configured to allow current to flow through the circuit when it is closed and to interrupt the flow of current when it is opened. The switch gate can be controlled by an electronic signal, such as a voltage or current signal, to selectively turn it on or off. In various embodiments, the switch gate can be implemented using a transistor, a relay, or any other suitable electronic component capable of selectively controlling the flow of electrical current in a circuit.

If the first input is received at the converter from the primary power supply, then the method disclosed herein includes transmitting power across a first switch gate A, which is normally closed, across a third switch gate C, across a first isolation transformer to the converter, then to the inverter, and then across a second isolation transformer and a fifth switch gate E to the customer load.

If the first input is received at the converter from the secondary power supply, then the method includes closing a second switch gate B thereby electrically connecting the secondary power supply to the converter and adjusting the at least one converter power parameter such that power is transmitted from the secondary power supply to the converter to the at least one high discharge battery stack for charging the at least one high discharge battery. The at least one high discharge battery stack is discharged to the inverter and power is transmitted to the customer load. In certain embodiments, the high discharge battery stack is connected between the converter and the inverter by switch gate D, which is normally closed.

Within the system, certain switches may act as maintenance switch gates to disconnect certain electrical components from the system to isolate other components and/or perform maintenance on the system. For example, switch gates C, D, and E are all maintenance switch gates to respectively isolate the power supplies and/or the load from the energy storage system and/or isolate the at least one high discharge battery stack.

In the another example embodiment, switch gate F and switch gate G are normally open; this is the global bypass 260. The at least one processor will send a signal to close switch gate F and switch gate G during at least one of system maintenance and system failure of at the at least one inverter, inverter/converter 215, 225, thereby creating a global bypass 260 for the system. The system will the reroute the electrical energy from the secondary power supply source 210 through the global bypass instead of transferring the electrical power across switch gate E. Additionally, if the at least one processor determines that system maintenance needs to be performed on the energy storage system 265, then the at least one processor will transmit a signal to open switch gate C and switch gate D, which are normally closed. By opening switch gate C and switch gate D, the energy storage system is isolated from any power supply, namely, primary power supply 205 and secondary power supply source 210, and the customer load 230. In additional embodiments, the processor may be configured to open switch gate D to isolate the inverter/converter system of the energy storage system from the at least one high discharge battery stack 220. By incorporating the switch gates in the specific arrangement as disclosed, the system eliminates the possibility of accidental contact with live electrical components, reducing the risk of injury or electrocution during maintenance and/or repair. Additionally, the system improves over the prior art by allowing the processor to determine when it is necessary to disconnect certain components from the circuit to mitigate the risk of damage to electrical components. For example, it the processor determines that the at least one primary power supply parameter is representative of unstable power (e.g. power surges and voltage spikes), then the at least one processor may disconnect the primary power supply from the energy storage system by opening switch gate C, similarly, if the customer load includes sensitive equipment, then the at least one processor may want to ensure that the customer load is only receiving power clean of voltage drops and spikes to eliminate the harm of damage to the load.

Electrical power from the primary power supply 205 is configured to transfer across switch gate C, which is normally closed in the shown embodiment, to the energy storage system 265, and across a first impedance 235 to the first inverter/converter 215. Where the primary power supply includes alternating current, inverter/converter 215 will output direct current. The electrical power then transmits across inverter/converter 225 amplifying the power. The electrical power then transmits across the second impedance 240 and the switching module 270. In this embodiment, the energy storage system remains energized at least up until the second impedance. Switch gate D is closed and connected to the high discharge battery maintaining the connection with within the system to be able to rapidly discharge the power from the high discharge batteries, and/or charge or discharge the batteries to provide clean power to the load when the at least one processor is transferring between the primary power supply and the secondary power supply. The system having two inverters/converters and at least one impedance cleans the electrical energy from the primary power supply such that it is free from voltage spikes and drops while transmitting to the load. This two-inverter/converter system eliminates the need for many different components of certain electrical systems.

When the at least one processor determines the at least one primary power supply parameter fails to satisfy the respective primary power supply parameter threshold, the at least one processor will switch to the secondary power supply source 210 by sending at least one second signal to the switching module. The at least one second signal may include closing and opening a plurality of switch gates. For example, in one embodiment, the second signal may be configured to close switch gate B and open switch gate A (normally closed). The at least one processor may send at least one second signal to the at least one inverter, such as inverter/converter 215, biasing the voltage and causing the high discharge battery to discharge. The high discharge battery will then rapidly discharge electrical power to the load from the high discharge battery 220, to the inverter/converter 225, and across the second impedance 240, across the switching module 270, to the load 230. When the at least one processor switches to the secondary power supply source, the power from the secondary power supply source transmits across switch gate B and C to the energy storage system, through inverters/converters 215 and 225, across the switching module 270, to the load. Thereby, the electrical power transmitted to the load from the secondary power supply source is cleaned to remove voltage spikes and drops across the system.

Figure 3:
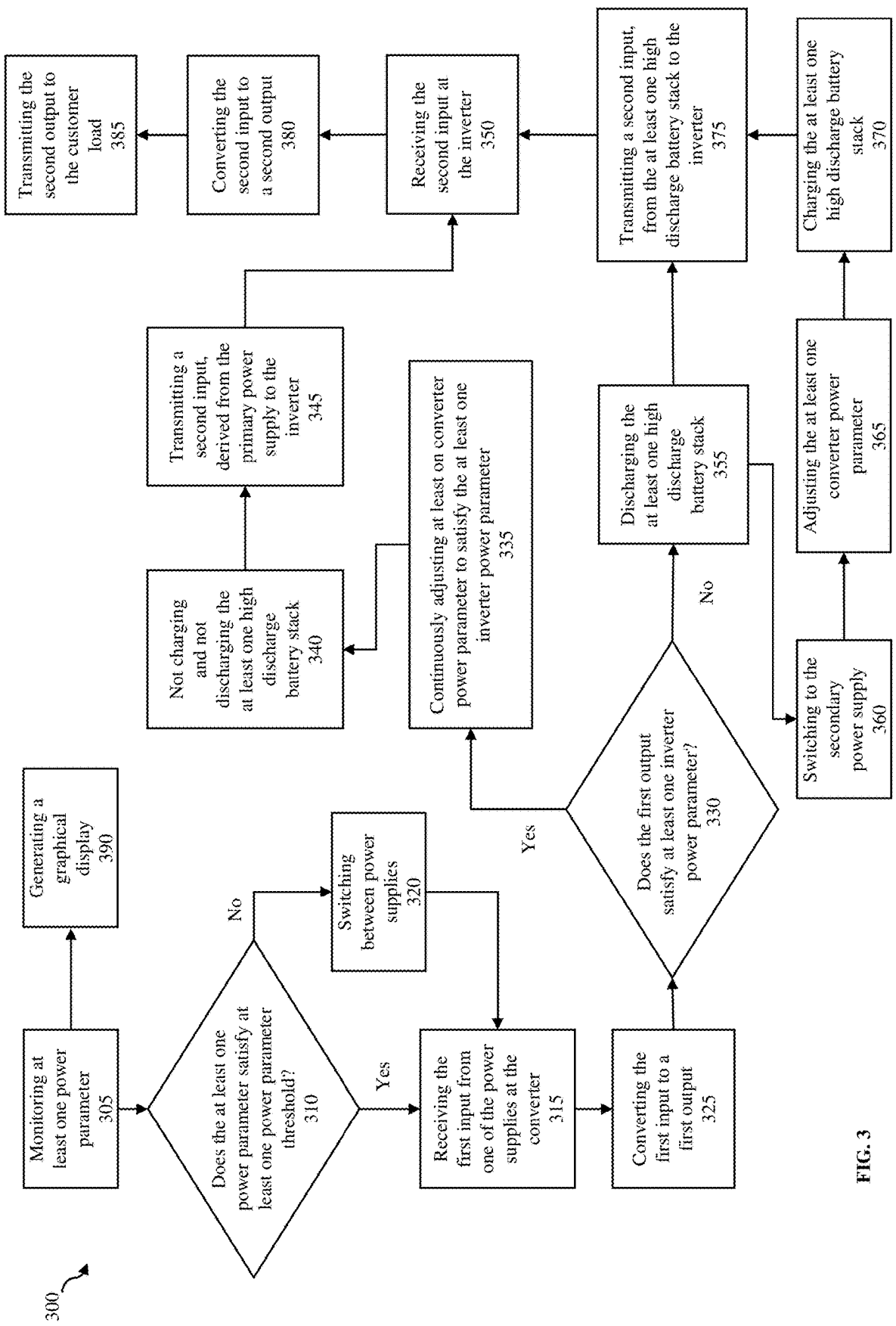
FIG. 3 is a box-diagram of a method for conditioning and maintaining power transmitted to a customer load from at least one of a primary power supply and a secondary power supply, according to an example embodiment.

Referring now to FIG. 3, a box-diagram of a method 300 for conditioning and maintaining power transmitted to a customer load from at least one of a primary power supply and a secondary power supply is shown according to an example embodiment. It should be understood that the various steps of the method disclosed herein may be performed in any suitable order, either sequentially, simultaneously, or in any other suitable manner. Moreover, various embodiments of the invention may include fewer or additional steps or may incorporate substantially similar steps with different underlying details or parameters. Additionally, it should be understood that various embodiments of the invention may include one or more features or components that may be used independently of one another or in combination with other features or components. Furthermore, various modifications and substitutions may be made to the disclosed embodiments without departing from the scope of the invention. Therefore, the embodiments of the invention described herein are not intended to be limiting and are to be considered as merely illustrative of the invention as defined by the claims appended hereto.

In certain embodiments, it is important to note that certain steps within the method described above may interrupt or impact the progression of other steps. These interruptions may occur when specific conditions or criteria are met, allowing for temporary pauses or alterations in the overall sequence of operations. Such dynamic behavior enables the system to handle unexpected events, prioritize critical tasks over non-essential ones, and enhance overall operational efficiency.

In an example embodiment, method 300 includes monitoring, at step 305, at least one primary power supply parameter. The term primary power supply as used herein refers to a power source that is typically considered the primary source of power for a customer load. The primary power supply is a source of electrical power that is directly connected to the system for transmitting power to the customer load in a normal state of operation. The primary power supply may include any type of power source that provides electrical power, such as a utility grid, a generator, or a renewable energy system. This may include, for example, a power grid, a utility power source from a utility company, or other electrical power sources that are not considered to be backup power sources.

The system may include a monitoring system for monitoring at least one primary power supply parameter. The primary power supply parameter can be at least one of a voltage range, a frequency range, a power factor, a phase angle, a distortion presence, a distortion range, a cost for power, a time of day of power transmission, and an overall consumer demand level, total loss of power, and environmental gasses. The monitoring system may include a plurality of sensors configured to receive various signals within the system to determine the methods to perform herein.

In a particular embodiment, the primary power supply may include one or more transformers, inverters, or other components for converting and conditioning the electrical power before it is transmitted to the system. The primary power supply may also include one or more sensors or monitoring devices for measuring and transmitting real-time data on various power parameters, such as voltage, current, frequency, and power factor, to the system. The primary power supply parameter includes at least one of (i) a voltage range, (ii) a frequency range, (iii) a power factor, (iv) a phase angle, (v) a distortion presence, (vi) a distortion range, (vii) a cost for power, (viii) a time of day of power transmission, and (ix) an overall consumer demand level.

The primary power supply may be characterized by various primary power supply parameters, which are measurables of the signals of the primary power supply, including voltage, current, frequency, phase angle, power factor, and other power quality parameters. The primary power supply may also be subject to various external factors such as consumer demand, time of day, and cost of power.

In the example embodiment, step 310 includes determining whether at least one primary power supply parameter fails to satisfy a respective primary power supply parameter threshold. The primary power supply parameter threshold refers to a predetermined limit for one or more parameters associated with the primary power supply. The primary power supply parameter threshold can be a maximum or minimum value that is set based on the specifications of the system and the requirements of the customer load. Examples of primary power supply parameters that may have corresponding thresholds include voltage, frequency, and current. The primary power supply parameter thresholds can be set by a processor, either on the system or remotely, and can be adjusted based on the needs of the system or the customer load. The primary power supply parameter thresholds serve as a means for monitoring the primary power supply to ensure that it is operating within acceptable limits and for triggering corrective action if any parameter falls outside the established threshold.

If the at least one primary power supply parameter satisfies the respective primary power supply parameter threshold, then receiving, at step 315, at the converter a first input from the primary power supply. If a primary power supply parameter threshold is satisfied, it means that the measured value of the corresponding parameter of the primary power supply is within an acceptable range. The acceptable range can be pre-determined and set based on the specific parameter being monitored and the requirements of the system. If the measured value falls within this range, it is considered satisfactory, and the system can continue to operate normally. However, if the measured value falls outside of this range and does not satisfy the primary power supply parameter threshold, it may indicate a fault or potential issue with the primary power supply, and further action may be required such as switching to the secondary power supply or initiating a shutdown procedure to prevent damage to the system.

Similarly, if the at least one primary power supply parameter fails to satisfy the respective primary power supply parameter threshold, then receiving, at the converter, the first input from the secondary power supply. If a primary power supply parameter threshold is not satisfied or fails to satisfy the respective primary power supply parameter threshold, then it means that the parameter value has exceeded the predetermined threshold limit. This indicates that the primary power supply is not providing the required power parameter level, which can result in an unreliable or unstable power supply. In such a scenario, the system may trigger a corrective action, such as a switch to a secondary power supply, to ensure that the customer load is powered properly and without any interruption.

In certain embodiments, the method may include implementing artificial intelligence such that the system will utilize predictive analytics and data extrapolation to determine likelihoods of downstream electrical failure and/or a likelihood that the at least one power parameter will be outside the optimal threshold or range. Based on the projected electrical outcome, the system switches to the energy storage system, namely the at least one high discharge battery stack, prior to any respective power parameter failures or exceeded ranges.

The method may include utilizing an artificial intelligence and machine learning systems comprising a communications network, at least one processor, a neural network, and a connected to a database. The method may include storing information related to, including but not limited to, power supply parameters, historical system performance data, information relating to the components of the system and the downstream connections of the system, on the connected database. The artificial intelligence and machine learning systems may further comprises utilizing proprietary algorithms and the real-time transmission of information from upstream and downstream electrical systems. Upstream electrical systems refer to the components, devices, or circuits that come before a specific point in an electrical system's flow or direction. In the context of the present disclosure, upstream means on the utility side of the meter, namely, the primary power supply and/or the electrical grid closer to the initial power source or the point where the electrical energy is generated or supplied. Opposite, downstream electrical systems may include components, devices, or circuits that come after a specific point in an electrical system's flow or direction. In the context of the present disclosure, downstream refers to the electrical connection on the customer-side of the meter, namely the components of the system and/or the customer load.

At step 305, the system is monitoring the at least one power supply parameter. In certain embodiments, for example, the artificial intelligence system may calculate, using at least one proprietary algorithm, a projected amount of upstream environmental gases produced in the transmission of power. Environmental gases, in the context of energy generation and transmission, refers to the various gases emitted during the processes of power generation, transmission, and distribution that may have environmental impacts. These gases can include but are not limited to carbon dioxide ($CO_2$), sulfur dioxide ($SO_2$), nitrogen oxides (NOx), methane ($CH_4$), and other pollutants released as byproducts of combustion or other energy generation methods. Environmental gases are of concern due to their contribution to climate change, air pollution, and their potential effects on human health and the environment. By predicting the environmental gasses used to generate the power needed for the system, the system may determine, during times when the environmental gas levels exceed a maximum threshold level, when to switch to an alternative power supply, namely, the at least one high discharge battery stack and the secondary power supply. The use of predictive analytics to monitor and manage environmental gases is a crucial aspect for sustainable energy practices and regulatory compliance in the energy sector.

Additionally, based on the at least one primary power supply parameter, the method may include simulating downstream effects on the system. As the system trains and updates a neural network, the system may determine peak times where primary power supply parameters are expected to exceed their respective ranges and thresholds. For example, the system may determine that the harmonics of the incoming power transmission are more likely to exceed the optimal or safe ranges during a certain time of day, weather conditions, or season. This would result in the system prematurely determining whether the primary power supply parameter and/or the first output will satisfy the at least one inverter power parameter, thereby predicting any potential downstream failures, inconsistencies, and inefficiencies of the system. Based on the simulation of the downstream electrical components, the system may activate the switching mechanism to isolate components and/or switch between power supplies before a downstream failure and/or inefficiency occurs. Another example includes training the neural network and artificial intelligence system to determine when the costs of the incoming transmission of power are expected to exceed the cost of utilizing the power of the energy storage system, namely, the at least one high discharge battery stack and the secondary power supply. The system may predict that, based on the monitored power supply parameters, that costs for utility power are expected to rise and therefore prematurely switch to the energy storage system to prevent excess costs for the customer in supplying power to the customer load. It is understood that the system will continuously update and train the neural network to improve the predictive analytics of the artificial intelligence and machine learning system.

The prior art fails to comprehensively detect and address the complexities of power quality issues, including harmonics and other primary power supply parameters, especially when they originate from upstream sources and or downstream sources. The use of artificial intelligence to predict downstream effects on the system based on upstream power supply parameters is an improvement over the prior art. The disclosed system solves the problem of detecting power quality issues originating from downstream sources by including a plurality of converters and/or inverters configured to prevent the backflow transmission of energy upstream. This mitigates potential disruptions and ensuring stable power transmission. By harnessing the capabilities of artificial intelligence, system can analyze vast amounts of data to improve the overall efficiency of the system. The system can learn and understand patterns and correlations that may be challenging for human operators to detect manually and which may be challenging for current systems to avoid prior to experiencing electrical failures and power quality issues. By continuously processing real-time data from multiple points in the grid, the system can predict potential disturbances caused by harmonics or deviations in other primary power supply parameters and alert operators to emerging issues, allowing for proactive measures to be taken. By simulating and modeling complex electrical interactions, the system can reveal potential risks and vulnerabilities related to different power supply parameters. These simulations enable a deeper understanding of downstream electrical effects that could arise from various load conditions and system configurations. The system not only enhances grid stability and reliability but also contributes to improved energy efficiency. By optimizing load management and power distribution based on artificial intelligence-driven insights, energy wastage can be minimized, leading to more sustainable and cost-effective power delivery to achieve greater efficiency, reliability, and resilience, making way for a smarter and more adaptive electrical infrastructure.

In certain embodiments, the method includes step 320, switching between the primary power supply and the secondary power supply. The system may include a first switch gate A connected between the primary power supply and the converter. The first switch gate A may be controlled by a control signal to selectively connect or disconnect the primary power supply to the converter. The control signal may be generated by a processor based on the monitoring of the primary power supply parameter. In an exemplary implementation, the first switch gate A may be a semiconductor device, such as a MOSFET or an IGBT, which allows for fast switching times and high efficiency. The use of the first switch gate A provides an additional level of control and protection to the system, allowing for selective disconnection of the primary power supply in the event of a primary power supply parameter threshold being exceeded or not being satisfied. This helps to prevent damage to the converter or other components in the system, and to ensure stable and reliable operation of the customer load.

The system may open switch gate A when the primary power supply parameter fails to satisfy the respective primary power supply parameter threshold. This could occur if the primary power supply voltage or frequency falls outside of the acceptable range, for example. Opening switch gate A disconnects the primary power supply from the converter, which prevents any potential voltage spikes or other issues with the primary power supply from being transmitted to the converter and ultimately to the customer load. This can help protect the customer load from damage and ensure that it continues to receive clean, stable power. Otherwise, in normal operation, switch gate A is generally closed.

The system may further include switch gate B electrically connected between the converter and the secondary power supply. Switch gate B is normally open such that the secondary power supply is electrically disconnected from the system, specifically, the converter. However, if there is a failure in the primary power supply, switch gate A would open, at step 320, to disconnect the primary power supply from the converter, and concurrently, at or about the same time, switch gate B would close to connect the secondary power supply to the converter. In operation, this allows the converter to direct the transmission of power from the secondary power supply to the at least one high discharge battery stack for charging the high discharge battery stack because the at least one high discharge battery stack is discharging to supply power to the customer load. This ensures uninterrupted power to the customer load even if there is a failure in the primary power supply. Once the primary power supply has been restored to normal operation, switch gate A would close again, and switch gate B would open to disconnect the secondary power supply from the converter, and the system would resume normal operation.

The converter plays a crucial role in safeguarding the electrical grid from potential back power, ensuring the stability and reliability of the entire system. By functioning as a protective barrier, the converter prevents any reverse flow of electricity from distributed energy sources, such as renewable energy systems or distributed generators, back into the grid. This is particularly important during moments of fluctuating demand and varying generation outputs. The converter effectively manages the direction of power flow, channeling energy from the grid to the distributed sources when needed while restricting any unauthorized reverse flow. By controlling this bidirectional energy exchange, the converter acts as an indispensable guardian, preventing disruptions, overloads, and potential damages to the grid, ensuring a seamless and secure integration of decentralized energy resources.

The secondary power supply is an electrical backup power source that is electrically connected to the system for providing power to the customer load in the event of a failure or inadequacy of the primary power supply. The secondary power supply can be any suitable backup power source, such as a battery bank, a generator, a fuel cell, or any other power source that is capable of providing power to the customer load. Examples of secondary power supplies include, but are not limited to, batteries, fuel cells, solar panels, wind turbines, generators, and other sources of electrical power that can be electrically connected to the converter.

The secondary power supply may be connected to the system via a switch gate that can be closed to electrically connect the secondary power supply to the converter. The secondary power supply can be continuously monitored to ensure its readiness to supply power when needed. Generally, the secondary power supply is an alternative, off-gird, power or energy source. In the context of the present disclosure, when the power supplied from the secondary power supply is engaged by the system, the system is configured to use said power to charge a high discharge battery stack. The high discharge battery stack, further discussed below, provides the necessary energy to support the customer load when the primary power supply is unavailable, unreliable, or not suitable to meet the needs and demands of the customer load or satisfy at least one inverter power parameter.

Next, the power from at least one of the primary power supply and the secondary power supply is transmitted across the first inverter and received by the converter at step 315. The system includes a converter for converting a first input received from at least one of the primary power supply and the secondary power supply to a first output. The converter is electrically connected to an inverter for converting a second input from at least one of the converter and at least one high discharge battery stack to a second output. The inverter is further electrically connected to the customer load for supplying power to the customer load.

In the context of the described method and system, the first input is generally an electric power signal received by the converter from at least one of two sources: the primary power supply or the secondary power supply. The first input may include various power supply parameters such as voltage, current, frequency, and phase angle, among others, depending on the type and characteristics of the power supply. The first input may be in the form of alternating current (AC) or direct current (DC) depending on the type of power supply and the design of the system. In general, the first input serves as the initial power source for the converter to condition and maintain the power transmitted to the customer load. Specifically, in one embodiment, the first input is a parameter of a signal received at the converter in the form of alternating current.

A converter is a device that is used to convert power from one form to another. In the context of the present invention, the converter is an electrical device that is used to convert the input power from at least one of a primary power supply and a secondary power supply to a form that is suitable for use by the customer load. The converter may be a power electronic device that includes one or more power switches, such as insulated gate bipolar transistors (IGBTs) or metal-oxide-semiconductor field-effect transistors (MOSFETs), that can be switched on and off at high frequencies. This allows the converter to control the output voltage, frequency, and waveform of the power that is supplied to the customer load. The converter may also include one or more control circuits that are used to adjust the converter power parameters, such as the voltage set point, frequency, and output power rating, in order to maintain a desired output voltage, frequency, and waveform. Additionally, the converter may include one or more sensing circuits that are used to measure the input and output power parameters, such as the input and output voltage, current, and power, in order to provide feedback to the control circuits for adjustment of the converter power parameters.

Next, at step 325, the first input is converted to a first output. The first input received by the converter, whether from the primary power supply or the secondary power supply, is converted into the first output by the converter. The conversion process involves the use of electrical components and circuitry to modify the input signal in a specific way, as determined by the system design. The exact nature of the conversion process depends on the specific type of converter used in the system, which can vary depending on factors such as the type of power supply, the power requirements of the customer load, and other design considerations. In general, however, the output generated by the converter is designed to be compatible with the customer load, providing a steady and reliable source of power that meets the at least one inverter power parameter through a process of regulation and filtering of the signals from at least one of the primary power supply and the secondary power supply. The output may be further conditioned or regulated by other components in the system, such as filters or voltage regulators, to ensure that it meets specific standards or requirements.

In operation, the system receives the first input from at least one of the primary power supply or the secondary power supply. The first input may be in the form of voltage, current, frequency, or any other suitable electrical parameter consistent with the embodiments of the present disclosure. The system then converts the first input into the first output, which may also be in the form of voltage, current, frequency, or any other suitable electrical parameter. The conversion of the first input to the first output is accomplished through the use of the converter, which may include one or more power electronics devices such as a rectifier, inverter, DC-DC converter, AC-DC converter, or DC controllers.

For example, if the first input is received from the primary power supply at a voltage of 240 volts and a frequency of 60 Hz, the converter may convert this input to a first output with a voltage of 120 volts and a frequency of 50 Hz to match the requirements of the inverter power parameters, which may correspond to the power requirements of the customer load. In another example, if the first input is received from the secondary power supply at a voltage of forty-eight volts and a current of ten amps, the converter may convert this input to a first output with a voltage of twenty-four volts and a current of twenty amps to match the requirements of the customer load. The converter may also be configured to regulate the first output to ensure that it remains within predetermined voltage and current limits, which may be set based on the requirements of the customer load or other system components.

Additionally, in one embodiment, the system is configured to convert the first input, which is alternating current (AC), to the first output, which is direct current (DC). In this embodiment, the converter is designed to rectify the incoming AC voltage waveform and smooth it out to produce a constant DC voltage output. This conversion process may incorporate the use of a rectifier circuit, typically composed of diodes, which allow current to flow in only one direction. For example, because the at least one high discharge battery stack is connected between the converter and the inverter, the use of a diode prevents the system from charging the at least one high discharge battery stack in normal operation when the power is supplied from the primary power supply. The incoming AC voltage waveform is applied to the rectifier circuit, which only allows the positive or negative portion of the waveform to pass through, depending on the diode's orientation. The resulting waveform is a series of positive or negative pulses, which are then smoothed out using capacitors to produce a stable DC voltage output. The DC voltage output is then supplied to the inverter as a second input, and then to the customer load as the second output.

Next, at step 330, the method includes determining whether the first output satisfies at least one inverter power parameter. The at least one inverter power parameter is any measurable aspect or characteristic of the AC power output by the inverter(s) of the system. This may include, but is not limited to, parameters such as frequency, voltage, current, power factor, total harmonic distortion (THD), and other electrical characteristics of the AC power output. These parameters may be measured by sensors or other monitoring devices connected to the system and may be used by the system to ensure that the AC power output is within acceptable ranges and free from any abnormalities or issues that could negatively impact the connected load.

In one embodiment, the at least one inverter power parameter refers to a measurable quantity that indicates the demand of the customer load. This measurable quantity can be any parameter that is indicative of the load on the inverter, such as the current or voltage output of the inverter. The at least one inverter power parameter can be measured using any suitable sensing device or technique, such as a current or voltage sensor. By monitoring the at least one inverter power parameter, the system can adjust the operation of the inverter and other components to ensure that the customer load is receiving the appropriate amount of power. In some embodiments, the at least one inverter power parameter may be used to determine when to activate or deactivate certain components of the system, such as the high discharge battery stack, in order to maintain a consistent power supply to the customer load. The at least one inverter power parameter includes at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method.

In one embodiment, the at least one inverter power parameter may refer to the output range voltage for the second output. The output range voltage may be a measurable quantity that corresponds to the demand of the customer load and may be determined based on the requirements of the load and other factors. The output range voltage may be expressed as a range of values and may be adjusted in real-time to ensure that the load receives a stable and consistent supply of power. Other embodiments of the at least one inverter power parameter may include other measurable quantities that relate to the performance or operation of the inverter, such as output frequency, efficiency, or power factor. It should be understood that the specific embodiments of the at least one inverter power parameter disclosed herein are provided for example purposes only, and that other embodiments may exist that incorporate substantially the same method steps and concepts disclosed herein.

As used and described herein, the parameters for the converter and the inverter may include at least one of (i) a voltage set point, (ii) a frequency, (iii) an input voltage, (iv) an output voltage range, (v) an output power rating, (vi) an efficiency, (vii) a waveform, (viii) a surge capability, (ix) a total harmonic distortion, (x) an overload protection, and (xi) a cooling method. The voltage set point is the desired output voltage level of the converter/inverter. The frequency is the rate at which the voltage oscillates between positive and negative values, measured in Hertz (Hz). The input voltage is the voltage level of the primary power supply that is provided to the converter and/or the voltage level of at least one of the primary power supply and the high discharge battery stack that is provided to the inverter. The output voltage range is the range of voltages that the converter can provide to the second inverter, and which the inverter can provide to the load, respectively. The output power rating is the maximum power that the converter can provide to the inverter, and the maximum power that the inverter can provide to the load, respectively. The efficiency is the ratio of the output power to the input power, expressed as a percentage. The waveform refers to the shape of the output voltage waveform, which can be sinusoidal, square, or another shape. The surge capability is the ability of the converter/inverter to handle a sudden increase in load demand. The total harmonic distortion is a measure of the distortion in the output waveform caused by the converter and/or the inverter, respectively. Overload protection is a mechanism that protects the converter and/or inverter from damage in case of an overload. The cooling method refers to the way in which the converter and/or inverter is cooled to prevent overheating. This can include air cooling, liquid cooling, or other methods depending on the converter design and operating environment. These parameters can be adjusted in various combinations to optimize the operation of the converter for a particular application.

If the first output transmitted from the converter satisfies the at least one inverter power parameter, then not charging and not discharging at least one high discharge battery stack at step 340. This ensures that the high discharge battery stack is not unnecessarily charged or discharged, which can prolong the lifespan of the batteries and improve the overall efficiency of the system. By monitoring and controlling the charging and discharging of the high discharge battery stack in this manner, the disclosed system and method can provide reliable and high-quality power to the customer load while minimizing the use of the battery system for critical states of the system and for when the primary power supply is unable to support the customer load or is deemed unreliable.

In certain embodiments, the method may include balancing, cycling, and recalibrating the at least one high discharge battery. Battery cycling plays a pivotal role in enhancing overall system performance, particularly concerning balancing and recalibration, which ultimately leads to improved battery life and cost-efficiency. Through systematic and controlled charging and discharging cycles, the disclosed system optimizes the usage of the high discharge battery stack. By ensuring that the batteries are not unnecessarily charged or discharged when the first output from the converter already meets the inverter power parameter at step 340, the system effectively minimizes stress on the batteries, prolonging their lifespan. This intelligent approach to battery management not only improves the overall efficiency of the system but also ensures that the batteries remain in their optimal operating condition for longer durations. By reducing unnecessary battery usage during critical system states and when the primary power supply is deemed unreliable, the disclosed system and method further reduce operational costs and maintenance requirements. Through strategic battery cycling, the system achieves a fine balance between power supply and demand, delivering reliable and high-quality power to the customer load while optimizing the battery system's performance and mitigating its associated costs. To ensure that the high discharge battery stack is not charged or discharged by the primary power supply, the system may include a power conversion system which can include various components and features to regulate the flow of power to the battery. In one embodiment, the primary power supply cannot charge the at least one high discharge battery stack because the converter may include various components that regulate the flow of power to the battery. For example, the converter may include a DC-DC component or port that is designed to connect to the battery in order to regulate the flow of power to the battery. Alternatively, the converter may include an additional DC-DC converter between the converter and the battery to help regulate the flow of power. One such component, such as a bi-directional DC-DC converter, such as converter 215, which can be used to control the voltage and power flow between the battery and the power conversion system. The converter can be designed to allow power to flow in both directions and can be configured to ensure that the battery is only charged or discharged when necessary to maintain the desired voltage set point.

In another embodiment, another manner to regulate the charging and discharging of the battery is such that the system includes a battery management system (BMS). The BMS can monitor the charging and discharging of the battery and can be configured to prevent overcharging or over-discharging. The BMS can work in conjunction with the power conversion system to ensure that the battery is charged only when needed, and to prevent the battery from being charged or discharged by the primary power supply.

A relay or switch can also be used to control the connection between the battery and the power conversion system. The relay or switch can be designed to open or close the circuit based on the voltage or power levels in the system and can be configured to prevent the battery from charging when it is not needed. Additionally, a voltage regulator can be used to maintain a specific voltage set point and prevent the battery from charging when the set point is already being met. In another embodiment, the converter may include a diode or a switch/relay in the circuit between the port and the battery, which can be controlled based on the power source being used. This allows the system to prevent power from flowing back to the primary power supply and only allows power to flow to the battery when it is necessary or safe to do so, such as when power is transmitted from the secondary power supply. In yet another embodiment, the battery charging may be controlled based on various battery charge control techniques such as constant voltage, constant current, or pulse charging.

To ensure that the battery is charged only when power is coming from the secondary power supply, a switch or relay can be included in the circuit between the port and the battery. The switch or relay can be controlled based on the power source being used, such that the circuit is closed only when the secondary power supply is active. Alternatively, a control system can be used to detect when the secondary power supply is active and adjust the charging and discharging of the battery accordingly. By implementing these features, the power conversion system can maintain the desired power parameter of the load while preventing the primary power supply from charging or discharging the high discharge battery stack.

In order to maintain the desired state of not discharging and not charging the batteries at step 340, the system, at step 335, continuously adjusts at least one converter power parameter to satisfy the at least one inverter power parameter. This may involve monitoring the at least one inverter power parameter and comparing it to a predetermined threshold and adjusting the converter power parameter accordingly. The adjustment may be made in real-time, and may involve changing the frequency, voltage, or other characteristics of the first output from the converter. The system may use various techniques to optimize the adjustment of the converter power parameter, such as feedback control loops, predictive algorithms, and machine learning models. By continuously adjusting the converter power parameter, the system can ensure that the second output provided to the customer load is within the desired range, while also avoiding unnecessary charging and discharging of the high discharge battery stack, which can help to prolong its lifespan and improve its reliability.

The parameters of the converter may be adjusted using a control system, which may include at least one processor and memory storing instructions for adjusting the parameters. The control system may receive input from sensors monitoring the primary and secondary power supplies, as well as the high discharge battery stack and the customer load. Based on this input, the control system may adjust one or more parameters of the converter, such as the voltage set point, frequency, input and output voltages, power rating, efficiency, waveform, surge capability, total harmonic distortion, overload protection, and cooling method. The adjustment may be made continuously, periodically, or based on specific events or conditions.

In one embodiment, the system adjusts the set point of the converter to maintain the ideal state of not discharging and not charging the batteries. The set point refers to a specific target value for a given parameter that the converter is trying to maintain. By adjusting the set point, the system can control the output of the converter and ensure that it is within the desired range for the at least one inverter power parameter. The adjustment of the set point may be performed automatically by the system based on real-time data received from sensors or other sources. In another embodiment, the set point may be manually adjusted by an operator or user of the system. The ability to adjust the set point allows the system to respond to changes in the demand of the customer load and maintain the proper balance between the primary power supply, the high discharge battery stack, and the secondary power supply.

In another embodiment, the set point of the converter is a DC voltage set point. The DC voltage set point may be adjusted based on the measured output voltage of the converter, which is compared to the at least one inverter power parameter. The comparison may be made using a processor that continuously monitors the output voltage of the converter and adjusts the DC voltage set point as needed to maintain the at least one inverter power parameter. By adjusting the set point of the converter in real-time, the system can ensure that the converter is providing power to the customer load at the appropriate voltage level, while also avoiding the need to charge or discharge the high discharge battery stack unnecessarily. This can help to prolong the life of the batteries and reduce the overall maintenance requirements of the system.

Continuously adjusting the DC voltage set point, in one embodiment, every 25 to 75 milliseconds, is critical for maintaining the stability and reliability of the system. "Continuously adjusting" means that the converter power parameter is constantly monitored and modified to ensure that it is aligned with the desired inverter power parameter. This adjustment is made in real time, and the system may use various feedback mechanisms, such as sensors or data analytics, to continually monitor and adjust the converter power parameter to maintain the desired output to the customer load. The adjustment may be made automatically by the system's control logic or may be controlled manually by an operator or remote processor connected to the system. Continuously adjusting at least one converter power parameter to satisfy at least one inverter power parameter, may include adjusting parameters of the converter, including at least one of (i) a voltage set point, (ii) a frequency, (iii) an input voltage, (iv) an output voltage range, (v) an output power rating; and wherein the at least one inverter power parameter is an output voltage range, to alter the first output such that it satisfies the inverter power parameter.

The high discharge battery stack has the capability of quickly discharging, and the customer load may have varying power demands. By adjusting the DC voltage set point in such a brief time frame, the system can ensure that the customer load is receiving the necessary power without relying on the high discharge battery stack. Additionally, it allows the system to quickly respond to any fluctuations or disturbances in the primary power supply, ensuring that the load is not affected. This rapid adjustment capability also enables the system to optimize the charging and discharging of the high discharge battery stack, prolonging its lifespan, and improving its overall performance. Therefore, adjusting the DC voltage set point every 25 to 75 milliseconds is a critical aspect of the invention, contributing to its reliability, stability, and efficiency.

As a result, of the ideal state, the at least one inverter power parameter is satisfied. Therefore, at step 345, the first output, being power derived from the primary power supply, is transmitted to the inverter, thereby defining a second input. Alternatively, the below description describes the methods and systems should the first output fail to satisfy the at least one inverter power parameter.

For example, if the first output transmitted from the converter fails to satisfy the at least one inverter power parameter, then discharging, at step 355, the at least one high discharge battery stack. The converter power parameter is continuously adjusted to ensure that the high discharge battery stack is only discharged if the primary power supply parameter fails to satisfy a primary power supply parameter threshold. A chain reaction event of the primary power supply parameter failing to satisfy the at least one primary power supply parameter threshold is that the first output, at the converter, will ultimately fail to satisfy the at least one inverter parameter. Consistent with this disclosure, this means for example, that the first output at the converter is not within the desired output range of the inverter needed to satisfy the demands of the customer load.

Thus, when the first output fails to satisfy the at least one inverter power parameter, the system discharges the at least one high discharge battery stack to restore power to the customer load near instantaneously. In certain embodiments, the system may need to discharge the high discharge battery to make up for any difference between the first output from the converter and the desired range of output to the customer load, as indicated by the inverter power parameter. This discharge of the high discharge battery can help maintain the desired output to the customer load, even if the primary power supply is not meeting the required power parameter threshold. This discharge can be performed by the converter, which can be continuously adjusted to maintain the desired output to the customer load while also ensuring that the high discharge battery is not over-discharged, which could lead to damage or reduced battery life.

In one example, the inverter power parameter is set to maintain an output range of 220-240V for the customer load, but the first output from the converter is only 215V. In this case, the system may determine that there is a deficit of 5V to meet the inverter power parameter. If the primary power supply parameter fails to satisfy the primary power supply parameter threshold and the high discharge battery is available, the system may discharge the battery to recover the 5V needed to meet the inverter power parameter. This ensures that the customer load receives the desired output range while also utilizing the high discharge battery efficiently.

In other embodiments, if there is an excess second input at the inverter from the primary power supply, the system may bias or adjust a converter power parameter to charge the battery stack. For example, the voltage set point of the converter may be adjusted to allow for charging of the battery stack. The system may continuously monitor the voltage and current levels of the battery stack to determine if charging is needed and adjust the converter power parameter accordingly. If the battery stack is fully charged or if the primary power supply parameter satisfies the respective primary power supply parameter threshold, the system may bias or adjust the converter power parameter to prevent overcharging of the battery stack. This ensures that the battery stack is charged only when necessary and prevents overcharging and damage to the battery stack.

In certain embodiments, discharging the at least one high discharge battery stack may include switching to the secondary power supply at step 360 in a manner consistent with this disclosure and adjusting the at least one converter power parameter at step 365 to allow the secondary power supply to charge the at least one high discharge battery stack at step 370. In one embodiment of the system, the at least one high discharge battery stack is charged exclusively by the secondary power supply. This step may be achieved by opening a switch, such as switch gate A, to disconnect the primary power supply from the converter, and closing switch gate B to electrically connect the secondary power supply. Once the primary power supply is disconnected, the system can rely on the secondary power supply to provide the necessary power to charge the battery stack. The switch can be opened and closed automatically by the control system, based on the power source being used and the state of the battery stack. This embodiment ensures that the battery stack is charged only by the secondary power supply, which is typically a more stable and reliable power source than the primary power supply.

In certain embodiments, the disclosed system may incorporate a plurality of converters and/or inverters. At step 360, the process of discharging the at least one high discharge battery stack may involve switching to the secondary power supply in accordance with this concept and further adjusting the relevant converter power parameters at step 365 to enable the secondary power supply to charge the battery stack at step 370. Notably, the system's design allows for the potential utilization of multiple converters and/or inverters to manage power transmission and conditioning efficiently.

The at least one high discharge battery stack electrically connected between the converter and the inverter. In an ideal normal state, the primary power supply cannot charge the at least one high discharge battery stack. The high discharge battery stack refers to a battery system with the capability to discharge at high rates of power for short periods of time, typically used for power storage and supply in energy systems. The high discharge battery stack may consist of multiple cells arranged in series and/or parallel configurations to provide the desired voltage and capacity. In one embodiment, the high discharge battery stack may be comprised of lithium-ion cells, or any other battery technology capable of high-power output. The high discharge battery stack may also include a battery management system to monitor and regulate the battery's charge and discharge, as well as to prevent overcharging or over-discharging.

In particular, the high discharge battery stack is rated at least 2 C, meaning that it is capable of discharging at a rate equal to twice its capacity in ampere-hours (Ah) within one hour. In a preferred embodiment, the high discharge battery stack is rated at least 3 C, allowing it to discharge at a rate equal to three times its capacity in Ah within one hour. In a further embodiment, the high discharge battery stack is rated at least 5 C, meaning it can discharge at a rate equal to five times its capacity in Ah within one hour. The high discharge battery stack is critical to the present invention as it serves as a backup power source in case the primary or secondary power supply fails to provide the required power output. The higher the C rating of the high discharge battery stack, the faster it can provide power to the system, ensuring that the customer load is not affected by any power interruptions. Additionally, a higher C rating allows for a smaller and more compact battery system, which is advantageous in space-limited applications.

The use of a high discharge battery stack with at least 2 C, and preferably at least 3 C or at least 5 C rating in the present invention improves over the prior art by allowing for efficient and effective conditioning and maintenance of power transmitted to a customer load from at least one of a primary power supply and a secondary power supply. The high discharge battery stack with a high C rating is able to quickly discharge power to the inverter when needed, improving the system's ability to maintain stable power to the customer load. Additionally, the high discharge rate allows the battery stack to quickly charge when excess power is available, which helps to ensure that the battery is fully charged and ready to discharge power as needed. The use of a high C rated battery stack also improves the overall efficiency of the system, as it allows for more power to be transmitted between the converter and the inverter in a shorter amount of time, reducing the amount of energy lost as heat during transmission. This can result in cost savings and a reduced carbon footprint for the system. Overall, the high discharge battery stack with a high C rating is a critical component in the present invention, as it allows for efficient and effective conditioning and maintenance of power, resulting in a more reliable and cost-effective system for transmitting power to a customer load.

Due to the high discharge rate of the battery, the system is configured to charge the battery quickly to ensure that the customer load does not lose power. This is accomplished by adjusting the converter power parameter such that power is transmitted from the secondary power supply to the converter to the at least one high discharge battery stack for charging the battery. When the battery is charged, power is discharged from the battery stack to the inverter and then transmitted to the customer load. The system continuously adjusts the converter power parameter to ensure that the battery is charged and discharged in a manner that meets the inverter power parameter and ensures uninterrupted power to the customer load.

The high discharge battery stack is an essential component of the power conversion system, providing a reliable, efficient, and a rapid source of energy to the customer load. In one embodiment, the high discharge battery stack is designed to have a nominal voltage of at least 860 V, which allows it to deliver high power output when needed. In another embodiment, the high discharge battery stack is made up of a plurality of independent batteries that are connected in either series or parallel, depending on the desired voltage and current requirements.

Other embodiments of the high discharge battery stack may include different C ratings, such as at least 3 C or at least 5 C, to meet specific power demands of the load. The high discharge battery stack can also include other features, such as thermal management systems, safety mechanisms, and state-of-charge monitoring systems to ensure the safe and efficient operation of the battery. Additionally, the high discharge battery stack can be made from a variety of different chemistries, including but not limited to lithium-ion, nickel-cadmium, and lead-acid. The choice of battery chemistry can depend on numerous factors, such as cost, energy density, and safety requirements.

At step 375, the power from the at least one high discharge battery is transmitted to the inverter, defining the second input of the inverter.

In step 350, the inverter receives power defined as a second input where the power is derived from at least one of (i) the primary power supply, and (ii) the at least one high discharge battery. It is understood that the source of the second input may be defined based on the different embodiments of the method and system as disclosed herein. It is further understood that this step may not be numbered or described sequentially for purposes of describing different paths of the flow chart and method 300.

Next, at step 380, the system includes an inverter that converts the second input, which may be DC power from the high discharge battery stack and/or the primary power supply via the converter, into an AC voltage waveform that matches the characteristics of the customer load. The inverter may be a bi-directional DC-AC converter that can switch between converting DC power to AC power and vice versa. The inverter may include one or more power switches, such as MOSFETs or IGBTs, that are controlled by a microprocessor or other control circuitry to switch the DC voltage on and off at a high frequency, typically in the kilohertz range. The resulting AC waveform may be sinusoidal, square wave, or some other waveform that matches the requirements of the customer load. The inverter may also include filtering and conditioning components, such as capacitors and inductors, to smooth the AC waveform and reduce harmonics and other distortions.

Next at step 385, the cleaned and reliant power is transmitted to the customer load. It is understood that the customer load in the present disclosure is any device or system that requires electrical power to operate. The customer load may include, but is not limited to, electronic devices, appliances, machinery, or any other equipment that requires electrical power. The customer load may have varying power requirements and may require a continuous or intermittent supply of power. The customer load may be connected to the system via any suitable means, such as a wired or wireless connection. In some embodiments, the customer load may be connected directly to the converter, while in other embodiments, the customer load may be connected to the system via an intermediate device or circuit. The customer load may be located at a remote location from the system or may be co-located with the system. The customer load may be controlled by the user or may operate automatically based on predetermined parameters or instructions. The customer load may be monitored and controlled by the system to ensure proper operation and to prevent damage to the load or the system.

The system may further include a graphical display for displaying a real-time monitoring of the at least one power supply parameter and at least one minimum or maximum threshold level for the power supply parameter. The system continuously adjusts at least one converter power parameter to satisfy at least one inverter power parameter, and continuously adjusts the voltage set point between every 25 to 75 milliseconds.

In operation, if the at least one primary power supply parameter fails to satisfy a respective primary power supply parameter threshold, the system receives the first input from the secondary power supply instead of the primary power supply. If the first output transmitted from the converter satisfies the at least one inverter power parameter, the system does not charge or discharge the at least one high discharge battery stack. If the first output transmitted from the converter fails to satisfy the at least one inverter power parameter, the system discharges the at least one high discharge battery stack.

The system is capable of supplying power to the customer load from either the primary power supply or the secondary power supply, depending on the condition of the primary power supply parameter. The system thus ensures that the customer load receives a stable supply of power, regardless of the condition of the primary power supply parameter, and the high discharge battery stack provides a backup power source in case of any power supply interruption.

Figure 4:
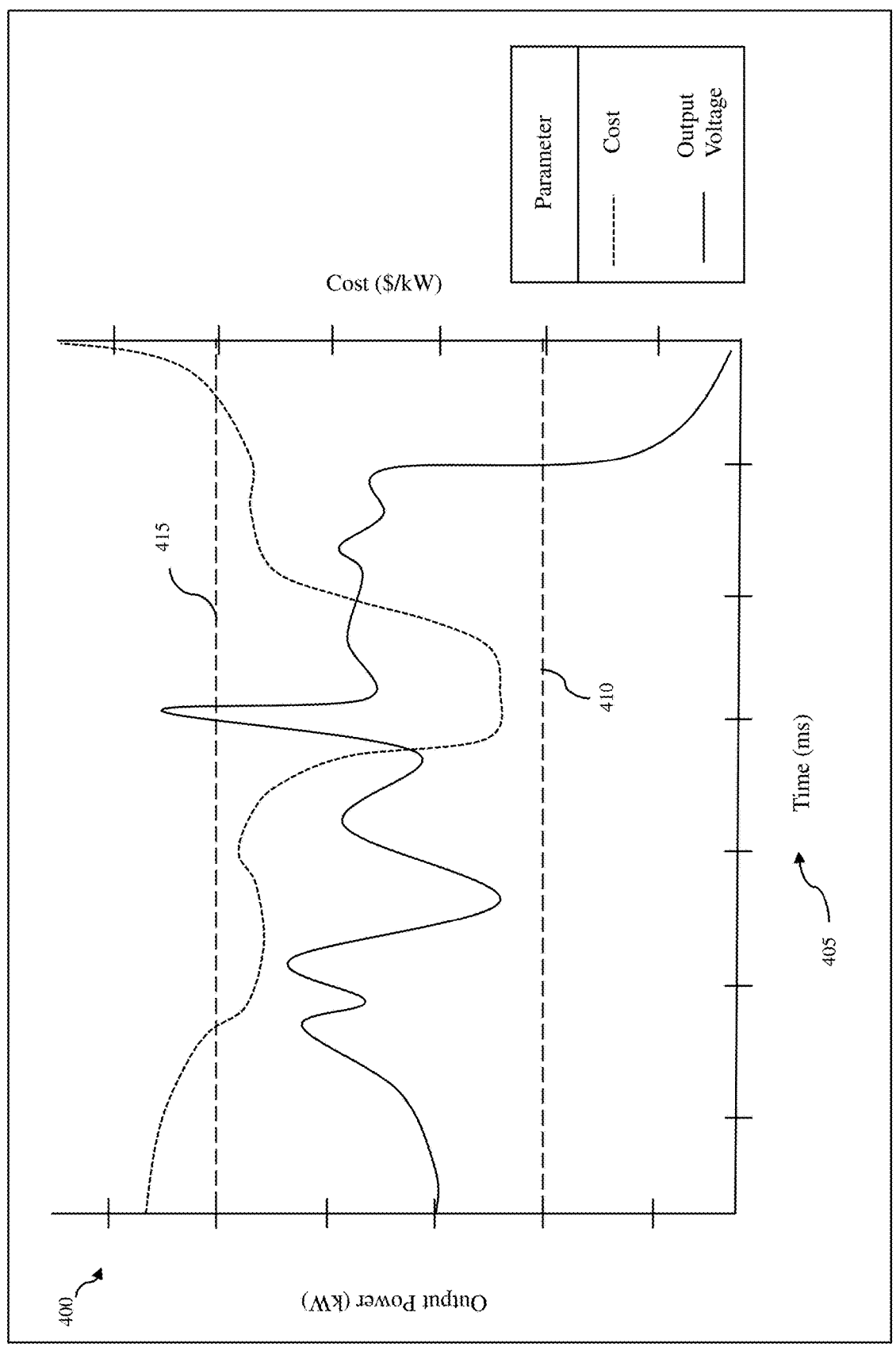
FIG. 4 is a graphical representation of monitoring, in real time, at least one primary power supply parameter to determine whether the at least one primary power supply parameter satisfies a respective primary power supply parameter threshold level, according to an example embodiment.

In certain embodiments, based on monitoring the various components of the system using at least one of a plurality of sensors, a connected database, a remote processor, and clod network systems, the method may include a generating, step 390, a graphical display (400 in FIG. 4) including (i) a real-time monitoring (405 in FIG. 4) of the at least one power supply parameter, and (ii) at least one of (1) a minimum threshold level 410 and a (2) maximum threshold level 415 for the at least one power supply parameter. Said graphical display 400 is shown in FIG. 4 as an example embodiment of the present disclosure. The real time monitoring of the at least one power supply parameter may be represented as a graph, for example, as a function of time. The graph includes the x-axis representing time, and the y-axis representing the power supply parameter being monitored, such as voltage or frequency. The intervals for real-time monitoring can vary depending on the system and the specific parameter being monitored. In general, real-time monitoring refers to a continuous or near-continuous monitoring process, where data is collected and analyzed at regular intervals that are short enough to provide an accurate and up-to-date picture of the system's performance. The intervals can range from milliseconds to seconds, depending on the system requirements and the level of detail needed for monitoring the specific parameter.

The real-time monitoring of the power supply parameter could be shown as a line graph that updates in real-time as the parameter changes. In addition to displaying the real-time monitoring of the power supply parameter and the threshold levels, the Y-axis of the graph could be labeled with cost. The cost could represent the monetary cost of operating the system or the environmental cost of the system's energy consumption. By displaying the power supply parameter and its threshold levels along with the associated cost, the user can easily monitor and optimize the system's performance to balance the cost with the desired power output. This allows the user to make informed decisions about the system's operation and optimize its efficiency and cost-effectiveness.

In certain embodiments, the Y-axis of the graph may represent the efficiency of the power conversion system, which is defined as the ratio of output power to input power. The efficiency may be affected by numerous factors, including the quality of the components used, the design of the system, and the operating conditions. By monitoring the efficiency of the power conversion system over time, the user can identify any issues that may be affecting the system's performance and take corrective action as needed. In other embodiments, the Y-axis may represent the voltage or current levels of the power supply, the frequency of the output waveform, the total harmonic distortion, the power factor, or other relevant parameters. The choice of Y-axis parameter may depend on the specific application and the goals of the monitoring system.

The minimum and maximum threshold levels for the power supply parameter could be shown as horizontal lines on the graph, indicating the range of acceptable values for the parameter. If the power supply parameter falls below or above the threshold levels, an alarm or warning could be triggered to alert the operator. Additionally, the graph may include different colors or markers to distinguish between the primary power supply and the secondary power supply parameters. This would allow the operator to quickly identify which power supply is causing the issue if there is a problem. Overall, the graph would provide a visual representation of the power supply parameters, allowing the operator to easily monitor and adjust the system as needed.

If the real-time monitoring indicates that a parameter exceeds a threshold level, the system may take appropriate corrective action. For example, if the primary power supply parameter exceeds a maximum threshold level, the system may automatically switch to the secondary power supply or the high discharge battery stack to prevent damage to the customer load. Similarly, if the at least one inverter power parameter exceeds a minimum or maximum threshold level, the system may adjust the converter power parameter to maintain the desired output range to the customer load and/or the system may engage the at least one high discharge battery stack to discharge power to the customer load. The graphical display may also provide alerts or warnings when the parameter exceeds a threshold level to prompt the user to take action. By monitoring and responding to the power supply parameters in real-time, the system can ensure reliable and efficient operation, while protecting the customer load from potential damage or disruption.

It is understood that the real-time monitoring refers to the continuous observation and recording of data as it occurs, with little or no delay between the time the data is collected and when it is displayed or analyzed. In the context of power supply systems, real-time monitoring typically involves the use of sensors, meters, or other monitoring devices to collect data on various parameters such as voltage, current, power, and temperature, and then display or transmit that data to a monitoring system or device in real-time. Real-time monitoring allows operators or users to quickly detect any changes or anomalies in the power supply system and take appropriate action to prevent or mitigate any potential issues.

As shown in FIG. 4, it is understood that at any period of time a parameter is above the maximum threshold 415 or below the minimum threshold 410 of the respective parameter, then the system may automatically switch from the primary power supply to the alternative power source, such as the at least one high discharge battery and the secondary power supply. In some embodiments, the graphical interface displaying the real-time monitoring of the power supply parameter, along with the minimum and maximum threshold levels, may be displayed on one or more displays connected to the system. The system may receive the real-time input from a plurality of sensors that are configured to monitor the power supply parameter. The sensor data can be analyzed and processed by the system to provide a real-time display of the power supply parameter on the graphical interface. Additionally, the system may receive data from a connected database or transmitted across a network, which can be used to further enhance the real-time monitoring and display of the power supply parameter. The data received from the network or database may include historical data, trends, and other related information, which can be used to provide a more comprehensive view of the power supply parameter and its performance over time.

Figure 5A:
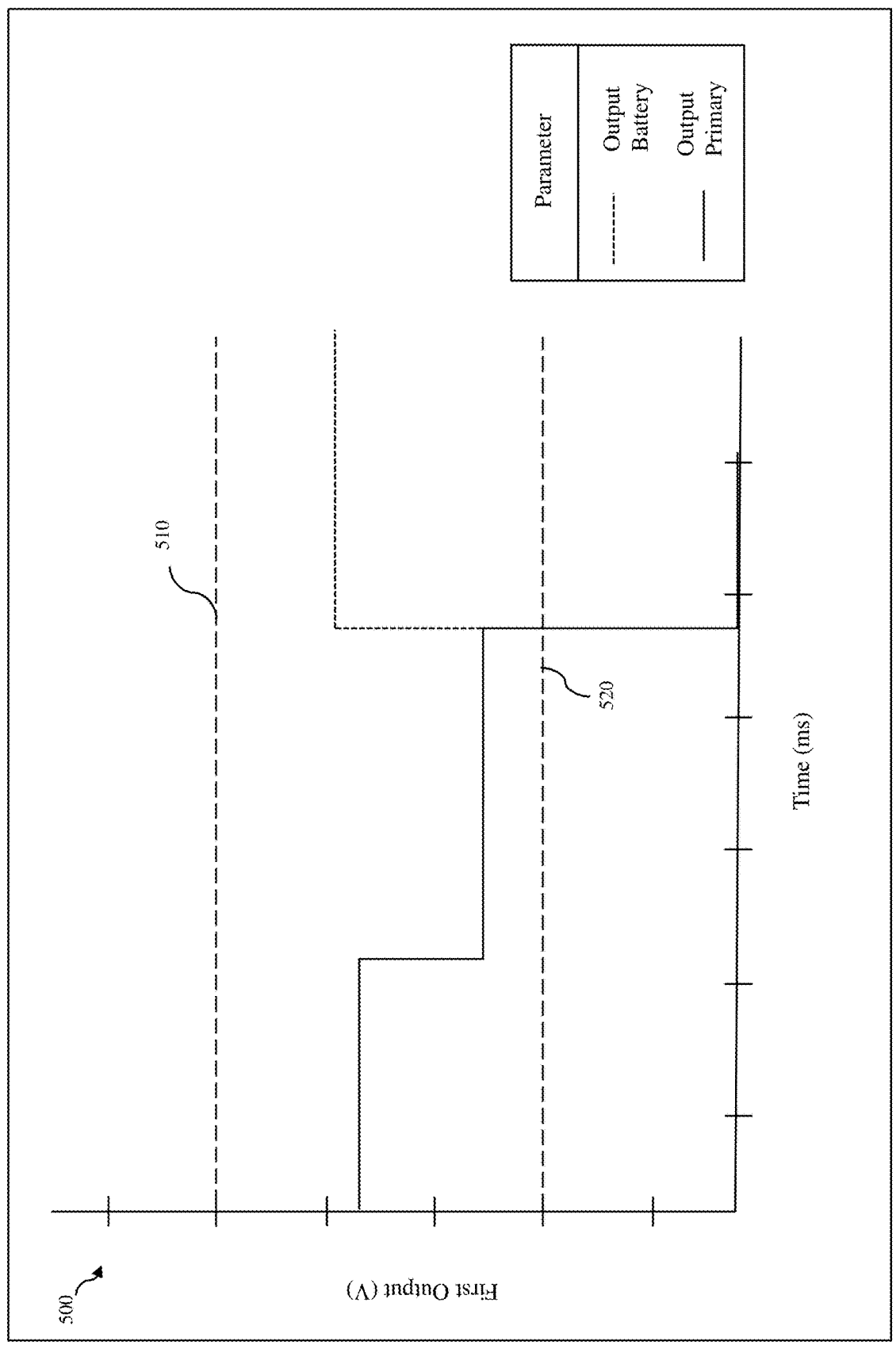
FIG. 5A is an exemplary embodiment of the first output being monitored to determine whether it satisfies at least one inverter power parameter, according to an example embodiment.
Figure 5D:
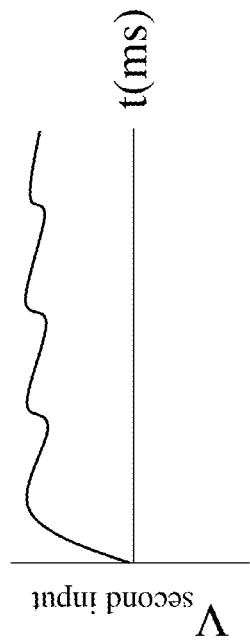
FIG. 5B through 5E illustrates the first input, first output, second input and second output, respectively, according to an example embodiment.
Figure 5E:
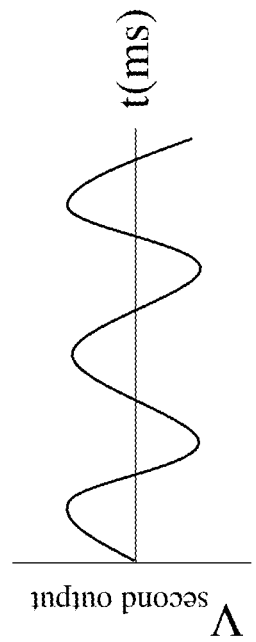

FIG. 5A is an exemplary embodiment of the first output being monitored to determine whether it satisfies at least one inverter power parameter. The graphical interface 500 may also include a real-time monitor of the first output compared to the inverter power parameter. For example, a graph may be generated as a function of time. In the example embodiment 500, the first output, being measured as voltage is charted over time. The inverter power parameter may be output voltage and may be indicated by an acceptable range having a minimum output voltage and a maximum output voltage. Such minimum and maximum output voltages may be shown as level thresholds on the chart, such as maximum threshold level 510 and minimum threshold level 520. The acceptable range to satisfy the inverter power parameter would be between the minimum and maximum threshold levels. For other parameters, it is understood that there may only be a minimum threshold and/or a maximum threshold. As shown in FIG. 5A, when the output voltage crosses over the minimum threshold level, it no longer satisfies the at least one inverter power parameter. Thus, the method would immediately engage the battery to discharge the at least one high discharge battery stack as to satisfy the at least one inverter power parameter.

Figure 5B:
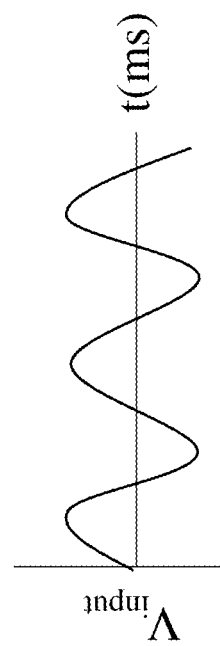
Figure 5C:
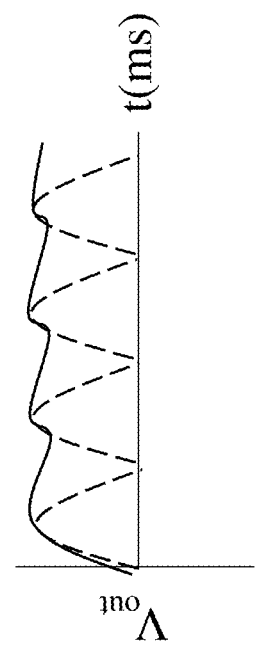

FIG. 5B through 5E illustrate the first input, first output, second input and second output according to an example embodiment. As stated above, the measurable inputs could be any parameter of the power being supplied to the system. Generally, the first input is AC power, and the first output is DC power. However, changing at least one converter power parameter may include changing certain signals from the input power to the input power, such as amplitude, frequency, waveform, etc. FIG. 5B illustrates the first input and FIG. 5C illustrates a first output, according to an example embodiment.

The first input to the system is typically an AC power supply from a primary power source as shown in FIG. 5B. This AC input is converted into a DC voltage by the converter, which may include a rectifier to transform the AC waveform into a DC waveform, as shown in FIG. 5C. In one embodiment, the DC voltage is then used to charge a capacitor, which acts as a filter to smooth out any variations in the output voltage. The capacitor voltage may then be used as the second input to the inverter, shown in FIG. 5D, which converts the DC voltage back into an AC waveform, shown in FIG. 5E, that is suitable for powering the customer load. Overall, the conversion of power through the converter and inverter helps to clean the power by smoothing out the input waveform and generating a more stable and consistent output waveform. The capacitors in the converter help to filter out noise and voltage spikes, while the inverter can be designed to produce a clean sinusoidal waveform with low harmonic distortion. This results in a more reliable and consistent power supply to the load, which can help to improve the performance and lifespan of connected equipment. Additionally, the use of isolation transformers can help to eliminate ground loops and reduce the risk of electrical noise and interference, further improving the quality of the power supply.

The output waveform from the inverter can be adjusted to match the specific requirements of the load, such as frequency, voltage, and power rating, by adjusting the converter power parameters. This process of converting the AC input to a DC voltage, smoothing it out with a capacitor, and then converting it back into an AC waveform is critical to ensuring that the customer load receives clean, stable power that meets its specific requirements.

It is understood that the embodiments of FIG. 5B through 5E are merely examples of the system and are not intended to limit the scope of the invention. In other embodiments, different parameters, such as frequency, waveform, and other electrical characteristics, may be adjusted to suit the requirements of the particular application. For example, the waveform of the output may be modified to achieve a particular power factor, or the frequency of the output may be adjusted to match the frequency of the customer load. It will be appreciated that various modifications and alterations may be made to the embodiments disclosed herein, and that such modifications and alterations are within the sprit and scope of the present invention.

Figure 6:
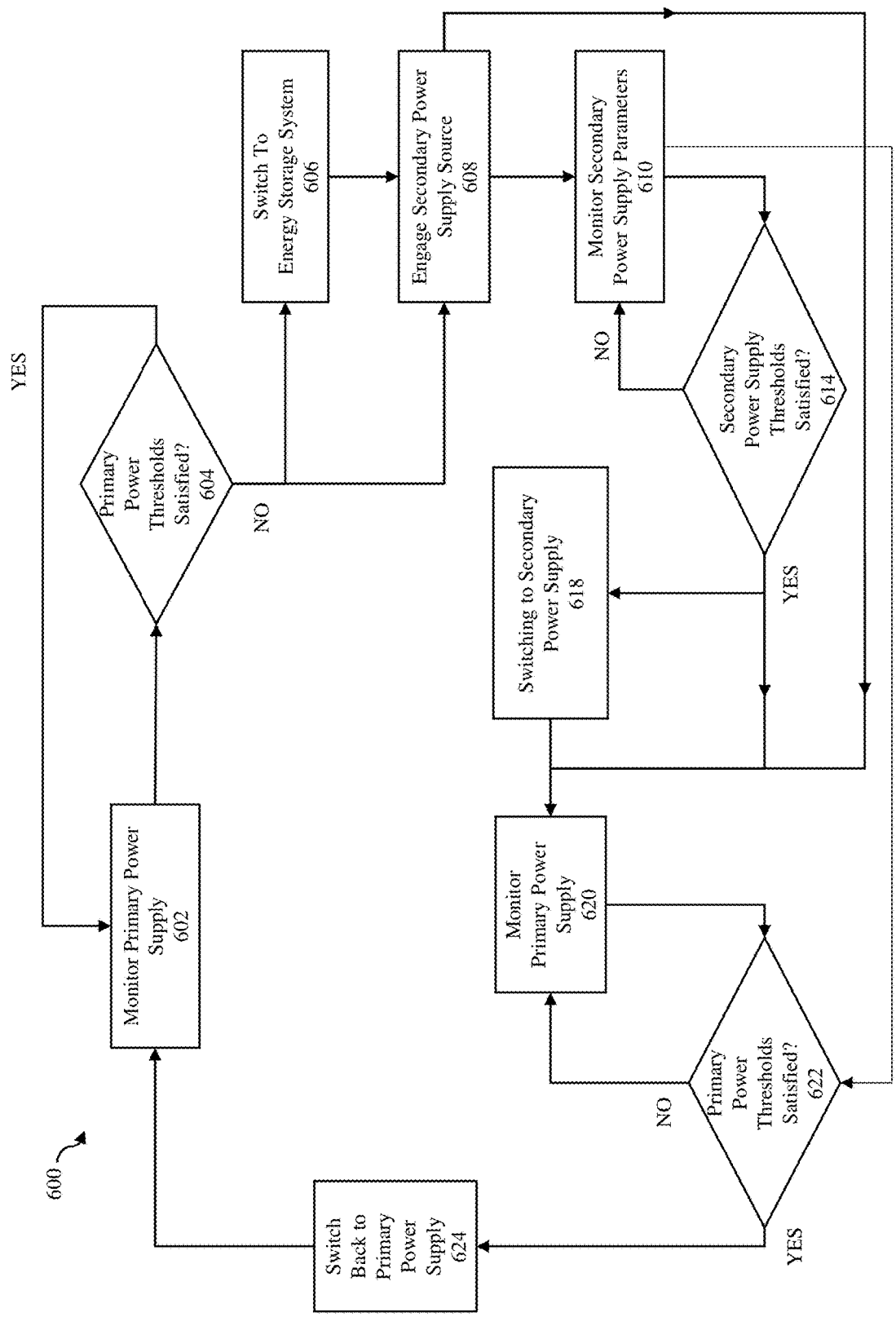
FIG. 6 is a block diagram illustrating an exemplary method for providing a rapid threshold amount of power to a customer load during transfer between a primary power supply and a secondary power supply is shown, according to a second example embodiment.

Referring now to FIG. 6, a block diagram illustrating an exemplary method 600 for providing a rapid threshold amount of power to a customer load during transfer between a primary power supply and a secondary power supply is shown, according to an example embodiment. It is to be understood that at least one processor of the system is configured to be continuously monitoring the functionality of system throughout each step in method 600, and that no particular step must be performed for the at least one processor to perform the undermentioned tasks.

At step 602, at least one processor monitors the plurality of primary power supply parameters of primary power supply connected to customer load to determine whether the plurality of primary power supply parameters fails to satisfy the plurality of primary power supply parameter thresholds. It is to be understood that at least one processor continuously performs the monitoring functions based on the aforementioned real-time data collected. The real time data may be transmitted via the at least one first signal to the at least one processor from the components of the system that are in communication with the at least one processor. Additionally, cloud services, including a remote processor, may communicate real time data with the at least one processor. The failure of the primary power supply may occur for a plurality of different reasons. For example, a failure to satisfy the plurality of primary power supply parameter thresholds may be caused by common factors, such as but not limited to, outages, stress caused by voltage, frequency fluctuations, faults, or any other applicable disruption or adjustment of power. However, other reasons may also be applicable and are within the spirit and scope of the present invention. For example, primary power supply parameters such as price, power demand from load, and time of day, may alter the primary power supply thresholds and cause the system to switch from the primary power supply to the secondary power supply when the primary power supply thresholds fail.

At step 604, at least one processor determines whether at least one primary power supply parameter fails to satisfy a respective primary power supply parameter threshold based on at least one first signal received from at least one first sensor in electrical communication with the at least one processor and a remote processor communicatively coupled via a communications network with the at least one processor based on a combination of the collected real-time data and the one or more generated profiles of customer load. If the plurality of primary power supply parameter thresholds is not satisfied, then the system moves to step 606 where the at least one processor switches from the primary power supply to the energy storage system after the at least one processor determines the at least one primary power supply parameter fails to satisfy the respective primary power supply parameter threshold by sending at least one second signal to the switching module. The at least one second signal may include electrical signals having information configured to execute the functions of the switching module. Because the energy storage system is energized such that there is active voltage from the energy storage system up to the group circuit breaker of the switching module, the system can rapidly discharge power to the load as the system switches to the secondary power supply, namely, the secondary power supply source. Therefore, the system can provide full customer load recovery in less than one hundred milliseconds which may resolve the current issues mission critical facilities face with existing technology.

In step 606, and concurrently with step 608, the switching module is utilized to switch from primary power supply to energy storage system allowing energy storage system to function in a high performance/discharge manner due to the energy capacity of the high discharge battery. In one embodiment, the switch from primary power supply to energy storage system occurs within 4 milliseconds after the at least one processor makes the decision to switch from the primary power supply to the secondary power supply. This is important because it allows for full load recovery in an exceedingly small amount of time. In one embodiment, the system is configured that the threshold amount of power to customer load is provided by the applicable energy power supply in less than one hundred milliseconds. Additionally, it is understood that executing the switch from the utility power supply to the energy storage system occurs within four milliseconds after making the determination to switch from the primary power supply to the secondary power supply. At the same time step 606 occurs, or shortly thereafter, step 608 occurs.

In step 608, at least one processor engages, concurrently with switching from the primary power supply to the energy storage system in step 606, the secondary power supply source after the at least one primary power supply parameter fails to satisfy the respective primary power supply parameter threshold by sending the at least one second signal.

In one embodiment, engaging secondary power supply source may include initiating or starting up a generator, conducting switching of an alternate electrical grid or other power source so that the secondary power supply source is ready to provide power to the load. However, it is understood that other means of engaging the secondary power supply source may be used and is within the spirit and scope of the present invention. After the secondary power supply source has been engaged, step 610 occurs.

In step 610, at least one processor continuously monitors a plurality of secondary power supply parameters of the secondary power supply to determine if the plurality of secondary power supply parameters satisfy a plurality of secondary power supply parameter thresholds. In certain embodiments, the at least processor may also at the same time continue to monitor the primary power source threshold such that the switch back to the primary power supply before switching from the energy storage system to the secondary power supply source.

At step 614, at least one processor decides whether the plurality of secondary power supply parameters satisfy the plurality of secondary power supply parameter thresholds. In step 614, if the plurality of secondary power supply parameters satisfies the plurality of secondary power supply parameter thresholds, then the process moves to step 618.

In step 618, at least one processor switches from the energy storage system to the secondary power supply source after at least one secondary power supply parameter satisfies a respective secondary power supply parameter threshold by sending at least one third signal to the secondary power. The third signal is an electrical signal including information configured to execute the functions of the secondary power supply, for example, the third signal may contain information to engage the secondary power supply source, which may include starting a generator in one example embodiment. It is to be understood that after the switch from energy storage system to secondary power supply occurs, then the process moves to step 620 and step 622.

In one embodiment, in step 620, following the switch to secondary power supply at step 618, the switching module is in communication with the at least one processor. The at least one processor monitors the primary power supply at step 620 using the communications network in communication with the components of the system. The communications network may include at least one first signal configured to monitor the primary power supply by measuring primary power supply parameters at certain components within the system via the metering system. At least one processor monitors the plurality of primary power supply parameters of the primary power supply connected to customer load to detect if the plurality of primary power supply parameters continues to satisfy the plurality of primary power supply parameter thresholds. At during any step of method 600, at which point the at least one processor determines that at least one primary power supply parameters satisfy its respective primary power supply parameter threshold, then the at least one processor is configured to switch form the secondary power supply back to the primary power supply.

At step 622, at least one processor determines whether at least one primary power supply parameter fails to satisfy a respective primary power supply parameter threshold based on at least one first signal received from at least of (i) at least one first sensor in electrical communication with the at least one processor and (ii) a remote processor communicatively coupled via a communications network with the at least one processor based on a combination of the collected real-time data and the one or more generated profiles of customer load. It is to be understood that a failure to satisfy at least one of the primary power supply parameter thresholds may be caused by common factors, such as but not limited to, outages, stress caused by voltage, frequency fluctuations, faults, or any other applicable disruption or adjustment of power. If the at least one processor determines that at least one of the primary power supply parameter thresholds is satisfied, then the process moves to step 624.

In step 624, the automated transfer switches of the switching modules will switch power back to the primary power supply from the secondary power supply. The at least one processor is configured for sending a fourth signal to the switching module to switch back to the primary power supply if the at least one processor determines the at least one primary power supply parameter satisfies the respective primary power supply parameter threshold. The at least one fourth signal may include electrical signals having information configured to execute the functions of the switching module. If the utility power supply parameters fail to satisfy the utility power supply thresholds, then the process moves back to step 620, and the system continues to monitor the primary power supply parameters and to determine when it is appropriate to move back to the primary power supply when the at least one processer determines that the primary power supply thresholds are satisfied.

In step 624, when the primary power supply parameters are satisfied, then the system transfers power from the secondary power supply to back to the primary power supply. The switching module is utilized in step 624 to execute the switch from the secondary power supply to the primary power supply and then at least one processor proceeds to continuously monitor the components of system at step 602 to determine whether the primary power parameter thresholds are satisfied.

In another embodiment, exemplary method 600 may include cleaning the electrical power, such that the system includes two inverters and the electrical power from the primary power source is cleaned. By cleaning the electrical power, the electricity across the system and transferred to the load is free from voltage spikes and drops.

Figure 7:
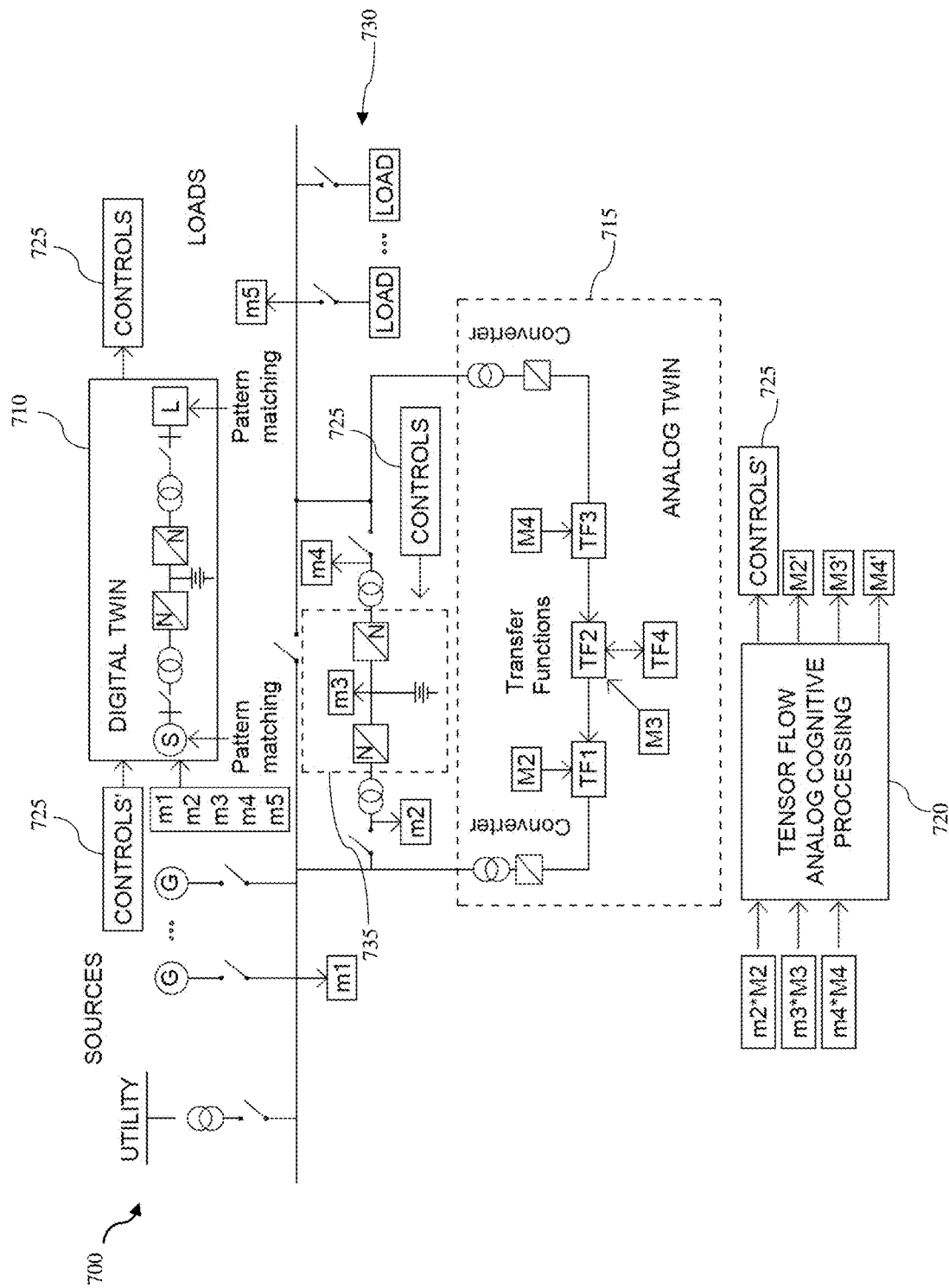
FIG. 7 is an uninterruptible power supply system, according to an example embodiment.

Referring now to FIG. 7, an uninterruptible power supply system 700 for predictive load compensation and load-adaptive power conditioning, encompassing the integration of digital twins, analog twins, and real-time processing mechanisms to achieve adaptive and efficient power regulation for downstream loads is illustrated, according to an example embodiment. The schematic begins with the "Sources" section, which represents the primary power supply, such as utilities or generators. These sources are monitored through various sensors (m1, m2, m3, m4, m5) that capture critical electrical input parameters, including voltage (V), current (I), and impedance (Z). The system leverages real-time analog-to-digital conversion to process these inputs, forming the basis for digital identity creation and real-time control mechanisms.

The digital twin 710 component plays a central role in the system by simulating and modeling power flow based on sensor data. Using data from sensors m1 through m5, the digital twin generates a "first digital identity" of the electrical input and a "second digital identity" of the downstream load. These identities are then compared with a stored "third digital identity" in the system's database using advanced pattern-matching algorithms. The comparison enables the system to predict downstream load behavior and simulate electrical responses under varying conditions. For example, the digital twin uses formulations such as total harmonic distortion (THD) and root mean square (RMS) voltage calculations to model the power quality and anticipate fluctuations. The integration of pattern matching ensures that deviations from optimal parameters are identified and addressed preemptively, leveraging stored historical data to enhance accuracy.

The first digital identity is generated using a mathematical aggregation of electrical input parameters. For example, the digital twin computes the root mean square (RMS) voltage as:

$$V_{RMS} = \sqrt{\frac{1}{T} \int_0^T v(t)^2 dt}$$

where v(t) represents the instantaneous voltage waveform. Similarly, impedance (Z) is computed as:

$$\underline{Z} = \frac{\underline{V}}{\underline{I}} \text{(under steady state conditions)}$$

The use of the underbar notation in the above impedance equation has the variables represented with an underbar denoting them as phasors, which are complex numbers used to describe sinusoidal waveforms in the frequency domain under steady-state conditions. This notation emphasizes that these quantities are not instantaneous time-domain values but rather time-independent representations of magnitude and phase. The underbar notation facilitates the analysis of steady-state sinusoidal systems, enabling more efficient calculations of voltage, current, and power relationships in AC circuit design and operation.

The second digital identity may be generated by evaluating downstream load requirements, such as power demand (P) and total harmonic distortion (THD). THD is calculated using:

$$THD = \sqrt{\sum_{n=2}^{\infty} \left(\frac{V_n}{V_1}\right)^2}$$

where $(V)_n$ represents the amplitude of the n-th harmonic, and $V_1$ is the fundamental amplitude. These digital identities are compared to a third digital identity stored in a connected database using pattern-matching algorithms. For example, the comparison might use normalized cross-correlation:

$$r = \frac{\sum (X_i - \overline{X})(Y_i - \overline{Y})}{\sqrt{\sum (X_i - \overline{X})^2 (Y_i - \overline{Y})^2}}$$

where X and Y are the digital identities, and $\overline{X}$ and $\overline{Y}$ are their means.

The analog twin 715 operates as a hardware-based system that executes real-time calculations to for deterministic power adjustment. The analog twin utilizes real-time sensor feedback from the plurality of telemetry sensors to establish a deterministic solution pathway, resulting in a predictive alignment of the intermediate output with downstream load requirements based solely on the single iteration. This process relies on the analog twin's capability to process live data and model the physical behavior of the power system with high fidelity, eliminating the need for successive iterations or recalibration. The analog twin is a hardware-based system composed of analog components that simulate the electrical dynamics of the uninterruptible power supply system in real-time. It processes real-time telemetry data from upstream and downstream sensors, which monitor input parameters such as voltage, current, and harmonic distortion, as well as load requirements like power demand and waveform tolerances. Using this data, the analog twin identifies the optimal adjustments needed to align the intermediate output with the load's requirements through a deterministic pathway, meaning the solution is calculated directly and conclusively without iterative approximations.

The analog twin employs transfer functions (TF1, TF2, TF3, TF4) to simulate the physical behavior of the system. For example, to model voltage stabilization, a simple transfer function could be:

$$H(s) = \frac{1}{1 + RCs}$$

where H(s) is the transfer function, R is resistance, C is capacitance, and s is the Laplace variable. This models low-pass filtering to suppress high-frequency harmonic distortions. The deterministic solution pathway of the analog twin eliminates iterative recalibration. For example, if a telemetry sensor detects a voltage sag (ΔV), the analog twin computes the necessary boost using:

$$\underline{V}_{boost} = \underline{V}_{desired} - \underline{V}_{measured}$$

The computation of the boost voltage inherently involves phasors when considering sinusoidal signals under steady-state conditions. Both the desired voltage and the measured voltage are treated as phasor representations, accounting for their magnitudes and phases in the frequency domain. By performing this operation in the phasor domain, the system can precisely determine the necessary boost voltage to align the intermediate output with the desired waveform, ensuring accurate adjustments that reflect both amplitude and phase relationships.

If the measured harmonic distortion exceeds a threshold, the analog twin calculates filtering coefficients H(f) to suppress it. For instance, a notch filter is applied for the 5th harmonic ($f_5$):

$$H(f_5) = 1 - \frac{f}{f_5}$$

The analog twin uses historical datasets for pre-calibration, which embed parameter correlations like voltage sag conditions and load behaviors. For example, the historical dataset might map a 10% drop in voltage to a required impedance adjustment of:

$$\Delta Z = \frac{\Delta V}{I}$$

Real-time telemetry data is compared to this dataset, allowing immediate adjustment of power converter parameters. For instance, if a voltage sag of 5% is detected, the pre-calibrated response applies an impedance boost to compensate.

The deterministic solution pathway refers to the analog twin's ability to directly map the sensor feedback to the appropriate power adjustments without iterative recalibration. This means that once the sensor data is processed, the analog twin generates the precise settings needed for load-adaptive power conditioning in a single step, ensuring rapid and accurate alignment with the load requirements. For example, if telemetry sensors detect a harmonic distortion in the input waveform, the analog twin computes and implements the precise filtering settings needed to suppress the distortion in the intermediate output before it affects the load.

The analog twin is pre-calibrated using a historical dataset of input parameters and downstream load requirements to achieve the canonical solution in the single iteration through direct correlation with stored parameter profiles. This calibration process equips the analog twin, when coupled to the system, with the ability to directly correlate real-time telemetry data with stored parameter profiles, ensuring precise and deterministic power conditioning adjustments without iterative recalibration or computational delays. The analog twin, integrated as part of the system's power management architecture, interacts with the telemetry sensors and analog components to perform its function. Pre-calibration of the analog twin involves programming its analog components with reference data derived from historical datasets. These datasets include previously observed input parameters (e.g., voltage, current, harmonic distortion) and corresponding downstream load requirements (e.g., power demand, waveform tolerances, transient behaviors). By embedding this historical information into its configuration and coupling the analog twin to the system, the analog twin can instantly identify and implement the necessary adjustments to align the intermediate output with the downstream load in a single iteration.

Coupling the analog twin directly to the system enhances the precision and efficiency of power conditioning by enabling seamless interaction with real-time telemetry sensors, analog components, and control mechanisms. This integration allows the analog twin to receive live telemetry data and process it in real time, eliminating delays associated with indirect data transfer or external computations. By being physically and operationally coupled to the system, the analog twin can execute deterministic adjustments instantaneously, ensuring alignment of the intermediate output with downstream load requirements within a single iteration. This direct coupling also improves the fidelity of the analog twin's operations, as it interacts directly with system elements such as impedance, capacitance, and power converters, enabling precise modulation of input and output parameters. Additionally, the coupled configuration minimizes computational overhead and latency, allowing the analog twin to adapt dynamically to transient conditions and load fluctuations, thereby improving overall system responsiveness and reliability.

The historical dataset includes a wide range of input parameters and associated load behaviors, such as voltage fluctuations, harmonic distortion patterns, and transient conditions. Each dataset entry contains input-output correlations, mapping specific input conditions to corresponding adjustments required to satisfy downstream load requirements. The analog twin is configured using this historical data, effectively embedding a library of input-output relationships within its circuitry. For example, if historical data indicates that a certain input harmonic distortion consistently affects load stability, the analog twin is pre-calibrated to automatically apply a specific filter adjustment whenever this distortion is detected. During operation, real-time telemetry data from input and load sensors is compared directly against the pre-calibrated parameter profiles. The analog twin identifies the closest match between current conditions and historical entries, instantly calculating the required adjustments to achieve the canonical solution. For instance, if telemetry sensors report an input voltage sag similar to a previously recorded scenario, the analog twin references the stored dataset and immediately applies the pre-determined voltage boost settings to stabilize the intermediate output.

The TensorFlow-based processing system 720 depicted in FIG. 7 serves as the core machine learning engine of the system. It integrates sensor data (e.g., m2, m3, m4) and processes it using neural network algorithms to optimize power conditioning parameters. This corresponds to the TensorFlow processor's ability to preemptively modify parameters of the first power converter based on predicted downstream load requirements. The TensorFlow-based processing system not only enhances predictive capabilities but also allows the system to continuously learn and improve through feedback loops, leveraging historical datasets and real-time telemetry data.

The TensorFlow-based processing system uses neural network algorithms to optimize power converter settings. It predicts load requirements using time-series analysis, employing equations like:

$$P_{load}(t+1) = P_{load}(t) + \Delta P$$

where $\Delta P$ represents the rate of change in power demand. Neural networks use gradient descent to minimize the error between predicted and actual load demands using equations like:

$$E = \frac{1}{2}\sum(y_{predicted} - y_{actual})^2$$

The TensorFlow processor adjusts the first power converter's parameters to preemptively compensate for predicted power fluctuations, such as increasing voltage by 2% to counteract a predicted 10% load increase.

The TensorFlow-based processing system serves as a predictive interface by developing a multi-dimensional map that models the most likely load changes over time. The multi-dimensional map is a computational model that represents the relationships between multiple system parameters, which may include multi-dimensional parameters, such as voltage, current, power, and load demand, across time and operating conditions. It predicts how changes in one parameter will affect others, enabling the system to anticipate future behavior and guide real-time adjustments for optimal performance. Using real-time data collected from telemetry sensors, the system applies neural network algorithms to analyze trends in load demand, voltage fluctuations, current variations, and other critical parameters. By employing time-series analysis, TensorFlow identifies patterns and rates of change, such as increasing load demand or harmonic distortions, and predicts future conditions based on historical data and real-time inputs. This predictive functionality allows the system to anticipate load changes before they occur, enabling proactive adjustments to control parameters.

The multi-dimensional map generated by TensorFlow represents a probabilistic model of likely system behaviors across various operating conditions. Each dimension in this map corresponds to a key parameter, such as voltage, current, frequency, active power (P), or reactive power (Q). TensorFlow organizes these parameters into a dynamic feature space where changes in one parameter, such as a sudden increase in current, are correlated with adjustments in other parameters, such as voltage or reactive power. By continuously refining this map through feedback loops with historical datasets and real-time telemetry, TensorFlow ensures that the predictions remain accurate and adaptive to evolving conditions.

This predictive map feeds directly into the analog twin, which uses the TensorFlow-generated outputs to preemptively adjust control parameters. For example, if TensorFlow predicts a 10% increase in load demand, the analog twin processes this input and computes precise adjustments to the voltage, current, and impedance to maintain power stability. By integrating TensorFlow's predictive modeling with the deterministic solution pathway of the analog twin, the system achieves optimal alignment of control parameters without iterative recalibration. This seamless interaction ensures that the analog twin can rapidly implement adjustments to compensate for predicted changes, resulting in more stable and efficient power delivery under dynamic conditions.

The control mechanisms 725 correspond to the dynamic adjustment of power delivery parameters, including impedance, resistance, and capacitance. These control mechanisms ensure the system can adapt to transient events in real-time, performing micro-adjustments within less than one millisecond to maintain optimal power delivery. This feature aligns with the system's ability to mitigate voltage fluctuations and harmonic distortions dynamically. The control mechanisms 725 ensure real-time micro-adjustments, such as suppressing voltage spikes within less than one millisecond. For example, transient suppression calculations may include:

$$\Delta I = \frac{\Delta V}{L}$$

where $\Delta I$ is the transient current, $\Delta V$ is the voltage spike, and L is the inductance.

The energy storage system 735, having the bidirectional high discharge battery stack of the secondary power supply, dynamically calculates its charge or discharge rate based on predicted load demands. The charge rate is computed using:

$$I_{charge} = \frac{P_{excess}}{V_{battery}}$$

where $P_{excess}$ is surplus power, and $V_{battery}$ is the battery voltage. If demand increases, the discharge rate is:

$$I_{discharge} = \frac{P_{deficit}}{V_{battery}}$$

These calculations ensure that the battery's state of charge remains optimal, balancing energy storage and delivery.

Finally, FIG. 7 transitions to the downstream loads 730, which represent the electrical devices or systems powered by the uninterruptible power supply. The integration of digital twins, analog twins, TensorFlow processors, and real-time control mechanisms ensures that the final output meets downstream load requirements. For example, if the load requires 500 W with <1% THD, the system dynamically adjusts intermediate output parameters to satisfy these conditions. Calculations such as voltage adjustments, harmonic filtering, and predictive modeling collectively maintain stability, ensuring uninterrupted power delivery.

Figure 8A:
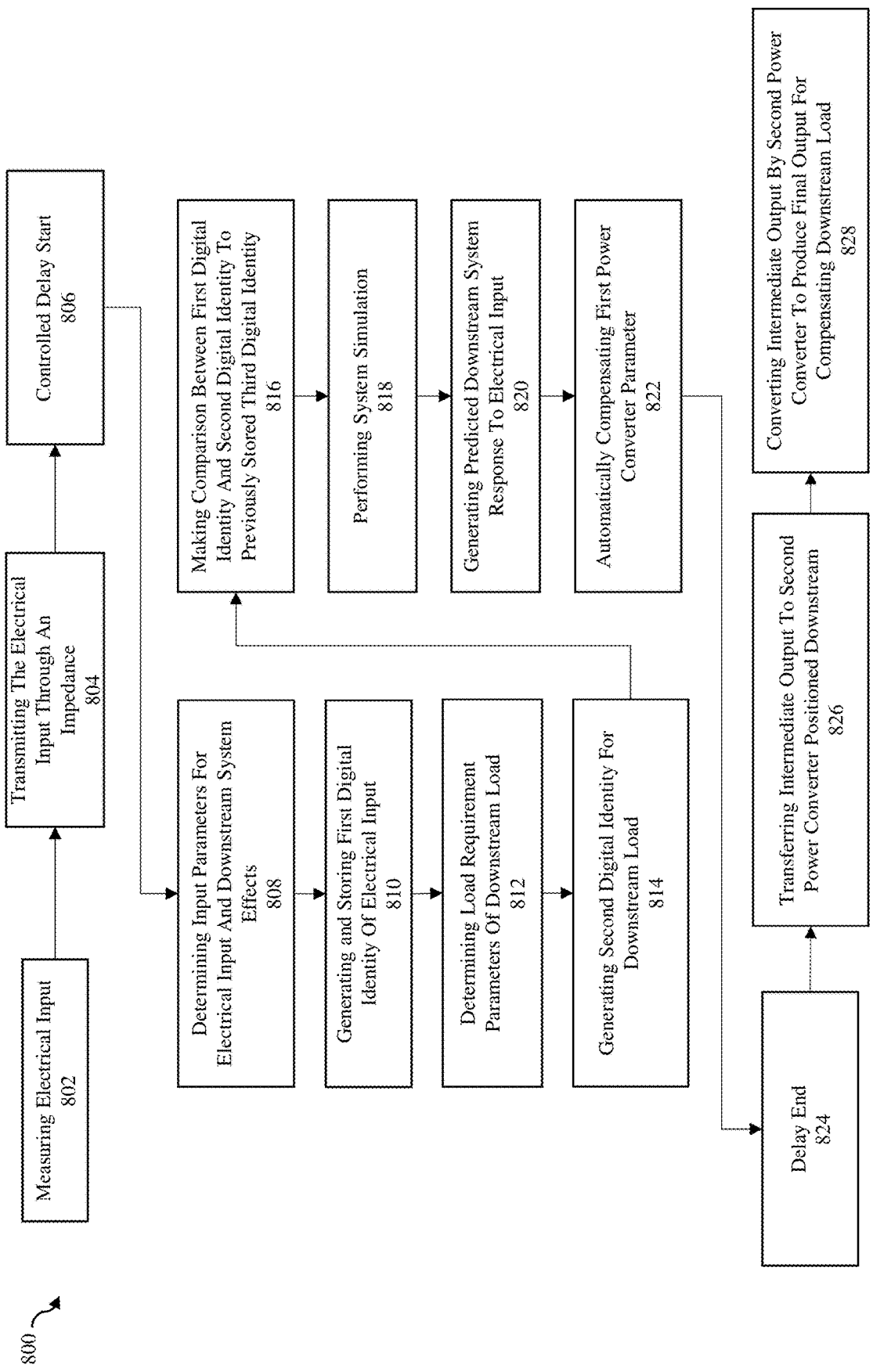
FIG. 8A is a flowchart diagram of steps for a method for conditioning and maintaining power with predictive load compensation using an uninterruptible power supply system is shown, according to an example embodiment.

Referring now to FIG. 8A, a flowchart diagram of steps for a method 800 for conditioning and maintaining power with predictive load compensation using an uninterruptible power supply system is shown, according to an example embodiment. Method 800 begins with step 802, wherein the system measures an electrical input from a primary power supply using a plurality of analog sensors. This step involves the systematic detection and collection of electrical parameters such as voltage, current, and impedance at various points in the power supply system. This measurement is achieved through the deployment of multiple analog sensors strategically positioned upstream of the first power converter. Each sensor is configured to monitor specific characteristics of the electrical input in real time, ensuring continuous and accurate data acquisition. the measurement process involves connecting the analog sensors directly to the electrical lines carrying power from the primary power supply. These sensors are capable of converting the analog signals representing physical quantities like voltage or current into electronic signals that can be processed for further analysis. For example, voltage sensors measure the potential difference between two points, while current sensors measure the flow of electrons through the conductor. Impedance sensors, on the other hand, provide insights into the opposition to current flow, which is a function of both resistance and reactance in the electrical circuit.

In this step, the system captures real-time data on critical electrical input parameters, such as voltage, current, impedance, and harmonic distortion, using a network of telemetry sensors. These measurements provide the foundational data required to analyze the state of the input power and to detect inefficiencies like underloaded systems, unstable voltage levels, or harmonic distortions. By monitoring these metrics continuously, the system not only identifies operational inefficiencies, such as excessive emissions or oversizing of equipment, but also ensures that the incoming power meets the minimum quality standards needed for effective downstream processing. This step sets the stage for generating the first digital identity of the input power.

This step involves capturing real-time measurements of critical electrical input parameters such as voltage, current, impedance, and harmonic distortion using telemetry sensors. Unlike the prior art, which primarily relies on digital sensors and post-digitization processing, this system emphasizes analog sensors that directly measure and process input data. This approach avoids the inherent delays and inaccuracies introduced by digital-only systems, particularly those reliant on cloud-based processing. By leveraging analog measurement, the system ensures data fidelity, faster response times, and a more accurate understanding of input conditions, which directly contributes to the creation of a reliable first digital identity.

In step 804, the system transmits the electrical input through an impedance and/or, in some embodiments, a capacitance. Transmitting the electrical input through at least one of an impedance and a capacitance introduces a controlled delay that enables downstream processes, such as simulations and decision-making. In certain embodiments, the impedance and/or capacitance provides a controlled delay from 4 to 5 milliseconds during transmission of power to a first power converter. This delay ensures that sufficient time is available for the system to analyze the telemetry data and evaluate potential adjustments before power is transferred to the first power converter. During this period, branch analysis can be performed to assess multiple corrective pathways and select the most efficient option for aligning input characteristics with downstream load requirements. This step ensures that the system has the necessary temporal buffer to make informed and effective power adjustments.

The impedance and/or capacitance creates a brief delay in the transmission of power from the primary power supply to the first power converter. This delay is a result of the impedance's and/or capacitance's ability to store and dissipate energy momentarily, allowing the system to perform critical computational and predictive tasks during the transmission. Impedance and/or capacitance, in this context, refers to the total opposition that a circuit element presents to the alternating current (AC) or direct current (DC) flow. It combines both resistive and reactive components, with the reactive component arising from inductance and capacitance. The impedance and/or capacitance is configured to slow the rate at which electrical energy passes through the circuit, creating the controlled delay required for subsequent system operations. In one embodiment, the impedance and/or capacitance may be achieved through the use of inductive elements (such as inductors or coils), capacitive elements (capacitors), or a combination of both. For example, an inductor placed in series with the electrical input could create the necessary delay by temporarily storing energy in its magnetic field. Alternatively, a capacitor might be used to momentarily store charge, thereby introducing a controlled lag in the current flow. In more complex embodiments, an impedance network combining resistors, inductors, and capacitors could be used to fine-tune the delay duration within the desired 4-5 millisecond range.

The introduction of this controlled delay is a deliberate and functional aspect of the system. During the delay, other components—such as sensors, processors, and digital or analog twins—have the opportunity to analyze the input data, generate digital identities, and simulate downstream system responses. This brief window of time ensures that the system can make predictive adjustments to the electrical input before it reaches the first power converter, thereby enhancing the accuracy and reliability of load-adaptive power conditioning. This approach is advantageous because it introduces a passive, hardware-based delay that does not rely on complex electronic controls or software-based timing mechanisms. By leveraging the inherent properties of impedance, the system achieves consistent and predictable delays, enhancing the stability and performance of the UPS system. The controlled millisecond delay provides sufficient time for the system to execute predictive load compensation and adjust power converter parameters, ensuring that the intermediate output aligns closely with the downstream load requirements.

Transmitting the electrical input through an impedance introduces a controlled delay, providing a temporal buffer for downstream simulations, adjustments, and compensations. This impedance delay ensures that the system has sufficient time to analyze telemetry data, predict downstream load behavior, and prepare for real-time adjustments. Unlike prior art systems that rely on computationally expensive cloud-based simulations and decision-making, the impedance delay allows for local, real-time adjustments using analog processing elements. This step teaches away from the prior art's dependence on external systems for handling transient responses, which introduces significant latency and diminishes real-time effectiveness. This presents an improvement over prior art that lack such precision and real-time adaptability in managing power flows.

Then, in step 806, the controlled delay begins. The system performs steps 808 through 822 during the controlled delay.

In step 808, the system determines a plurality of input parameters for the electrical input and a plurality of downstream system effects based on sensor data from a plurality of telemetry sensors. This step involves the collection, analysis, and interpretation of real-time electrical and environmental data. At this stage, the system processes telemetry data from sensors to extract detailed input parameters, such as voltage stability, waveform characteristics, and impedance. It also evaluates how these input characteristics will interact with downstream system effects, such as load response and transient conditions. This process serves for creating detailed data profiles that describe the electrical input comprehensively. By analyzing these parameters, the system gains predictive insights into how the input power will behave under various conditions, enabling it to prepare for necessary adjustments.

Input parameters refer to measurable electrical characteristics of the incoming power, such as, but not limited to, voltage, current, frequency, phase angle, impedance, power factor, and total harmonic distortion (THD). Downstream system effects refer to the impact of these input parameters on the components and loads positioned downstream in the system, including their influence on load performance, power quality, and operational stability. The telemetry sensors are positioned throughout the system to capture both upstream input parameters and downstream response data. For example, voltage sensors monitor variations in the input supply, current sensors detect the magnitude and direction of current flow, and impedance sensors evaluate resistance and reactance within the circuit. Additionally, telemetry sensors placed downstream assess parameters such as harmonic distortions, load power demand, transient voltage spikes, dips, and thermal conditions. These sensors provide real-time feedback, enabling the system to dynamically evaluate the interaction between input power and the downstream system's performance.

The telemetry sensors continuously feed raw data into a processing system, which aggregates and analyzes the information to determine the input parameters of the electrical input. These parameters provide a detailed characterization of the power supply, such as voltage consistency, waveform integrity, and any fluctuations or abnormalities. Simultaneously, sensors monitoring downstream components identify the effects of these input parameters on the system, such as how variations in voltage or current affect the stability, performance, or energy efficiency of connected loads. For instance, an overvoltage condition detected at the input can be correlated with excessive heating or harmonic distortion in the downstream load. The processing system interprets these effects and generates actionable data, forming the basis for predictive adjustments to the power conditioning components.

In this step, the system determines real-time input parameters, including voltage stability, waveform tolerances, and impedance, and evaluates their downstream effects. This data forms the foundation for creating detailed profiles of the electrical input. Unlike the prior art, which converts data into digital form for analysis, the methods herein are directed to direct analog processing, minimizing data loss and reducing the need for error correction. This analog approach ensures higher accuracy and faster decision-making than those methods taught by the prior art.

In step 810, the system generates a first digital identity of the electrical input based on the plurality of input parameters determined in the previous step and stores the first digital identity in a connected database. This digital identity is a structured dataset that encodes real-time electrical characteristics of the input, such as voltage, current, harmonic distortion, and impedance. By storing these identities, the system creates a reference point that can be compared to historical data and future measurements. This structured representation allows the system to identify patterns, detect anomalies, and predict input behavior. The stored first digital identity becomes a critical component of subsequent decision-making processes and simulations.

This step involves converting real-time electrical measurements into a structured, unique digital representation. A digital identity is a computational construct that encapsulates the electrical attributes of the input power. These attributes include parameters such as voltage, current, frequency, phase angle, impedance, and harmonic content. These parameters are inherently multi-dimensional, as they interact dynamically across multiple domains to represent the complex behavior of the electrical input. For example, changes in phase angle might correlate with fluctuations in current or harmonic distortion, creating interdependencies that influence overall system performance. The digital identity serves as a "fingerprint" of the electrical input, uniquely characterizing its behavior at a specific point in time. The input parameters from the system's telemetry sensors are aggregated and processed by a local computing system or a TensorFlow-based processor. Advanced algorithms analyze and normalize the sensor data, eliminating noise or outliers to create a clean and accurate dataset. This dataset is then encoded into a digital identity through feature extraction and transformation techniques. For example, the system might use Fourier transforms to represent waveform properties or statistical methods to summarize variations in electrical attributes. The resulting digital identity is a compact, structured data object that can be stored, transmitted, and compared.

The first digital identity is stored in a connected database, which acts as a central repository for managing power system data. The database may organize the digital identity alongside metadata, such as timestamps, source identifiers, and environmental conditions at the time of measurement. Storing the digital identity enables the system to perform future comparisons, such as correlating the identity with downstream load requirements or comparing it to historical identities to detect deviations. This digital identity contributes to system simulations and predictive modeling. By referencing the stored digital identity, the system can pre-emptively adjust power conditioning parameters, perform analog twin simulations, and optimize power delivery for downstream components.

The generation of the digital identity is accomplished using computational methods and data storage technologies. Algorithms implemented on microprocessors, TensorFlow-based systems, or dedicated digital signal processors perform data analysis and transformation. For storage, the digital identity can be saved in relational databases, NoSQL databases, or cloud-based systems. These databases are typically designed to handle time-series data and ensure fast retrieval for real-time operations.

The system generates the first digital identity by encoding real-time electrical characteristics of the input, such as voltage, current, impedance, and harmonic distortion. This structured dataset serves as a foundation for downstream comparison and simulation processes. By integrating analog twinning into this process, the system preserves the fidelity of input characteristics while enabling deterministic responses. Unlike the prior art's sole reliance on digital twins, which require extensive error correction and recalibration, this system teaches away by combining analog and digital twins, offering greater depth and accuracy in analyzing input parameters.

In step 812, the system determines a plurality of load requirement parameters of a downstream load based on the sensor data from the plurality of telemetry sensors. This step involves the continuous monitoring and analysis of data collected from sensors positioned near or integrated with the downstream load. This step further involves analyzing telemetry data from sensors monitoring the downstream load to determine its specific requirements. Key parameters include the load's power demand, harmonic tolerances, waveform stability, and transient response behavior. By continuously evaluating these parameters, the system can accurately model the load's behavior and identify predictive load characteristics. This information ensures that the system has a clear understanding of the load's operational constraints and needs, forming the basis for the second digital identity.

Load requirement parameters refer to measurable characteristics that define the electrical and operational needs of a downstream load. These parameters include, but are not limited to, power demand, voltage and current thresholds, harmonic content, reactive power, thermal load, and frequency stability. By determining these parameters, the system gains a comprehensive understanding of the load's behavior and requirements. The system processes the sensor data through a local or centralized computational unit, such as a TensorFlow-based processor or digital signal processor (DSP). Algorithms analyze the data to extract key parameters, such as the load's steady-state power demand, transient responses, and susceptibility to voltage dips or harmonic interference. The load requirement parameters interact with the overall system by forming the basis for predictive adjustments and power conditioning.

The system continuously monitors telemetry data from the downstream load to determine its specific requirements, such as power demand, harmonic tolerances, and transient response characteristics. By incorporating predictive modeling, the system anticipates future load behavior, enabling proactive adjustments. This step teaches away from the prior art, which relies on static load models and cloud-based computations that are unsuitable for real-time adaptation. Additionally, the system supports bidirectional power flow, allowing for greater flexibility and stability during dynamic load changes an area largely overlooked in the prior art.

In step 814, the system generates a second digital identity for the downstream load based on the plurality of load requirement parameters determined in the previous step. This identity is a structured dataset that encapsulates the load's operational characteristics and constraints. It is designed to reflect the load's current and predicted behavior, including its ability to tolerate voltage fluctuations or harmonic distortions. The second digital identity is critical for aligning the intermediate output with the downstream load's requirements and ensuring stable power delivery.

The second digital identity is derived from load requirement parameters such as voltage levels, current consumption, power factor, reactive power, harmonic distortion, transient behavior, and thermal loading. This digital identity acts as a comprehensive "profile" of the downstream load, reflecting its real-time power needs and performance metrics. The processing unit applies advanced algorithms to analyze and normalize the data, removing noise or irrelevant fluctuations. It then transforms the data into a structured format, encoding key parameters into a digital identity. This process may include feature extraction techniques like Fourier transforms for harmonic content analysis, statistical modeling for power consumption trends, and machine learning for identifying patterns in transient responses. The second digital identity plays a critical role in enabling the system to optimize power delivery and maintain stability. Once generated, this identity is stored in a connected database alongside the first digital identity of the electrical input. The system compares the second digital identity to both the first digital identity and previously stored historical identities. This comparison allows the system to identify mismatches, anomalies, or inefficiencies in the power delivery process.

For example, if the second digital identity reveals a sudden increase in power demand that exceeds the capacity of the current power delivery settings, the system can trigger preemptive adjustments. These adjustments may include directing additional power from a secondary supply, modifying impedance, or recalibrating power converter parameters. The second digital identity also enables predictive simulations using an analog twin, ensuring that downstream load requirements are met without iterative recalibration.

Unlike the prior art, which uses cloud-based analysis for load modeling, this system processes load data locally and in real time, avoiding the latency and scalability issues associated with network-dependent systems. The second digital identity ensures that the system remains adaptive to dynamic load conditions, teaching away from the static, less responsive models described in the prior art.

In step 816, the system makes a comparison between the first digital identity and the second digital identity to a previously stored third digital identity of an electrical simulation in the connected database. In this step, the first digital identity (representing the input) and the second digital identity (representing the load) are compared against a third digital identity stored in the historical dataset. This comparison allows the system to identify patterns, evaluate deviations, and predict the downstream system's response. The process involves co-simulation and decision-making, wherein the system evaluates how the input characteristics interact with the load requirements based on past operational data. By leveraging this comparison, the system identifies potential corrective actions to align the intermediate output with the load's needs.

This comparison contributes to enabling predictive power conditioning and ensuring that the system operates within optimal parameters to meet downstream load requirements effectively. This process includes analyzing the characteristics encoded in the first digital identity, which represents the input power, and the second digital identity, which encapsulates the downstream load requirements. These digital identities are compared to a third digital identity stored in a connected database, which is a representation of a prior electrical simulation. The third digital identity serves as a reference, constructed from historical data, calibrated models, or predefined system conditions that are known to result in reliable and efficient operation. The third digital identity in the database represents an idealized or historical system behavior, encoded with similar parameters for both the input and the load under specific conditions. The comparison involves computationally evaluating these identities using algorithms that detect discrepancies, trends, or patterns. For example, if the voltage levels in the first and third digital identities differ significantly, this may indicate fluctuations in the input supply that require corrective actions. If the load power demand in the second digital identity exceeds the expected values in the third digital identity, the system anticipates a potential overload and adjusts accordingly. This comparison can utilize various techniques, including numerical analysis, statistical correlation, or machine learning algorithms. TensorFlow-based processors, in some embodiments, are particularly effective for this task, as they can rapidly analyze multidimensional data and identify nonlinear relationships between the input, load, and reference identities.

The comparison of the first digital identity, representing real-time electrical input characteristics, with the second digital identity, representing downstream load requirements, and the third digital identity, representing historical baseline conditions, is performed through a multi-step computational process. Initially, telemetry data collected from sensors is encoded into structured digital identities, each comprising critical parameters such as voltage, current, impedance, harmonic distortion, power demand, and transient behavior. These digital identities are then processed to extract relevant features, which are subsequently transformed into compact mathematical representations, referred to as embeddings, through the application of machine learning algorithms, such as neural networks. The embeddings distill the essential characteristics of the input and load conditions while reducing computational complexity.

The system may employ various pattern recognition algorithms and analysis techniques to facilitate the comparison of the first digital identity, representing electrical input characteristics, and the second digital identity, representing downstream load requirements, with the third digital identity stored in the historical dataset. In one embodiment, the system may utilize a convolutional neural network to identify patterns and correlations between real-time telemetry data and historical profiles. The convolutional neural network processes the embeddings of the digital identities by applying convolutional filters to detect features such as voltage fluctuations, harmonic distortions, and load demand changes. These features are further analyzed through pooling and classification layers to determine the degree of alignment with pre-defined clusters in the feature space. In another embodiment, the system may utilize a support vector machine to classify real-time embeddings by determining their position relative to hyperplanes that separate historical clusters. The support vector machine calculates the proximity of the real-time embeddings to these hyperplanes, identifying the closest matching cluster and triggering the corresponding adjustments. In cases where no match is found, the support vector machine may flag the condition as an anomaly, prompting real-time simulations or predictive modeling to determine corrective actions.

Additionally, the system may apply Euclidean distance analysis to measure the distance between real-time embeddings and the centroids of historical clusters, selecting the closest cluster as the optimal match. In some embodiments, principal component analysis may be employed to reduce the dimensionality of the embeddings while preserving essential features, enabling more efficient pattern recognition and comparison. These algorithms and techniques ensure precise and efficient alignment of the system's output with downstream load requirements, reducing processing delays and enhancing system responsiveness.

The optimal match between the real-time digital identities and the historical third digital identity may be selected based on a calculated degree or interval of confidence, ensuring that the system maintains high precision and reliability in its adjustments. In one embodiment, the system assigns a confidence score to each potential match by evaluating the proximity of the real-time embeddings to the centroids of historical clusters using distance metrics, such as Euclidean distance or cosine similarity. The confidence score represents the likelihood that the real-time conditions align with a specific historical profile, based on the similarity of their features. In another embodiment, machine learning models, such as neural networks or support vector machines, may output a probability distribution over the historical clusters, allowing the system to select the match with the highest probability while ensuring it exceeds a pre-determined confidence threshold. For example, the system may only implement adjustments if the confidence interval for a match exceeds 90 percent, ensuring that low-certainty matches are flagged for further analysis or real-time simulation. In scenarios where no match exceeds the confidence threshold, the system may classify the condition as an anomaly and initiate alternative corrective actions. This approach ensures that the system remains robust and minimizes the risk of errors in power adjustments, particularly in dynamic or unpredictable operating environments.

Once the embeddings are generated, they are mapped into a multi-dimensional feature space, where they are compared against clusters derived from the third digital identity. The third digital identity, stored in a connected database, represents pre-modeled scenarios and historical conditions that serve as baselines for optimal system operation. Using advanced pattern recognition algorithms, the system evaluates the proximity of the first and second digital identities to the clusters in the feature space. If the embeddings align with a specific cluster, the system identifies the corresponding pre-determined adjustments necessary to align the intermediate output with the downstream load requirements. In instances where the embeddings deviate from all known clusters, the system flags the condition as an anomaly and applies predictive modeling and real-time simulation to determine corrective actions.

The confidence associated with the selection of an optimal match between real-time digital identities and historical clusters is calculated using statistical and machine learning techniques that evaluate the similarity and alignment between the embeddings. In one embodiment, confidence is determined by calculating the Euclidean distance between the real-time embedding and the centroids of historical clusters in the feature space. A smaller distance indicates a closer match, and the confidence is inversely proportional to the distance, with a normalization factor applied to scale the score to a range between zero and one. In another embodiment, the system may utilize probabilistic models, such as a Softmax function in a neural network, to assign probabilities to each cluster based on the feature overlap and alignment. These probabilities reflect the likelihood that the real-time embedding corresponds to a specific historical profile and are used as confidence scores. Alternatively, a support vector machine may compute the margin of separation between the real-time embedding and the hyperplane boundaries of each cluster, with confidence increasing as the embedding falls closer to the center of the cluster and farther from the hyperplane boundaries.

In certain embodiments, cosine similarity may be used to measure the angular similarity between vectors, with higher cosine values indicating greater alignment and thus higher confidence. These confidence calculations may be further refined by aggregating results across multiple metrics or by applying statistical methods, such as Bayesian inference, to incorporate uncertainty. Bayesian inference, may be used to incorporate prior probabilities of historical cluster reliability into the confidence calculation, ensuring that matches are weighted based on both similarity and historical frequency.

Additionally, confidence intervals can be derived through hypothesis testing, such as using a t-statistic, to validate that the selected match is significantly closer to the real-time embedding compared to alternative clusters.

K-means clustering analysis may also be employed to partition the historical data into distinct clusters, with each cluster representing a specific combination of input and load characteristics. The real-time embeddings are compared to the centroids of these clusters, and confidence is determined based on the proximity of the embedding to the nearest centroid. Other methods, such as hierarchical clustering, can also be used to create a tree-like structure of relationships between clusters, allowing for multi-level comparison and enhanced granularity in matching. Additionally, Gaussian Mixture Models may be utilized to account for overlapping clusters by assigning probabilistic membership scores, enabling the system to quantify confidence even when the real-time data lies near the boundaries of multiple clusters. These approaches collectively enhance the precision and adaptability of the comparison process.

By quantifying confidence in this manner, the system ensures that adjustments are only implemented when the match meets or exceeds a pre-determined confidence threshold, minimizing the risk of misalignment or erroneous corrections.

This comparison is necessary to ensure the system maintains stability and delivers clean, uninterrupted power. By aligning the real-time digital identities with historical profiles, the system can quickly identify optimal responses to changing conditions without requiring computationally expensive iterative processes. The use of embeddings and feature space mapping allows the system to recognize patterns, anticipate downstream load behavior, and implement pre-calibrated adjustments, thereby reducing latency and improving efficiency. The comparison process operates continuously, forming part of a feedback loop that ensures real-time responsiveness and adaptation to dynamic operating conditions. This method enables deterministic alignment between the electrical input and load requirements, enhancing system reliability and performance.

The results of the comparison are critical for driving the system's adaptive responses. Any deviations between the first or second digital identities and the third digital identity trigger the system to perform predictive adjustments. One adjustment may include modifying power converter parameters, such as switching frequency, voltage output, or current limits, to align the intermediate output with the load requirements. Another adjustment may include activating or deactivating supplementary power sources, such as the bidirectional battery, to ensure stable power delivery. Another adjustment may include recalibrating components such as variable resistors, capacitors, or impedance elements to compensate for detected discrepancies. For example, if the first digital identity indicates harmonic distortion in the input power that does not match the baseline values in the third digital identity, the system can preemptively filter out these distortions before they affect the downstream load.

This comparison enables co-simulation between the analog and digital twins, enhancing the accuracy of downstream adjustments. Unlike the prior art, which relies solely on digital simulations prone to data loss and latency, the invention incorporates analog processing to achieve real-time, deterministic results. This step teaches away from the prior art's error-prone digital differencing methods and emphasizes the depth and precision achieved through analog and digital co-simulation.

In addition to the above-described machine learning and neural network techniques, in certain embodiments, the methods and systems employ generative techniques to refine and converge control parameter outcomes for power conditioning and load compensation. Generative techniques, such as those based on variational autoencoders, generative adversarial networks, or other probabilistic generative models, leverage both historical datasets and real-time telemetry to predict optimal adjustments to control parameters like voltage, current, frequency, and reactive power. These methods operate by creating simulated control scenarios that explore a range of possible outcomes under predicted operating conditions. The generative models extrapolate beyond the available data to anticipate scenarios that have not been directly observed in the historical dataset, enabling the system to make adjustments proactively and with greater accuracy.

The neural network algorithms play a central role in this process, providing the analytical framework to evaluate and refine the generative outputs. Time-series analysis, performed by recurrent neural networks or temporal convolutional networks, identifies patterns in the historical and real-time telemetry data, such as trends in load changes, harmonic distortion, and voltage stability. By learning these patterns, the neural network generates predictive insights that guide the generative models in creating control parameter scenarios. For instance, the system might predict a sudden spike in load demand and use the generative model to simulate the resulting changes in voltage and current. These simulated outcomes are then evaluated by the neural network to determine the most probable and effective control parameter adjustments to maintain stability and efficiency.

The system employs extrapolation techniques within the generative process to extend its predictive capabilities beyond the bounds of the historical dataset. Extrapolation allows the neural network and generative models to account for extreme or atypical operating conditions, such as unexpected load surges or harmonic disturbances. This is achieved by augmenting the input space of the generative model with probabilistic distributions that represent potential deviations from historical norms. For example, the system might use Monte Carlo simulations or Bayesian inference to extrapolate how rare load patterns will impact downstream parameters. This process ensures that the generative model creates realistic and robust scenarios that capture a wide range of potential outcomes.

The integration of generative techniques with machine learning algorithms enhances the system's ability to converge on precise control parameter outcomes. The outputs of the generative model are fed into the system's analog twin, which simulates the physical behavior of the power system in real time. The analog twin processes the generative predictions and compares them with real-time telemetry to identify discrepancies or confirm alignment. This iterative feedback loop ensures that the generative outputs are validated and refined to reflect actual system conditions. As a result, the system achieves deterministic control parameter adjustments that are both optimized and adaptive, reducing latency and computational overhead.

Furthermore, these generative techniques assist in translating predictive insights into actionable results by providing a probabilistic framework for decision-making. The system assigns confidence scores to the generative outputs, prioritizing scenarios that are both likely and beneficial based on current conditions. For instance, if the generative model predicts that increasing voltage by 5% will stabilize the system during a load surge, the neural network validates this adjustment by analyzing the impact on reactive power and harmonic suppression. This tight integration between predictive modeling, generative techniques, and real-time telemetry allows the system to respond dynamically to changes while maintaining optimal performance.

The integration of generative techniques, neural network algorithms, and extrapolation methods provides a significant improvement over the prior art by enabling proactive, accurate, and adaptive control parameter adjustments in real time. Unlike traditional systems, which rely on fixed control algorithms or iterative processes that introduce latency and fail to account for novel or extreme operating conditions, this approach leverages predictive modeling and real-time data to preemptively adjust voltage, current, frequency, and other parameters. The generative techniques allow the system to simulate and evaluate a wide range of potential outcomes, including scenarios outside the bounds of historical datasets, ensuring robust performance under dynamic conditions. Additionally, by coupling predictive outputs with real-time validation through the analog twin, the system eliminates the need for successive recalibrations, reducing computational overhead and improving response times. This capability to generate, validate, and implement optimal control solutions dynamically ensures clean, stable power delivery while addressing complex load conditions more effectively than prior art, which often lacks such predictive and adaptive capabilities.

In step 818, the system performs a system simulation using analog twinning based on the comparison between the first digital identity and the second digital identity to the previously stored third digital identity. This step involves replicating the system's real-time conditions in a physical or computational analog model to predict power delivery outcomes and optimize system performance. System simulation is performed at this stage to model the interaction between the input power and the downstream load. The simulation evaluates how adjustments to the input or intermediate output will affect the load, using data profiles generated from previous steps. Branch analysis is conducted to explore multiple pathways for power adjustments, ensuring the selection of the most effective solution. This step ensures that the system can preemptively identify potential issues and implement corrections before they impact downstream performance.

Analog twinning is a method of creating a physical or analog-based representation of a system's electrical behavior. The analog twin is configured to simulate the interactions between the electrical input (represented by the first digital identity), the downstream load (represented by the second digital identity), and a baseline or historical model of ideal operation (represented by the third digital identity). This simulation enables the system to predict downstream responses to input conditions, identify deviations from expected behavior, and preemptively adjust power delivery parameters. After the comparison of the three aforementioned digital identities, the analog twin replicates the system's behavior under the current conditions. The analog twin uses physical components such as inductors, capacitors, resistors, and analog circuits to model the system's electrical response. Transfer functions or physical properties within the analog twin represent the relationships between the input, load, and system behavior. For example, if the first digital identity shows a slight voltage distortion, the analog twin simulates how this distortion propagates through the system and impacts the downstream load, as characterized by the second digital identity. It then compares the simulated response to the expected behavior defined by the third digital identity to identify discrepancies.

The analog twin performs the simulation in real time, enabling the system to achieve predictive power conditioning without iterative recalibration. The results of the simulation are used to generate a canonical solution for downstream load requirements, which represents the optimal adjustment parameters needed to align the system's behavior with the load requirements. The canonical solution is generated in a single iteration by comparing the electrical input parameter with a downstream load requirement parameter of a downstream load, without additional iterative processing cycles. The results of the simulation are also used to identify potential issues, such as voltage sags, harmonic interference, or transient spikes before they affect the downstream load, and to determine the specific adjustments needed for power converters, impedance elements, or secondary power supplies. For instance, if the simulation reveals that the intermediate output will not meet the downstream load's harmonic distortion tolerance, the system can adjust the power converter parameters, such as switching frequency or voltage levels, in real time to mitigate the distortion.

The analog twin can be implemented using a combination of physical components and computational hardware. For example, analog circuits with precision inductors, capacitors, and resistors can replicate the electrical behavior of the system, while analog signal processors (ASPs) can enhance the twin's real-time responsiveness. In some embodiments, hybrid analog-digital systems may be used, where physical components handle core electrical simulation, and digital processors refine the results using computational algorithms. The system simulation also relies on a feedback loop with telemetry sensors, which continuously provide real-time data to update the analog twin. This ensures that the simulation remains accurate and reflects the current operating conditions.

In certain embodiments, the analog twin incorporates multi-layer matrix elements composed of both resistive and capacitive components to enhance the precision and versatility of its electrical simulations. These matrix elements consist of interconnected layers of resistive and capacitive networks that mimic complex impedance characteristics across different frequencies and load conditions. The resistive layers provide the ability to model power dissipation and energy transfer, while the capacitive layers enable simulation of reactive behaviors, such as harmonic filtering and transient suppression. By leveraging multi-layer matrices, the analog twin can achieve a more granular and accurate representation of the system's dynamic electrical properties, ensuring that it can respond to complex, multi-frequency input scenarios with high fidelity.

The use of multi-layer matrix elements also enhances the analog twin's ability to handle non-linear system behaviors. For instance, the capacitive layers in the matrix can simulate the reactive power required to stabilize voltage fluctuations, while the resistive layers model the energy losses associated with heat dissipation and impedance mismatches. This configuration allows the analog twin to adaptively adjust to varying input parameters, such as changes in load demand or harmonic distortion. Additionally, the matrix structure enables localized adjustments within the twin, where individual resistive or capacitive elements can be tuned to match specific real-time telemetry data, improving the system's ability to generate precise and deterministic control outputs.

An example of multi-layer matrix elements involves a network of interconnected resistive and capacitive components arranged in a layered structure to simulate complex electrical behaviors under varying load and frequency conditions. The first layer of the matrix consists of precision resistors configured to model power dissipation and steady-state load characteristics, with resistances such as arranged in parallel and series combinations to create variable resistance profiles. Overlaid on this resistive layer is a capacitive network designed to simulate reactive power behavior and transient response, with capacitors providing frequency-dependent impedance. These layers are interconnected using programmable switches or semiconductor devices, allowing the system to dynamically adjust the impedance network in response to real-time telemetry data. For instance, if a harmonic distortion is detected at the fifth multiple of the fundamental frequency, specific capacitive elements can be reconfigured into a notch filter to suppress that harmonic, while resistive elements adjust to stabilize power dissipation. In advanced embodiments, active components such as operational amplifiers may be integrated into the matrix to model complex transfer functions, enabling voltage amplification, phase shifting, or waveform shaping to mimic real-world power system behaviors with higher fidelity. This dynamic and adaptable configuration allows the analog twin to simulate and respond to complex scenarios, such as transient voltage spikes or harmonic distortions, in real time, ensuring stable and efficient power delivery.

Furthermore, the incorporation of multi-layer matrix elements facilitates seamless integration with the hybrid analog-digital systems used in certain embodiments. The physical matrix elements provide a foundation for high-speed, real-time electrical simulation, while the digital processors analyze and refine the data to achieve optimal results. For example, telemetry feedback from the system might indicate a transient voltage spike, prompting the analog twin to dynamically adjust specific capacitive elements within the matrix to suppress the disturbance. The digital component then validates and fine-tunes this adjustment to ensure continued alignment with the downstream load requirements. This interplay between resistive and capacitive matrix elements and computational refinement ensures that the analog twin delivers high-performance simulations and real-time responsiveness unmatched by traditional simulation systems.

The incorporation of multi-layer matrix elements composed of resistive and capacitive components provides significant improvements over traditional analog and digital simulation systems by enhancing the precision, responsiveness, and adaptability of the analog twin. Unlike prior systems that rely on single-layer or purely computational models, the multi-layer approach enables a granular simulation of complex impedance behaviors across varying frequencies and load conditions. This allows the analog twin to replicate both linear and non-linear electrical phenomena, such as reactive power compensation, harmonic suppression, and transient response, with greater accuracy and fidelity.

The layered matrix structure also enables localized adjustments within the analog twin, where specific resistive or capacitive elements can be dynamically tuned in response to real-time telemetry data. This capability ensures that the analog twin can adapt quickly to changes in load demand, input voltage fluctuations, or other system perturbations, reducing latency and improving overall system stability. Additionally, the hybrid integration of physical matrix elements with digital processing provides a unique advantage by combining the speed and accuracy of real-time analog simulation with the computational power of digital refinement. This dual-layer approach minimizes the computational overhead and delays typically associated with digital-only systems while maintaining high precision. Overall, the multi-layer matrix elements allow the analog twin to deliver a higher level of simulation fidelity, faster response times, and more robust adaptability compared to traditional methods. This translates into more reliable and efficient power conditioning and load compensation, ensuring optimal system performance under dynamic and unpredictable conditions.

System simulation evaluates how the input characteristics interact with the downstream load requirements, leveraging both analog and digital twins for broader and deeper analysis. This co-simulation allows the system to identify optimal corrective actions and prepare for real-time adjustments. Unlike the prior art, which relies exclusively on computationally intensive digital simulations, this system teaches away by using analog simulations to minimize latency and achieve deterministic outcomes. The result is a faster, more accurate simulation process that supports real-time decision-making.

In step 820, the system generates a predicted downstream system response to the electrical input based on the system simulation and predicted downstream load requirements. This prediction incorporates both input characteristics and load requirements, providing a clear picture of how the intermediate output will align with the load's needs. By anticipating load behavior, the system can take proactive measures to ensure stability and efficiency, such as adjusting impedance or modifying power delivery parameters.

This step involves analyzing the output of the system's simulation, which integrates real-time data from the electrical input, downstream load requirements, and historical reference models. The generation of the predicted response relies on a combination of simulation results and real-time computational analysis. The predicted response may be presented as a time-series dataset, showing how load parameters are expected to change over a given period, or as a set of discrete values indicating specific conditions at a particular moment.

A predicted downstream system response is a forward-looking representation of how the downstream load will behave when subjected to the current electrical input. It considers factors such as power demand, voltage stability, harmonic tolerances, transient responses, and overall load performance. By generating this prediction, the system can align power conditioning measures with the expected behavior of the load, ensuring reliability and efficiency. The predicted downstream system response is derived from the results of the analog twin simulation. The analog twin evaluates the interactions between the electrical input (represented by the first digital identity) and the downstream load requirements (represented by the second digital identity). This simulation incorporates a comparison to a third digital identity, which serves as a baseline model of expected system behavior.

The response prediction is generated by analyzing how the electrical input will propagate through the power system and affect key load parameters such as voltage levels, current flow, harmonic distortion, and thermal conditions. For instance, if the simulation identifies a voltage drop at the intermediate stage, the predicted response may indicate insufficient voltage at the load, prompting preemptive compensation. If harmonic distortion is detected in the input, the predicted response may suggest potential waveform distortion at the load, necessitating filtering adjustments. The system uses advanced algorithms, including machine learning and transfer function analysis, to process the simulation results and generate the predicted response. This prediction may be represented as a structured data object that outlines expected values for critical load parameters under the current input conditions.

The predicted downstream system response serves as a guide for real-time system adjustments. Based on the prediction, the system identifies discrepancies between the predicted response and the downstream load's tolerances or requirements. Corrective actions are also initiated, such as modifying power converter parameters, adjusting impedance, or supplementing power with a secondary supply. Additionally, the system continuously refines its predictions using real-time feedback from telemetry sensors, ensuring that the predictions remain accurate as conditions evolve. For example, if the predicted response indicates that the downstream load will experience harmonic distortion exceeding acceptable thresholds, the system can preemptively adjust the switching frequency of the first power converter or activate harmonic filters.

Using the results of the system simulation, this step generates a predicted response of the downstream load to the input power. The system combines analog telemetry and impedance delay to anticipate how the intermediate output will align with the load's requirements. Unlike the prior art, which lacks robust predictive methodologies for real-time compensation, this invention teaches away by incorporating predictive models that are both faster and more reliable due to their reliance on local processing rather than network-dependent computations.

In step 822, the system automatically compensates, using a local TensorFlow processing system, a first power converter parameter to modify the electrical input to an intermediate output to satisfy a second power converter input parameter and to actively compensate for a plurality of voltage fluctuations and harmonic distortions. For example, the system may modify impedance, regulate voltage, or apply harmonic filtering to stabilize the intermediate output. This step ensures that the power delivered to the second converter is aligned with the downstream load requirements. By relying on local TensorFlow processing, the system ensures that compensation decisions are executed immediately, avoiding delays caused by cloud computing as described in the prior art.

This step involves leveraging advanced machine learning algorithms to dynamically adjust power conditioning in response to real-time system conditions. This process ensures that the intermediate output meets the requirements of the second power converter while mitigating voltage fluctuations and harmonic distortions that could adversely affect downstream loads. This compensation mechanism uses a TensorFlow-based processing system to analyze telemetry data and identify optimal adjustments to the parameters of the first power converter. Parameters such as switching frequency, duty cycle, input voltage, or current limits are modified to transform the electrical input into an intermediate output that aligns with the operational needs of the second power converter. The local TensorFlow system enables real-time decision-making and predictive corrections based on both historical data and current conditions.

The TensorFlow processing system processes sensor data collected from multiple points in the system, including the primary power supply, intermediate stages, and downstream load. This data provides insights into voltage levels, current flow, harmonic distortion, and transient events. Based on this data, the TensorFlow processor identifies specific adjustments to the first power converter, such as adjusting the input voltage to compensate for sags, spikes, or distortions, modifying the converter's switching frequency to optimize power delivery and reduce harmonic distortion, and dynamically adjusting resistance or reactance in the converter circuit to improve power flow and stability. The TensorFlow system employs neural networks trained on historical datasets to predict the optimal converter parameters. It continuously updates its models using real-time feedback, enabling adaptive and precise control.

The first power converter contributes to conditioning the electrical input into an intermediate output suitable for further processing by the second power converter. The TensorFlow processing system ensures that the intermediate output compensates for voltage fluctuations detected in the input supply, providing stable voltage levels to the downstream load. The TensorFlow processing system ensures that the intermediate output also mitigates harmonic distortions by applying advanced filtering or waveform correction techniques within the power converter and aligns with the input requirements of the second power converter, ensuring seamless power delivery throughout the system. For instance, if telemetry sensors detect a harmonic distortion in the electrical input, the TensorFlow system may adjust the first power converter's switching frequency to suppress the distortion in the intermediate output. Similarly, if a voltage spike is detected, the system can reduce the input voltage to prevent overloading the downstream components.

In step 824, the controlled delay ends. The controlled delay initiated earlier ends at this step, allowing the system to finalize any adjustments before transferring power to the second converter. This delay ensures that all necessary simulations, comparisons, and adjustments are completed, providing a stable and optimized intermediate output for downstream processing.

Then, in step 826, the system transfers the intermediate output to a second power converter positioned downstream. The intermediate output, now optimized based on input and load requirements, is transferred to the second power converter. This transfer ensures that the intermediate output is ready for final adjustments to meet the downstream load's specific needs. The system continuously monitors the output during this transfer to maintain alignment with the predicted requirements. By incorporating bidirectional power flow and dynamic impedance control, the system maintains stability and efficiency during this transfer which provides an improvement over static transfer mechanisms that fail to account for dynamic load changes and system adaptability.

This step involves the seamless delivery of conditioned electrical power from the first power converter to the second power converter. This step contributes to maintaining the integrity of power delivery as it ensures that the second power converter receives an optimized intermediate output suitable for further conversion and final distribution to the downstream load. The intermediate output is the result of dynamic adjustments made by the first power converter under the control of the TensorFlow-based processing system. The output typically features minimized voltage fluctuations, reduced harmonic distortions, and stabilized electrical properties. It is transferred through a conductive pathway, such as copper or aluminum wiring, or through a printed circuit board (PCB) if the system is integrated into a compact module. The second power converter, positioned downstream, serves to further process this intermediate output. For example, if the first power converter provides a regulated DC output, the second power converter may convert this to AC for downstream distribution. Alternatively, the second power converter may step up or step down the voltage to meet the specific needs of the downstream load. The transfer process ensures that the intermediate output reaches the second power converter without introducing significant losses or distortions, preserving the quality of power achieved by the first power converter.

The intermediate output interacts with the second power converter by serving as its input power source. The second power converter is configured to accept this pre-conditioned input and perform additional transformations as required by the downstream load. The intermediate output's stability and quality contribute to ensuring the efficiency and reliability of the second power converter's operation. For example, if the intermediate output exhibits even minor fluctuations, the second power converter may need to compensate, potentially reducing system efficiency. Conversely, a well-conditioned intermediate output minimizes the load on the second power converter, allowing it to focus on its primary function of final conversion and delivery. The transfer process may also involve a feedback mechanism where the second power converter provides performance data back to the system. This data is used to fine-tune the intermediate output in real time, ensuring optimal power delivery.

In step 828, the system converts the intermediate output by the second power converter to produce a final output for compensating the downstream load. The second power converter performs the final adjustments to the intermediate output, ensuring that the power delivered to the downstream load meets its operational requirements. This includes stabilizing voltage levels, suppressing harmonic distortions, and compensating for any transient conditions. Instead of relying on digital-only differencing and reactive programming, this system integrates analog and predictive processing to achieve more accurate and deterministic results.

This step involves transforming the regulated intermediate power into a format, voltage, or current level optimized to meet the precise requirements of the downstream load. This step ensures reliable and efficient power delivery, addressing any remaining electrical conditions that the intermediate output does not fully satisfy. The second power converter processes the intermediate output received from the first power converter and converts it into a final output that aligns with the operational needs of the downstream load. This conversion may involve changing the voltage level (step-up or step-down), converting between AC and DC power (or vice versa), refining waveform quality to reduce harmonic distortion, regulating current to prevent surges or dips. The final output is the fully conditioned power supplied to the downstream load, configured to ensure stable operation and optimal performance of the connected equipment.

The second power converter is a device or system component configured to perform precise electrical transformations. Depending on the application, the conversion process may involve voltage conversion, waveform smoothing, and/or current regulation. If the downstream load requires a voltage level different from the intermediate output, the second power converter adjusts it using transformers, buck/boost converters, or similar mechanisms. For loads sensitive to waveform distortions, the second power converter applies filtering or harmonic suppression techniques to deliver clean power. The converter ensures that the load receives consistent current levels, avoiding spikes or drops that could damage sensitive equipment. For example, in one embodiment, the intermediate output might be a regulated DC voltage, which the second power converter transforms into AC to power industrial equipment. In another embodiment, the converter may refine the waveform of an AC intermediate output to meet harmonic distortion tolerances for sensitive electronic devices.

The second power converter serves as the final stage in the power conditioning process. It interacts with both the intermediate output and the downstream load. The intermediate output is the input to the second power converter, already pre-conditioned by the first power converter to meet baseline quality standards. The final output produced by the second power converter directly compensates for the downstream load, addressing its specific power requirements. The conversion process is closely tied to real-time feedback from telemetry sensors positioned at or near the downstream load. These sensors provide data on load conditions, enabling the system to adjust the second power converter's parameters dynamically. For instance, if the load's power demand increases suddenly, the converter can adapt its output voltage or current to accommodate the change.

Figure 8B:
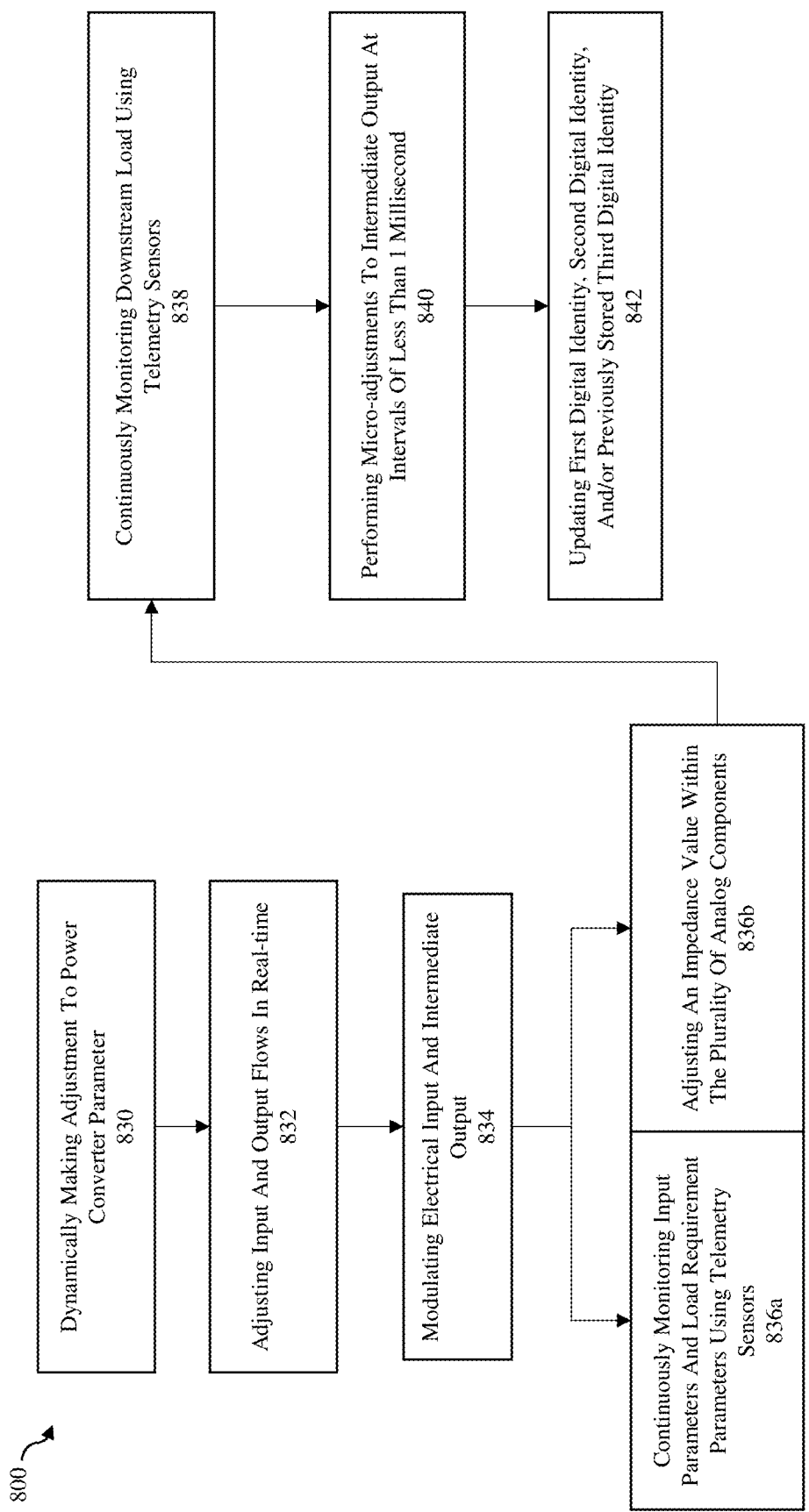
FIG. 8B is a flowchart diagram of additional steps for the method for conditioning and maintaining power with predictive load compensation using an uninterruptible power supply system, according to an example embodiment.

Referring now to FIG. 8B, a flowchart diagram of additional steps for method 800 is shown, according to an example embodiment. In step 830, the system dynamically makes an adjustment to at least one power converter parameter based on the canonical solution achieved by the analog twin. By relying on analog twinning and local machine learning, the system ensures faster and more accurate adjustments providing an improvement over systems that rely solely on cloud computing for real-time controls, which introduces unacceptable latency and scalability issues.

The canonical solution, as implemented within the system, represents a deterministic and optimal method for aligning electrical input characteristics with downstream load requirements through a single-step adjustment process. This solution is enabled by the integration of real-time telemetry data collected from analog sensors, pre-calibrated analog twin simulations, and a repository of historical datasets that encapsulate previously observed system behaviors and their corresponding adjustments. By leveraging these components, the system calculates precise corrective actions without requiring iterative recalibration or successive computational approximations, ensuring immediate and accurate responses to changing operating conditions.

Specifically, the canonical solution utilizes the analog twin to simulate the physical behavior of the power system in real time, modeling the interaction of input parameters such as voltage, current, and impedance with downstream load characteristics. The analog twin, which is pre-calibrated using historical datasets, operates as a hardware-based processing element that dynamically identifies the necessary adjustments to input or intermediate output parameters to achieve alignment with the load's predicted requirements. For instance, if the system detects a harmonic distortion in the input waveform, the analog twin directly maps this condition to a corresponding filtering solution derived from the pre-calibrated dataset, applying the adjustment without requiring iterative error correction or recalibration. This deterministic pathway ensures that the system responds to dynamic conditions instantaneously, with sub-millisecond precision.

Furthermore, the canonical solution incorporates predictive modeling to enhance its ability to preemptively address potential discrepancies between input conditions and load requirements. By comparing real-time telemetry data with stored historical profiles, the system identifies patterns or deviations and calculates the optimal response in a single iteration. For example, when a voltage sag is detected, the system references pre-calibrated impedance adjustments and applies them immediately to stabilize the intermediate output, ensuring that the downstream load remains unaffected. This capability is in contrast to traditional systems, which rely on successive iterative processing or digital-only approximations that introduce latency and reduce response effectiveness.

The canonical solution represents a significant advancement in real-time power conditioning, as it combines the high-fidelity, deterministic processing of the analog twin with the predictive capabilities of historical datasets and real-time telemetry. This integration ensures that the system achieves optimal alignment between input and load requirements efficiently and reliably, even in complex and dynamic operating environments.

This step involves real-time tuning of the power converter's operational characteristics to align power delivery with the requirements of the downstream load. The adjustment is configured to maintain optimal power delivery to the downstream load without successive iterations. The adjustment refers to the modification of specific parameters within the power converter, such as voltage levels, current limits, switching frequency, or impedance settings. The goal is to achieve and maintain optimal power delivery that satisfies the load's electrical demands and compensates for transient disturbances, such as voltage sags, harmonic distortions, or fluctuating power demand, based on the pre-calculated canonical solution. The canonical solution, determined by the analog twin, represents the optimal operating configuration for the system under current conditions. It encapsulates the ideal adjustments required to align the intermediate output with downstream load requirements. Based on this solution, the system dynamically modifies one or more of the following power converter parameters. For example, if the analog twin simulation identifies that the downstream load is experiencing a voltage dip, the canonical solution may recommend increasing the power converter's output voltage to compensate for the deficiency. Similarly, if harmonic distortion is detected, the solution may adjust the switching frequency to filter out unwanted harmonics. The adjustment is made instantly, without requiring iterative recalibrations or trial-and-error processes. This eliminates delays and ensures continuous, uninterrupted optimal power delivery.

In step 832, the system adjusts input and output flows in real-time by controlling a plurality of analog components. The plurality of analog components receive feedback from the plurality of telemetry sensors to modulate the electrical input and the intermediate output. This step involves dynamically managing the behavior of key circuit elements, such as resistors, capacitors, and inductors, to optimize the electrical characteristics of both the incoming power and the intermediate output. The adjustment process entails modifying the operational parameters of analog components in the power system to stabilize voltage, current, impedance, and harmonic properties. These real-time adjustments help maintain consistent power quality, compensate for transient events, and align the intermediate output with the downstream load's requirements. The plurality of analog components includes circuit elements positioned within the power system to regulate electrical characteristics. Components may include variable resistors, capacitors, inductors, and transformers. Variable resistors are used to control current flow by adjusting resistance, reducing overloads, or stabilizing current spikes. Capacitors are employed to store and release charge, smoothing out voltage fluctuations or filtering high-frequency noise. Inductors are utilized to regulate current flow and reduce harmonic distortions by leveraging their magnetic energy storage properties. Transformers adjust voltage levels dynamically to optimize input and output conditions.

Telemetry sensors placed throughout the system provide real-time feedback on parameters such as voltage, current, frequency, power factor, and harmonic content. For example, upstream sensors monitor the electrical input from the primary power supply, identifying fluctuations or abnormalities. Downstream sensors assess the intermediate output and load conditions, detecting discrepancies or transient events. Based on this feedback, control algorithms modify the behavior of analog components to achieve specific objectives. For instance, modification may include increasing resistance in a variable resistor to limit current during an input surge, activating capacitors to smooth out voltage ripples in the intermediate output, and adjusting the inductance to filter harmonic distortion detected in the input power.

Because the system adjusts input and output flows simultaneously in real time using predictive modeling and analog telemetry, the system operates as a closed-loop process. This closed-loop control mechanism allows the system to adapt proactively to load changes. Unlike the prior art, which lacks predictive methods for real-time flow adjustments, the methods and systems described herein ensure that adjustments are made dynamically and autonomously. The system integrates a feedback mechanism whereby telemetry data, including voltage, current, impedance, and load demand, is processed to detect deviations from expected parameters. These deviations are analyzed, and the system applies immediate corrective adjustments to maintain alignment between the input power and the load's requirements. This closed-loop operation ensures that every adjustment is validated and refined through real-time feedback, enabling precise, adaptive responses to transient events and load fluctuations. By utilizing this iterative feedback and control mechanism, step 832 achieves continuous operational stability and optimization.

In step 834, the system modulates the electrical input and intermediate output by adjusting at least one variable resistor and capacitor based on the sensor data from the plurality of telemetry sensors to compensate for voltage fluctuations and harmonic distortions. This step involves dynamically altering the resistance and capacitance within the power system in response to real-time data provided by telemetry sensors. Modulating the electrical input and intermediate output refers to the active control of variable resistors and capacitors in the circuit to regulate electrical characteristics. By changing the resistance or capacitance, the system can influence the behavior of current flow, voltage levels, and harmonic content, allowing for precise compensation of undesirable fluctuations and distortions. Variable resistors and capacitors are integral components that provide tunable control over the electrical properties of the system. Variable resistors adjust the amount of resistance in the circuit, which directly impacts the current flow. Increasing resistance can limit excessive current during surges, while decreasing resistance allows greater current flow under normal conditions. Capacitors store and release electrical charge, enabling them to smooth out voltage ripples or filter out high-frequency harmonic distortions. By modulating the capacitance, the system can alter the timing and magnitude of energy storage and release.

Telemetry sensors monitor the electrical input and intermediate output for parameters such as voltage stability, current flow, and harmonic content. For example, voltage sensors detect fluctuations such as spikes, sags, or oscillations, and harmonic analyzers identify distortions in the waveform, such as high-frequency noise or deviations from the expected sinusoidal shape. The data from these sensors is processed in real-time by a local control system, which calculates the necessary adjustments to the variable resistor or capacitor settings. For instance, if a voltage spike is detected, the system may increase the capacitance to absorb and stabilize the excess energy. If harmonic distortion is identified, the system may adjust both resistance and capacitance to create a filter that suppresses unwanted frequencies.

In step 836a, the system continuously monitors the input parameters and load requirement parameters using the plurality of telemetry sensors. The system uses telemetry sensors to continuously collect real-time data on the electrical characteristics of the input power and the downstream load. This provides an improvement over the prior art because, unlike the prior art which converts all analog data into digital form before processing, this system processes data directly in analog form, preserving fidelity and reducing latency.

The input parameters include voltage, current, frequency, and impedance of the incoming supply, while load requirement parameters encompass power demand, harmonic distortion tolerances, and transient behaviors of the downstream load. Based on this data, the system dynamically adjusts impedance values within the analog components to regulate power flow and address fluctuations or distortions. Telemetry sensors are strategically positioned throughout the system to capture data from critical points. Upstream sensors monitor input power characteristics, including voltage stability, current levels, and harmonic distortions. Downstream sensors measure load parameters such as power consumption, waveform quality, and load resistance.

In step 836b, the system adjusts an impedance value within the plurality of analog components in real-time based on the sensor data. This ensures stability during transient events and minimizes power loss. The impedance adjustment involves modifying circuit elements, such as resistors, inductors, and capacitors, to achieve the desired electrical properties. Variable resistors adjust resistance to control current flow and stabilize power delivery. Inductors modify inductance to manage current fluctuations and filter harmonic distortions. Capacitors regulate capacitance to smooth voltage ripples and absorb transient spikes. For instance, if telemetry sensors detect a sudden drop in input voltage, the system might increase impedance in the circuit to limit the current surge, protecting downstream components and maintaining stable power delivery. Conversely, if the load demands a higher power supply, the system can reduce impedance to allow more current flow. In another example, if harmonic distortion is detected in the input power, the system might adjust the inductance and capacitance values to create a low-pass filter that suppresses high-frequency noise. Similarly, if the downstream load experiences a sudden increase in power demand, the system can dynamically reduce resistance to accommodate the additional current flow.

In step 838, the system continuously monitors the downstream load using a plurality of telemetry sensors. The plurality of telemetry sensors provide feedback to the local processing system to maintain a steady-state condition of the final output in accordance with the canonical solution. This step involves real-time acquisition and processing of data from a plurality of sensors that are strategically placed to measure critical parameters of the load. These parameters include, but are not limited to, power demand, voltage levels, current flow, harmonic tolerances, and transient response characteristics.

The telemetry sensors collect this data continuously to provide a detailed, dynamic profile of the downstream load's behavior. This profile allows the system to assess whether the intermediate output meets the load's requirements and to detect fluctuations or deviations that may indicate the need for adjustments. The monitoring performed in step 838 forms a feedback loop, ensuring that any changes in the load's operational state—such as increased demand or sudden transients—are captured in real time.

The data collected during this step is further used to update the system's digital identities (as described in step 842) and inform subsequent micro-adjustments (step 840) to maintain precise alignment between the power supply and the load's requirements. This continuous monitoring capability ensures system responsiveness, stability, and optimal performance in dynamic operating conditions.

Step 838, involving the continuous monitoring of the downstream load using telemetry sensors, may occur simultaneously, concurrently, or subsequently with other method steps described in the system's operation. This non-limiting flexibility ensures that the monitoring process is seamlessly integrated into the broader workflow of power conditioning and predictive load compensation. For example, the collection and analysis of telemetry data may occur concurrently with step 834, where the electrical input and intermediate output are modulated, enabling real-time feedback to directly inform power adjustments. Similarly, the monitoring may take place simultaneously with step 836a, where input parameters and load requirement parameters are continuously assessed using telemetry sensors, providing a unified dataset for comprehensive system analysis.

In some implementations, step 838 may also occur subsequently to adjustments made in step 830, where power converter parameters are dynamically modified, or step 836b, where impedance values are adjusted within the system's analog components. This sequential approach allows the system to validate the impact of these adjustments by analyzing the downstream load's response and updating the digital identities accordingly. The simultaneous, concurrent, or subsequent execution of step 838 ensures that the system maintains a robust and adaptive monitoring framework, allowing for dynamic alignment between input conditions, intermediate outputs, and downstream load requirements. This flexibility supports the system's ability to operate efficiently in variable or complex environments, providing continuous and reliable power delivery.

In step 840, the system performs micro-adjustments to the intermediate output at intervals of less than 1 millisecond by altering a resistance and capacitance within the plurality of analog components in response to transient voltage spikes and dips detected by the plurality of telemetry sensors. The combination of the steps herein allow this system and method to improved over the prior art to achieve processing and response speeds that are otherwise not achievable due to reliance on slower, network based controls.

This step involves making rapid and precise changes to the electrical characteristics of the system to stabilize the output and mitigate transient voltage events. This process contributes to maintaining power quality and ensuring uninterrupted operation of the downstream load during sudden fluctuations. Micro-adjustments are small, incremental changes applied to the resistance and capacitance of analog components in real-time. These adjustments are executed at extremely high speeds, with intervals of less than 1 millisecond, to counteract transient events such as voltage spikes or dips detected by telemetry sensors. By fine-tuning these electrical properties, the system ensures that the intermediate output remains within the acceptable range required by the downstream components. The system responds to detected anomalies by adjusting resistance and/or capacitance. Variable resistors (such as digital potentiometers) are dynamically adjusted to control the current flow and stabilize voltage levels. For example, increasing resistance during a voltage spike can limit the current and reduce the spike's impact. Capacitors are modulated to store or release charge as needed, smoothing out voltage dips or absorbing excess energy during spikes. For example, increasing capacitance during a voltage dip helps maintain a steady voltage supply to the load.

In step 842, the system updates at least one of the first digital identity, the second digital identity, and the previously stored third digital identity based on a plurality of adjustments to compensate the downstream load. This step involves continuously refining and recalibrating these digital representations to reflect real-time changes in the system's operating conditions. This process ensures that the system adapts dynamically to input variations, load demands, and adjustments made during operation, maintaining alignment between the system's power delivery and the downstream load requirements. The first digital identity represents the characteristics of the electrical input, the second digital identity reflects the requirements and behavior of the downstream load, and the third digital identity serves as a historical or modeled reference for ideal system behavior. Updating these identities involves incorporating data from telemetry sensors, operational adjustments, and historical comparisons to improve the accuracy and relevance of these digital representations in real time.

For updating the first digital identity, real-time telemetry data from upstream sensors captures any changes in the input parameters, such as voltage, current, impedance, or harmonic distortion. For example, if adjustments to impedance or capacitance are made upstream to address voltage fluctuations, these changes are incorporated into the first digital identity to reflect the modified input conditions accurately. This updated identity provides a more precise representation of the input power as it interacts with downstream components. For updating the second digital identity, feedback from telemetry sensors near the downstream load monitors the load's behavior and requirements after the system has compensated for fluctuations or changes. For instance, if the load experiences a sudden increase in power demand, and the system adjusts output parameters to compensate, the second digital identity is updated to reflect the new load requirements. This updated identity ensures that the load's changing demands are continuously reflected in the system's predictive modeling. The third digital identity, stored in the connected database, represents the historical or idealized baseline for system behavior. Updating this identity involves incorporating data from real-time operations to refine the reference model. For example, if a new type of transient event is encountered and successfully mitigated, the adjustments made during this process are added to the third digital identity, improving its accuracy for future comparisons. This iterative refinement allows the system to learn from operational experience, enhancing its predictive and adaptive capabilities.

The digital identities are recalibrated and updated in the connected database, ensuring that they accurately represent the current state of the system. The updated identities are used for future simulations, comparisons, and adjustments, enabling the system to adapt dynamically and improve over time. For example, if the system compensates for a voltage sag by adjusting impedance and increasing output voltage, the first digital identity is updated to include the modified input parameters, the second digital identity is updated to reflect the new load conditions, and the third digital identity incorporates the successful mitigation strategy for future reference.

Figure 9:
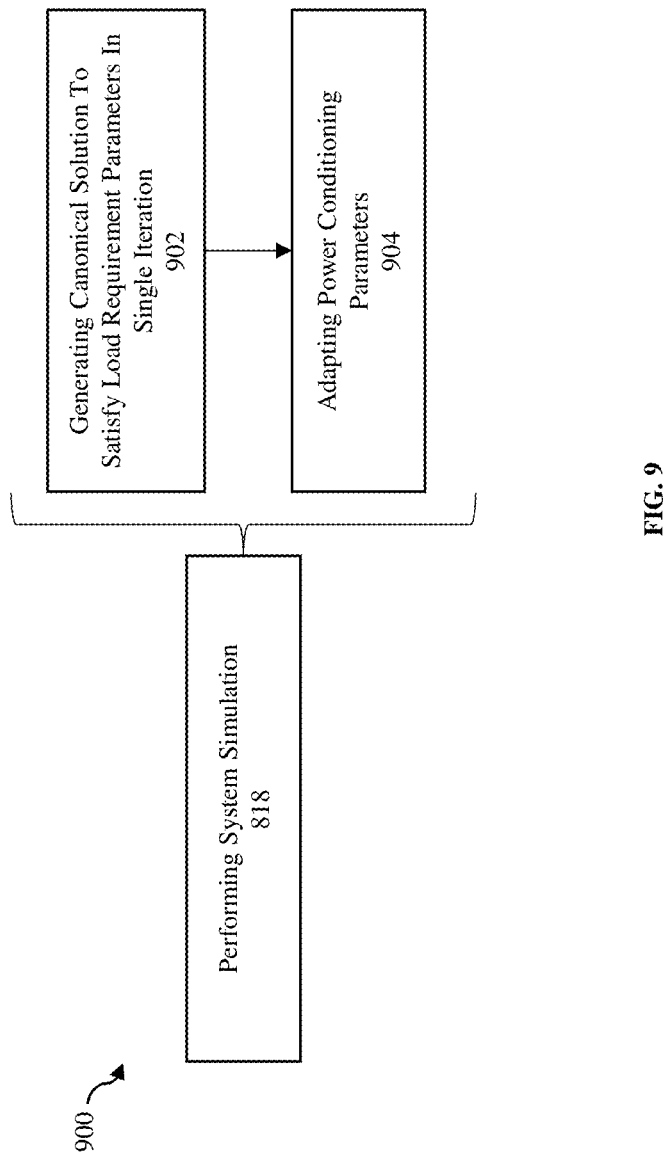
FIG. 9 is a flowchart diagram of steps for a method for performing a system simulation, according to an example embodiment.

Referring now to FIG. 9, a flowchart diagram of steps for a method 900 for performing 818 the system simulation is shown, according to an example embodiment. In step 902, the system generates a canonical solution to satisfy the plurality of load requirement parameters in a single iteration by directly comparing the first digital identity and the second digital identity without additional iterative processing cycles. This step involves deriving an optimal set of power conditioning parameters by directly comparing the first digital identity, representing the electrical input, with the second digital identity, representing the downstream load requirements. This process eliminates the need for iterative recalibration or repeated processing cycles, allowing the system to achieve rapid and efficient power delivery adjustments in real time. A canonical solution is a deterministic, single-step resolution that aligns the system's input power characteristics with the requirements of the downstream load. It is computed by leveraging the detailed and structured data provided by the first and second digital identities, bypassing the need for trial-and-error or multiple iterative adjustments. This approach ensures immediate and accurate alignment of power delivery with load demands.

The system directly compares the first digital identity and second digital identity, identifying discrepancies or mismatches between the input parameters and load requirements. This comparison is executed using advanced computational methods, such as matrix operations, pattern matching, or machine learning algorithms. The canonical solution is generated by calculating the optimal adjustments to input and intermediate parameters (e.g., impedance, voltage, frequency) required to satisfy the load requirements while maintaining stability and efficiency. For example, if the first digital identity indicates a voltage level slightly below the load's requirement as defined by the second digital identity, the canonical solution may specify an increase in the output voltage of the first power converter. If the load requires a specific harmonic distortion tolerance and the input exhibits deviations, the solution may recommend adjustments to the power converter's switching frequency or impedance values to filter out unwanted harmonics.

The system utilizes the analog twin configured to process input parameters and load requirement parameters in real-time, enabling the uninterruptible power supply system to reach a steady-state solution in the single iteration without further recalibration steps. By processing these parameters concurrently, the analog twin determines the precise adjustments required for the system to achieve steady-state operation, such as tuning output voltage, mitigating harmonic distortions, or stabilizing current fluctuations. These adjustments are based on deterministic physical relationships rather than iterative computational models, enabling the analog twin to output a solution almost instantaneously. For example, if the analog twin detects that the input voltage is slightly below the load's required threshold, it calculates the necessary boost in voltage and updates the power converter's settings in real-time. This adjustment is implemented immediately, ensuring the intermediate output meets the load requirements in a single iteration.

In step 904, the system adapts power conditioning parameters based on the canonical solution to preemptively align the intermediate output with the predicted downstream load requirements. This step involves dynamically configuring system components to ensure the intermediate output matches the load's future demands. This process leverages the canonical solution—a deterministic, single-step calculation that resolves discrepancies between the electrical input and load requirements—to adjust key power conditioning parameters in real time, preventing performance degradation or disruptions. This adaptation process adjusts critical power conditioning parameters, such as voltage, current, frequency, impedance, or harmonic filtering, to proactively prepare the intermediate output for anticipated load requirements. These adjustments ensure the intermediate output is optimized before it reaches the downstream load, preempting issues such as voltage instability, current surges, or harmonic distortions. For example, if the canonical solution predicts that the downstream load will require additional power during a peak operating period, the system may increase the intermediate output's voltage and current in advance, ensuring seamless load compensation without delays.

Figure 10:
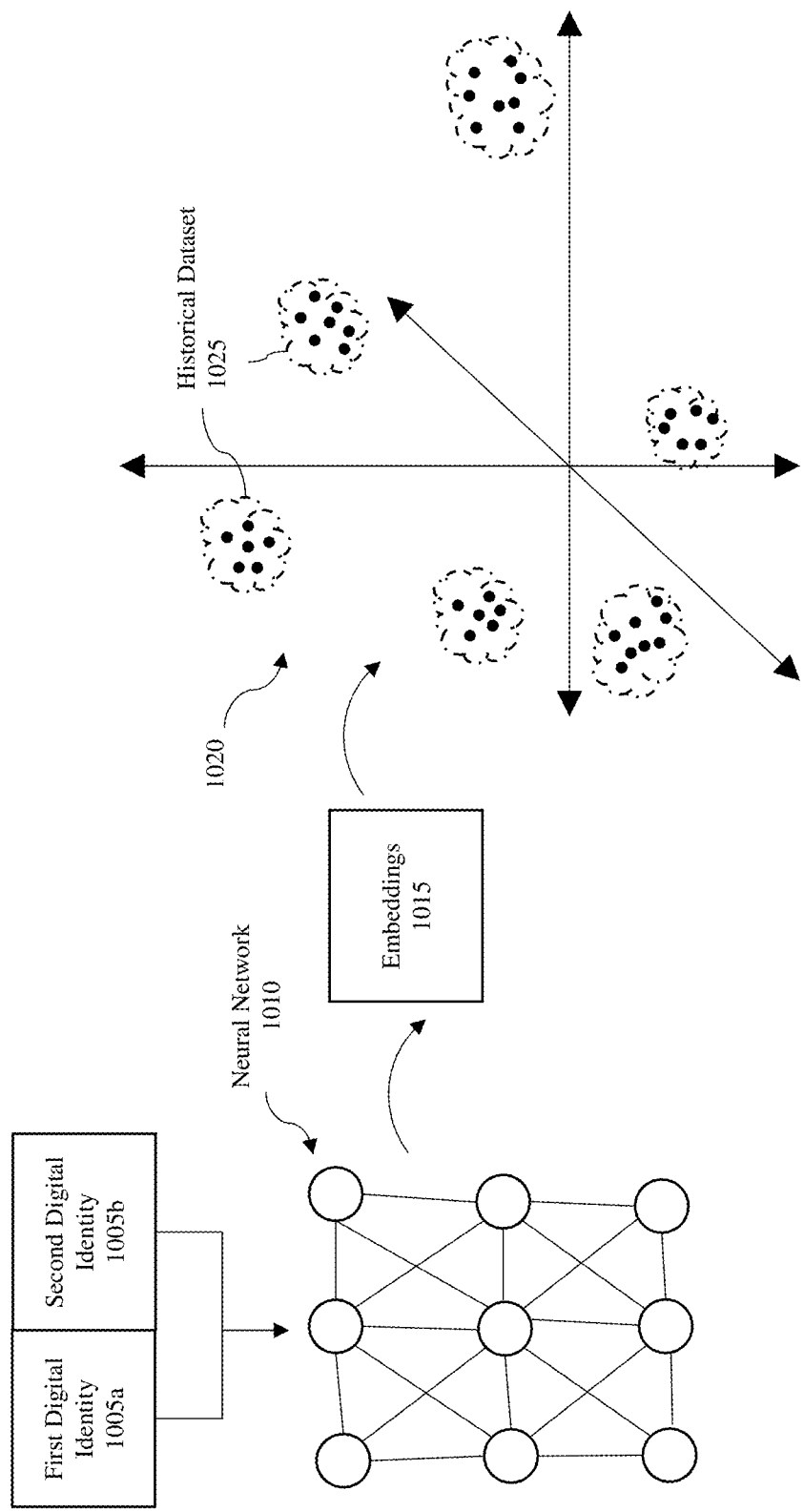
FIG. 10 illustrates the process of training a neural network is shown, according to an example embodiment.

FIG. 10 illustrates the process of leveraging a neural network to analyze and compare the first digital identity (1005a), representing the electrical input, and the second digital identity (1005b), reflecting the downstream load requirements, against a historical dataset (1025) to optimize power delivery. The first digital identity encodes real-time electrical input characteristics, such as voltage, current, impedance, and harmonic distortion, while the second digital identity encapsulates downstream load requirements, including power demand, harmonic tolerances, and transient behavior. Both identities are structured datasets that serve as inputs to the neural network (1010), which acts as the core computational model for extracting patterns, normalizing data, and identifying relationships between the input and load conditions.

The neural network processes these digital identities to generate intermediate representations called embeddings (1015). These embeddings are compact mathematical constructs that distill the most relevant features of the input and load data, allowing for efficient comparison and analysis. The embeddings are then mapped into a feature space (1020), where they are compared against clusters derived from the historical dataset (1025). The historical dataset represents a stored collection of previously observed system behaviors, serving as a reference for expected conditions or baseline performance.

By comparing the embeddings to these historical clusters, the system identifies patterns or anomalies that inform real-time decisions about power conditioning adjustments. For instance, if the embeddings align closely with a specific cluster in the historical dataset, the system can preemptively adjust parameters to replicate successful past outcomes. Conversely, deviations from the expected clusters may prompt corrective actions to stabilize power delivery.

This process highlights how the system utilizes the neural network to transform raw digital identities into actionable insights. By analyzing embeddings within the feature space, the system achieves data-driven predictions that align the intermediate output with the downstream load's predicted requirements. The use of embeddings simplifies computational complexity, enabling efficient real-time analysis while preserving critical information about the system's state. Additionally, the neural network continuously refines its ability to generate accurate embeddings, enhancing the system's adaptive learning and improving decision-making over time. This approach ensures precise, responsive, and optimized power delivery in dynamic operating environments.

Figure 11:
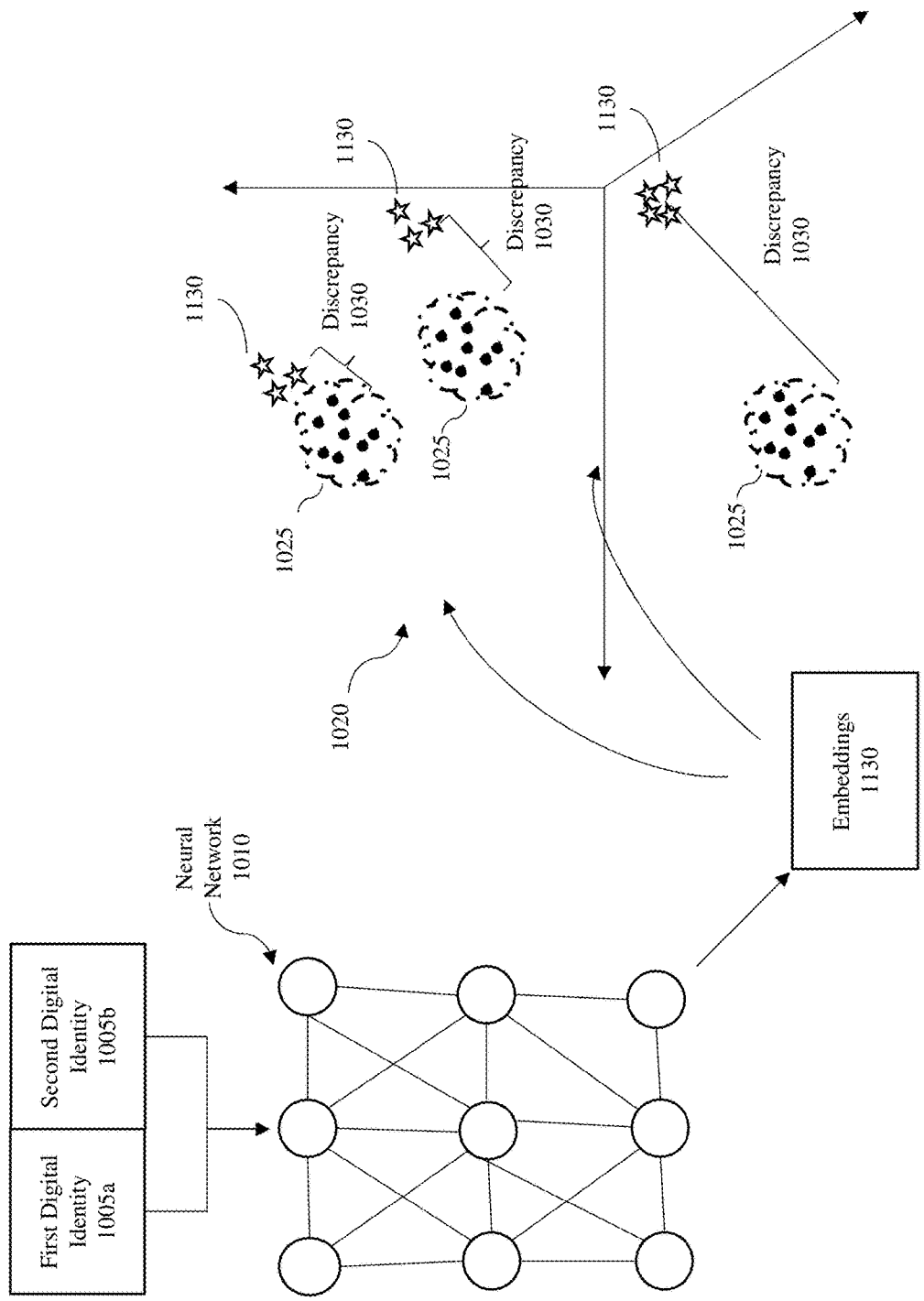
FIG. 11 illustrates the process of using the neural network to analyze discrepancies, according to an example embodiment.

FIG. 11 illustrates the process of analyzing discrepancies between embeddings generated from the first digital identity (1005a) and the second digital identity (1005b) when compared to reference clusters in a historical dataset (1025). The first digital identity represents real-time input parameters such as voltage, current, impedance, and harmonic distortion, while the second digital identity encapsulates the requirements and behavior of the downstream load, including power demand, harmonic tolerances, and transient response characteristics. These digital identities are input into a neural network (1010), which processes them to generate compact mathematical representations known as embeddings (1130).

The embeddings are mapped into a feature space (1020), where they are compared against clusters in the historical dataset (1025). These clusters represent previously observed conditions or idealized operational baselines. The comparison allows the system to identify discrepancies (1030) between the embeddings and the expected clusters. Discrepancies are highlighted as points where the embeddings deviate from the nearest cluster in the feature space, indicating a misalignment between the current system state and historical norms or operational expectations.

The discrepancies (1030) may correspond to deviations in power quality, such as unexpected voltage fluctuations, harmonic distortions, or mismatches between the input and load requirements. These discrepancies are flagged for further analysis, enabling the system to take corrective actions. For example, the system may adjust power conditioning parameters such as impedance, voltage levels, or harmonic filtering to bring the embeddings closer to the expected cluster, aligning the intermediate output with downstream load requirements.

FIG. 11 demonstrates how the system leverages neural networks and historical datasets to monitor and identify deviations in real-time power delivery. By detecting discrepancies in the embeddings, the system ensures proactive adjustments, maintaining high power quality and reliability while adapting to dynamic operating conditions. This process supports the predictive and adaptive capabilities of the system, enhancing its ability to maintain optimal performance in complex environments.

Figure 12:
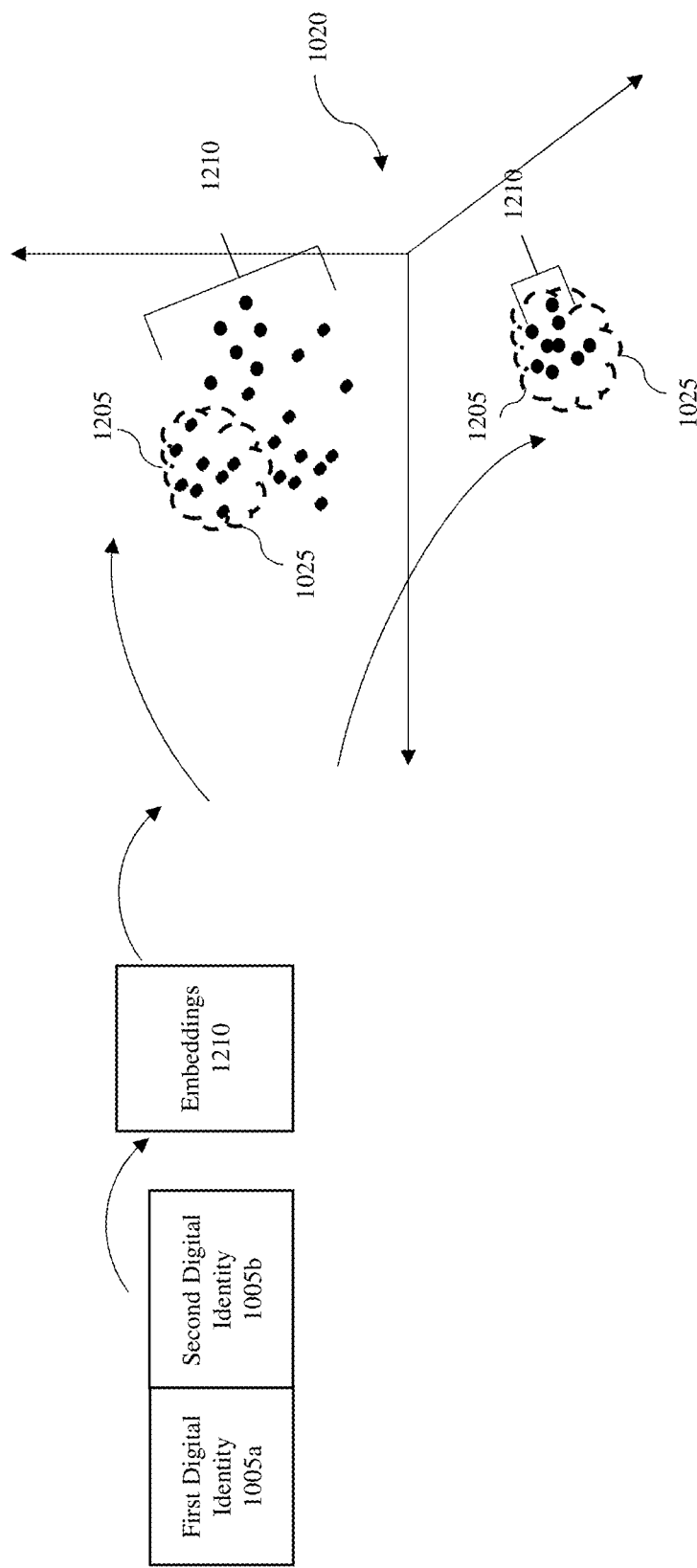
FIG. 12 illustrates a process utilizing the neural network, according to an example embodiment.

FIG. 12 illustrates a process where the first digital identity (1005a), representing the electrical input, and the second digital identity (1005b), representing downstream load requirements, are transformed into compact representations known as embeddings (1210). These embeddings encapsulate the essential features of the digital identities in a reduced mathematical form, enabling efficient analysis and comparison. The embeddings are then projected into a multi-dimensional feature space (1020), where they are analyzed relative to clusters in a historical dataset (1025). These clusters represent previously observed or modeled system conditions that serve as benchmarks for expected or optimal operation.

In the feature space, the embeddings are plotted alongside the clusters from the historical dataset. The alignment of the embeddings (1210) with the clusters (1025) indicates that the current input parameters and load requirements are consistent with expected system behavior. For example, if the embeddings fall within a cluster (1205), it signifies that the system's intermediate output aligns with downstream load requirements, ensuring stable and efficient operation. Conversely, deviations from these clusters would signal discrepancies, prompting the system to make real-time adjustments to power conditioning parameters.

FIG. 12 highlights how embeddings are generated from the digital identities and compared with historical data to validate the system's performance. By ensuring that the embeddings align with reference clusters, the system can confirm that the intermediate output meets the load's predicted requirements. This process demonstrates the integration of historical data into real-time analysis, enabling adaptive and predictive power conditioning to maintain optimal system performance. The method ensures reliability and efficiency, particularly in dynamic or variable operating environments.

In relation to FIGS. 10 through 12, the first digital identity and second digital identity are essential components of the system's predictive and adaptive power management architecture. The first digital identity represents the real-time state of the electrical input, including its voltage stability, current amplitude, impedance characteristics, and harmonic distortion. This identity captures transient and steady-state parameters that define the behavior of the input power source. On the other hand, the second digital identity reflects the operational requirements and constraints of the downstream load. It encapsulates critical factors such as instantaneous power demand, harmonic tolerance thresholds, and the load's expected transient response under dynamic conditions.

These digital identities are not merely raw data streams; they are structured datasets that the system transforms into meaningful insights. By encoding these diverse metrics into a uniform format, the digital identities enable a seamless comparison within the neural network processing layer. This comparison leverages embeddings—compact mathematical representations derived from the neural network—that distill the essential features of the input and load conditions into a feature space. Within this feature space, the embeddings are compared against clusters of historical data representing previously observed system behaviors or idealized performance baseline.

As previously described, the digital identities are structured datasets that represent critical characteristics of the electrical input and downstream load, enabling the system to perform real-time analysis, predictive modeling, and adaptive power management. Specifically, the first digital identity encapsulates the electrical input's characteristics, including parameters such as voltage, current, impedance, harmonic distortion, and transient responses. This identity provides a comprehensive snapshot of the power supply's behavior at any given moment. Similarly, the second digital identity represents the downstream load's operational requirements and constraints, capturing metrics such as power demand, harmonic tolerances, waveform stability, and transient response behaviors. Together, these digital identities create a dynamic model of the system's input and output conditions.

These digital identities are used as the foundation for the system's predictive and adaptive processes. The first and second digital identities are continuously updated using real-time telemetry data and are compared against a third digital identity, which represents historical baseline conditions or pre-modeled system behaviors stored in a connected database. This comparison allows the system to identify patterns, detect anomalies, and determine the optimal adjustments needed to align the intermediate output with the load's requirements. For example, if the first digital identity indicates a voltage sag and the second digital identity identifies a load's sensitivity to such changes, the system uses the comparison with the third digital identity to calculate and implement the necessary corrective actions, such as adjusting impedance or boosting voltage.

The digital identities also play a critical role in predictive modeling. By mapping the current input and load characteristics to historical datasets, the system can anticipate downstream responses to the electrical input and proactively modify power delivery parameters to prevent disruptions. Additionally, these identities enable co-simulation between analog and digital twins, combining high-fidelity hardware modeling with computational analysis to achieve precise, deterministic power management. This layered use of digital identities ensures that the system remains adaptive, efficient, and capable of maintaining stability in dynamic and complex operating conditions.

The utility of the digital identities also lies in their role as a bridge between real-time sensor telemetry and actionable system adjustments. The comparison of embeddings to historical clusters enables the system to identify patterns that correlate with successful past outcomes or deviations that signal anomalies. For example, if the embeddings of the current system state align closely with a stable cluster from the historical dataset, the system replicates the corresponding power delivery configuration, ensuring optimal performance. Conversely, if the embeddings deviate from expected clusters, the system recognizes this as a potential issue, such as a mismatch between input quality and load requirements or the onset of abnormal transient conditions. This triggers real-time corrective actions, such as adjusting power conditioning parameters, dynamically modifying impedance, or rebalancing the flow of energy through the intermediate converters.

This process represents a significant improvement over prior systems, which often relied on iterative recalibration or reactive measures to address discrepancies. Here, the digital identities enable deterministic decision-making by directly correlating real-time conditions with pre-validated solutions. This eliminates latency and computational overhead, allowing the system to maintain stable power delivery even under dynamic operating environments. Additionally, by using embeddings and historical clusters, the system reduces the complexity of data processing, enabling faster and more efficient adjustments while retaining the fidelity of critical operational data.

Moreover, the ability of the neural network to continuously refine the generation of embeddings ensures that the system's predictive accuracy improves over time. As new data is incorporated into the historical dataset, the clustering mechanism adapts to evolving conditions, further enhancing the system's capability to anticipate and mitigate issues proactively. This adaptive learning feature ensures that the system remains resilient to unforeseen anomalies or shifts in load behavior, maintaining high power quality and reliability across varying scenarios. In this way, the structured use of digital identities not only optimizes current operations but also provides a foundation for continuous improvement, making it a transformative approach to power management and conditioning.

As a result, the digital identities also serve as the foundation for training the system to recognize patterns in input and load characteristics, enabling faster and more efficient real-time adjustments. During the system's setup and operation, historical datasets comprising previously observed digital identities—representing various input conditions and corresponding load responses—are used to train the system's machine learning model, such as a TensorFlow-based neural network. This training enables the system to monitor real-time input characteristics and quickly match them to a known digital identity from the dataset, which corresponds to a pre-calibrated set of optimal system adjustments.

For example, the system processes telemetry data to generate a current first digital identity of the input, representing parameters such as voltage, current, and harmonic distortion. Through the trained model, this digital identity is matched to a stored profile in the historical dataset, which contains a predefined response for handling similar conditions. This recognition allows the system to bypass the need for computationally expensive simulations or iterative calculations, reducing processing time and enabling near-instantaneous adjustments. Similarly, the second digital identity of the load is continuously monitored and compared against known load identities in the historical database, ensuring that the system remains aligned with the downstream requirements.

This pattern-matching capability not only reduces processing time but also improves system reliability by automating the decision-making process for power adjustments. The pre-trained model ensures that the system can respond to a wide range of input and load conditions with high accuracy, even in complex and dynamic operating environments. By leveraging the training on digital identities, the system achieves adaptive power management with minimal latency, ensuring optimal performance and stability without relying on cloud-based or iterative computational methods.

This capability of leveraging pre-trained digital identities allows for the rapid transfer and restoration of power to critical systems, ensuring clean and stable power delivery. By matching real-time input and load characteristics to known identities, the system can immediately implement pre-determined adjustments without requiring time-intensive simulations or iterative calculations. This ensures that critical systems, such as medical equipment, data centers, or industrial operations, experience minimal disruption during transient events or fluctuations in power supply. Additionally, the system's ability to maintain clean power-free from voltage sags, harmonic distortions, or other instabilities-enhances the reliability and efficiency of these critical applications. This rapid and precise response ensures that the power system meets stringent performance requirements while supporting the uninterrupted operation of essential infrastructure.

Figure 13:
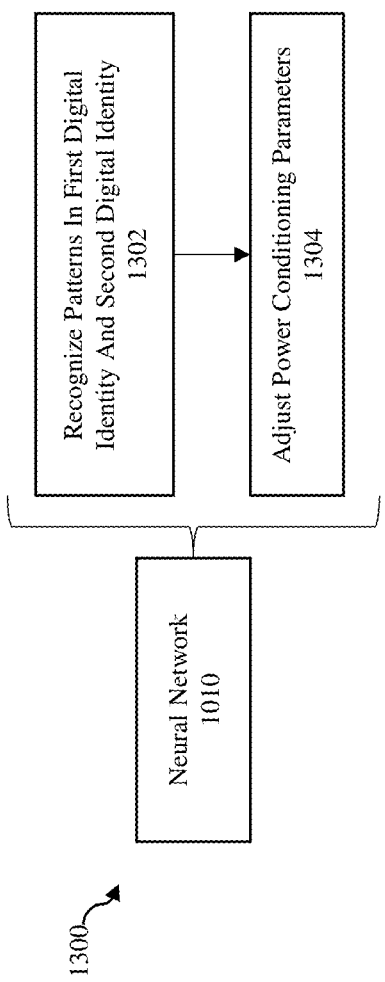
FIG. 13 is a flowchart diagram of steps for a method performed by the neural network is shown, according to an example embodiment.

Referring now to FIG. 13, a flowchart diagram of steps for a method 1300 performed by the neural network 1010 is shown, according to an example embodiment. In step 1302, the neural network recognizes patterns in the first digital identity and the second digital identity associated with varying downstream load conditions. This step involves analyzing the real-time electrical input parameters and downstream load requirements to uncover correlations and trends. The first digital identity represents the electrical input characteristics while the second digital identity reflects the load-specific requirements. By processing these identities, the neural network identifies recurring patterns or unique signatures that characterize the behavior of the downstream load under different input conditions.

The neural network achieves this by employing feature extraction, clustering, or classification techniques. It maps the relationships between the two digital identities to reveal how input fluctuations, such as voltage dips or harmonic distortions, impact downstream load requirements. For instance, the neural network may recognize that harmonic distortions in the input consistently result in waveform instability in the downstream load, prompting the system to prepare harmonic filters for similar scenarios. Through continuous training on historical data and real-time telemetry feedback, the neural network refines its ability to detect and classify these patterns, providing actionable insights for predictive power conditioning. This allows the system to anticipate load behavior and proactively adjust parameters, ensuring stability, reliability, and efficiency across varying load conditions.

In step 1304, the neural network adjusts power conditioning parameters based on learned correlations between historical downstream load requirements and predicted downstream responses. This step involves using machine learning to understand and apply insights from past system behavior. The neural network processes historical datasets containing downstream load requirements and correlates these with input parameters and system adjustments that successfully optimized performance. These learned correlations serve as a foundation for predicting future downstream responses and guiding real-time power adjustments. The neural network applies its understanding of these correlations to analyze the first and second digital identities in real time, predicting how the downstream load will respond to the current input conditions. For example, the neural network may predict an increase in power demand based on a pattern of rising voltage amplitude or detect potential harmonic distortion in the load due to input waveform irregularities. Using these predictions, the neural network directly adjusts power conditioning parameters such as voltage, impedance, and harmonic suppression settings. For instance, it may preemptively increase output voltage or activate harmonic filters to prevent waveform instability.

By continuously training on new data and refining its predictive accuracy, the neural network ensures that power adjustments are both proactive and precise. This capability enables the system to dynamically align the intermediate output with the downstream load's requirements, minimizing energy losses and preventing instability. Unlike traditional systems, which operate reactively, the neural network's ability to learn and apply correlations ensures that the system consistently delivers stable and efficient power, even under complex and variable operating conditions.

It is understood by those skilled in the art that the steps of the methods described herein are not limited to the specific order presented. Unless explicitly stated otherwise, the method steps may be performed in different sequences, rearranged, or performed concurrently where appropriate without departing from the scope and spirit of the invention. The described order is merely one exemplary embodiment, and variations in the sequence of steps may be made based on the particular circumstances of the implementation, application, or design preferences. For example, certain steps may be combined, omitted, or repeated depending on the operational conditions or requirements of the system. Accordingly, the scope of the invention should not be construed as being limited to the specific order of steps outlined in the methods.

Figure 14:
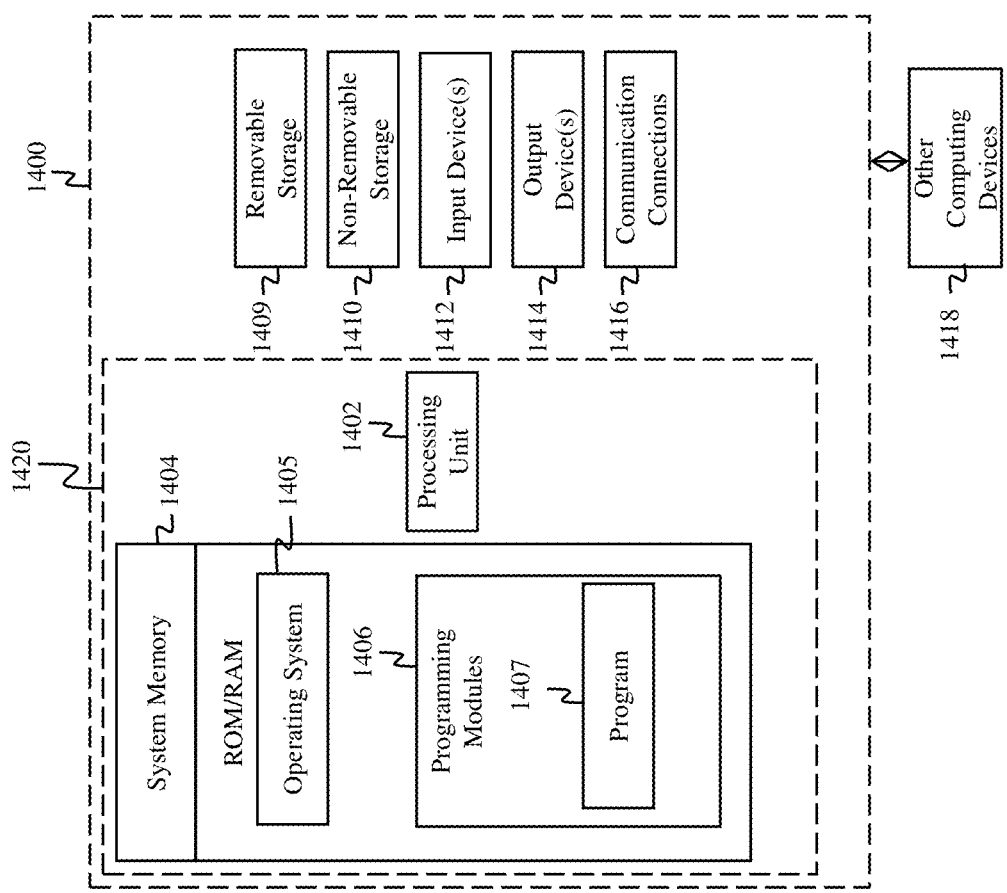
FIG. 14 illustrates a computer system according to exemplary embodiments of the present technology.

Referring now to FIG. 14, a block diagram of a system including an example computing device 1400 and other computing devices is shown, according to an example embodiment. Consistent with the embodiments described herein, the aforementioned actions performed by system 200 may be implemented in a computing device, such as the at least one processor. Any suitable combination of hardware, software, or firmware may be used to implement the at least one processor. The aforementioned system, device, and processors are examples and other systems, devices, and processors may comprise the aforementioned computing device. Furthermore, the at least one processor may comprise an operating environment for system 200 and method 300. Processes, data related to system 200 may operate in other environments and are not limited to the at least one processor.

A system consistent with an embodiment of the disclosure may include a plurality of computing devices, such as a computing device 1400 of FIG. 14. In a basic configuration, computing device 1400 may include at least one processing unit 1402 and a system memory 1404. Depending on the configuration and type of computing device, system memory 1404 may comprise, but is not limited to, volatile (e.g., random access memory (RAM)), non-volatile (e.g., read-only memory (ROM)), flash memory, or any combination or memory. System memory 1404 may include operating system 1405, and one or more programming modules 1406. Operating system 1405, for example, may be suitable for controlling computing device 1400's operation. In one embodiment, programming modules 1406 may include, for example, a program module 1407 for executing the methods illustrated in FIG. 3. Furthermore, embodiments of the disclosure may be practiced in conjunction with a graphics library, other operating systems, or any other application program and is not limited to any particular application or system. This basic configuration is illustrated in FIG. 14 by those components within a dashed line 1420.

Computing device 1400 may have additional features or functionality. For example, computing device 1400 may also include additional data storage devices (removable and/or non-removable) such as, for example, magnetic disks, optical disks, or tape. Such additional storage is illustrated in FIG. 14 by a removable storage 1409 and a non-removable storage 1410. Computer storage media may include volatile and nonvolatile, removable, and non-removable media implemented in any method or technology for storage of information, such as computer readable instructions, data structures, program modules, or other data. System memory 1404, removable storage 1409, and non-removable storage 1410 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information, and which can be accessed by computing device 1400. Any such computer storage media may be part of system 200. Computing device 1400 may also have input device(s) 1412 such as a keyboard, a mouse, a pen, a sound input device, a camera, a touch input device, etc. Output device(s) 1414 such as a display, speakers, a printer, etc. may also be included. The aforementioned devices are only examples, and other devices may be added or substituted.

Computing device 1400 may also contain a communication connection 1416 that may allow system 200 to communicate with other computing devices 1418, such as over a network in a distributed computing environment, for example, an intranet or the Internet. Communication connection 1416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules and data files may be stored in system memory 1404, including operating system 1405. While executing on at least one processing unit 1402, programming modules 1406 (e.g., program module 1407) may perform processes including, for example, one or more of the steps of a process. The aforementioned processes are examples, and at least one processing unit 1402 may perform other processes. Other programming modules that may be used in accordance with embodiments of the present disclosure may include electronic mail and contacts applications, word processing applications, spreadsheet applications, database applications, slide presentation applications, drawing or computer-aided application programs, etc.

Generally, consistent with embodiments of the disclosure, program modules may include routines, programs, components, data structures, and other types of structures that may perform particular tasks or that may implement particular data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of the disclosure may also be practiced in distributed computing environments where tasks are performed by remote processing devices that are linked through a communications network. In a distributed computing environment, program modules may be located in both local and remote memory storage devices.

Furthermore, embodiments of the disclosure may be practiced in an electrical circuit comprising discrete electronic elements, packaged, or integrated electronic chips containing logic gates, a circuit utilizing a microprocessor, or on a single chip (such as a System on Chip) containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general-purpose computer or in any other circuits or systems.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved. It is also understood that components of the system may be interchangeable or modular so that the components may be easily changed or supplemented with additional or alternative components.

While certain embodiments of the disclosure have been described, other embodiments may exist. Furthermore, although embodiments of the present disclosure have been described as associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' steps may be modified in any manner, including by reordering steps and/or inserting or deleting steps, without departing from the disclosure.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method for conditioning and maintaining power with predictive load compensation in a customer-side uninterruptible power supply system positioned downstream of a utility meter, the method comprising:
- measuring, at a location downstream of the utility meter and upstream of a downstream load, an electrical input from a primary power supply using a plurality of analog sensors;
- transmitting the electrical input through an impedance to provide a controlled delay during transmission of power to a first power converter; wherein the controlled delay is present in an amount ranging from 1 to 10 milliseconds;
- during the controlled delay, the method comprises:
  - determining a plurality of input parameters for the electrical input and a plurality of downstream system effects based on sensor data from a plurality of telemetry sensors;
  - generating a first digital identity of the electrical input based on the plurality of input parameters and storing the first digital identity in a connected database;
  - determining a plurality of load requirement parameters of a downstream load based on the sensor data from the plurality of telemetry sensors;
  - generating a second digital identity for the downstream load based on the plurality of load requirement parameters;
  - making a comparison between the first digital identity and the second digital identity to a previously stored third digital identity of an electrical simulation in the connected database;
  - performing, during the controlled delay, a system simulation using analog twinning based on the comparison between the first digital identity and the second digital identity to the previously stored third digital identity, to generate an optimized response preemptively aligning the intermediate output with predicted downstream load requirements;
  - generating a predicted downstream system response to the electrical input based on the system simulation and the predicted downstream load requirements; and
  - automatically compensating, using a local TensorFlow processing system, a first power converter parameter to modify the electrical input to an intermediate output to satisfy a second power converter input parameter and to actively compensate for a plurality of voltage fluctuations and harmonic distortions;
- transferring the intermediate output to a second power converter positioned downstream, wherein a secondary power supply is electrically connected between the first power converter and the second power converter; wherein the secondary power supply comprises a bidirectional high discharge battery comprising at least 2 C that automatically:
  - charges using excess energy from the intermediate output if an energy demand from the downstream load is predicted to be low;
  - discharges to supplement the intermediate output if the energy demand from the downstream load is predicted to be high; and
  - remains idle, maintaining its current state of charge if the intermediate output is predicted to satisfy the plurality of load requirement parameters; and
- converting the intermediate output by the second power converter to produce a final output for compensating the downstream load.

2. The method of claim 1, wherein performing the system simulation using analog twinning further comprises:
- generating a canonical solution to satisfy the plurality of load requirement parameters in a single iteration by directly comparing the first digital identity and the second digital identity without additional iterative processing cycles; and
- adapting power conditioning parameters based on the canonical solution to preemptively align the intermediate output with the predicted downstream load requirements.

3. The method of claim 2, wherein the canonical solution is determined by utilizing an analog twin configured to process input parameters and load requirement parameters in real-time, enabling the uninterruptible power supply system to reach a steady-state solution in the single iteration without further recalibration steps.

4. The method of claim 3, wherein the analog twin utilizes real-time sensor feedback from the plurality of telemetry sensors to establish a deterministic solution pathway, resulting in a predictive alignment of the intermediate output with downstream load requirements based solely on the single iteration.

5. The method of claim 4, further comprising dynamically making an adjustment to at least one power converter parameter based on the canonical solution achieved by the analog twin, wherein the adjustment is configured to maintain optimal power delivery to the downstream load without successive iterations.

6. The method of claim 5, wherein the analog twin is pre-calibrated using a historical dataset of input parameters and downstream load requirements to achieve the canonical solution in the single iteration through direct correlation with stored parameter profiles.

7. The method of claim 6, further comprising adjusting input and output flows in real-time by controlling a plurality of analog components, wherein the plurality of analog components receive feedback from the plurality of telemetry sensors to modulate the electrical input and the intermediate output.

8. The method of claim 7, further comprising modulating the electrical input and intermediate output by adjusting at least one variable resistor and capacitor based on the sensor data from the plurality of telemetry sensors to compensate for voltage fluctuations and harmonic distortions.

9. The method of claim 8, further comprising continuously monitoring the input parameters and load requirement parameters using the plurality of telemetry sensors and adjusting an impedance value within the plurality of analog components in real-time based on the sensor data.

10. The method of claim 9, further comprising performing micro-adjustments to the intermediate output at intervals of less than 1 millisecond by altering a resistance and capacitance within the plurality of analog components in response to transient voltage spikes and dips detected by the plurality of telemetry sensors.

11. The method of claim 10, further comprising updating at least one of the first digital identity, the second digital identity, and the previously stored third digital identity based on a plurality of adjustments to compensate the downstream load.

12. A method for single-iteration power conditioning load regulation with predictive load compensation in a customer-side uninterruptible power supply system positioned downstream of the utility meter, employing an analog twin, the method comprising:
    measuring, at a location downstream of a primary utility meter and upstream of a downstream load, an electrical input parameter of an electrical input from a primary power supply using at least one sensor;
    transmitting the electrical input to a first power converter;
    performing, during a controlled millisecond delay in the transmission of power to a first power converter, a system simulation using the analog twin to generate an optimized response preemptively aligning an intermediate output to satisfy downstream load requirements, wherein the optimized response is generated in a single iteration by comparing the electrical input parameter with a downstream load requirement parameter of a downstream load, without additional iterative processing cycles;
        compensating, using a local processing system, at least one parameter of the first power converter to modify the electrical input to an intermediate output based on the optimized response,
        wherein the intermediate output is configured to satisfy the downstream load requirements;
    and
        transferring the intermediate output to a second power converter positioned downstream to produce a final output for compensating the downstream load.

13. The method of claim 12, further comprising determining a plurality of input parameters for the electrical input, the plurality of input parameters including voltage and current measurements, using a plurality of analog sensors positioned upstream of the first power converter.

14. The method of claim 12, wherein performing the system simulation using the analog twin further comprises:
    comparing the electrical input parameter to a stored dataset of historical load profiles; and
    generating the canonical solution based on a single correlation between the downstream load requirements and the stored dataset of historical load profiles.

15. The method of claim 12, further comprising dynamically adjusting an impedance value in real-time based on the canonical solution, wherein the impedance value is adjusted to regulate the intermediate output in response to fluctuations in the electrical input parameter.

16. The method of claim 12, wherein the local processing system comprises a TensorFlow-based processor configured to apply machine learning algorithms that optimize the intermediate output to reduce harmonic distortions and voltage fluctuations before transferring the intermediate output to the second power converter.

17. The method of claim 12, further comprising continuously monitoring the downstream load using a plurality of telemetry sensors, wherein the plurality of telemetry sensors provide feedback to the local processing system to maintain a steady-state condition of the final output in accordance with the canonical solution.

18. A method for generating digital identities in a customer-side uninterruptible power supply system positioned downstream of a utility meter to facilitate load-adaptive power conditioning, the method comprising:
    measuring, at a location downstream of the utility meter and upstream of a downstream load, an electrical input from a primary power supply using a plurality of sensors positioned upstream of a first power converter;
    determining a plurality of input parameters for the electrical input based on data from the plurality of sensors, the plurality of input parameters comprising at least voltage, current, and impedance characteristics;
    generating a first digital identity of the electrical input based on the plurality of input parameters;
    storing the first digital identity in a connected database;
    measuring a plurality of load requirement parameters for a downstream load using a plurality of telemetry sensors positioned downstream of the first power converter;
    generating a second digital identity for the downstream load based on the plurality of load requirement parameters, the plurality of load requirement parameters comprising at least power demand and harmonic content;
    storing the second digital identity in the connected database; and
    performing, during a controlled millisecond delay in the transmission of power to a first power converter, a system simulation using analog twinning to generate an optimized response preemptively aligning an intermediate output to satisfy downstream load requirements, wherein the optimized response is generated in a single iteration by comparing the first digital identity with the second digital identity.

19. The method of claim 18, further comprising training a neural network within the uninterruptible power supply system using a historical dataset of the first digital identity and the second digital identity, wherein the neural network is configured to:
    recognize patterns in the first digital identity and the second digital identity associated with varying downstream load conditions; and
    adjust power conditioning parameters based on learned correlations between historical downstream load requirements and predicted downstream responses.

20. The method of claim 19, further comprising training the neural network in real-time using feedback from the plurality of telemetry sensors, and wherein the uninterruptible power supply system communicates with the neural network to generate (i) a predicted downstream system response to the electrical input based on the system simulation, (ii) predicted downstream load requirements, and (iii) a canonical solution for conditioning power for downstream load compensation within a single iteration, wherein the neural network is configured to:
    utilize real-time data from the plurality of telemetry sensors and results from a single-iteration analog twin to generate the canonical solution for downstream load requirements without additional iterative processing cycles within a period of time that the electrical input is passed through an impedance to a first power converter; and
    dynamically adjust a power conditioning parameter to preemptively align an intermediate output from the first power converter with the predicted downstream load requirements based on the canonical solution generated by the single-iteration analog twin.

* * * * *